US012750003B2

(12) United States Patent
Kim et al.

(10) Patent No.: US 12,750,003 B2
(45) Date of Patent: Sep. 29, 2026

(54) BUILDING INTEGRATED PHOTOVOLTAIC (BIPV) CURTAIN WALL SYSTEM

(71) Applicant: The University Of North Carolina At Charlotte, Charlotte, NC (US)

(72) Inventors: Kyoung Hee Kim, Charlotte, NC (US); Seyedehhamideh Hosseiniirani, Charlotte, NC (US)

(73) Assignee: The University Of North Carolina At Charlotte, Charlotte, NC (US)

(*) Notice: Subject to any disclaimer, the term of this patent is extended or adjusted under 35 U.S.C. 154(b) by 495 days.

(21) Appl. No.: 18/382,147

(22) Filed: Oct. 20, 2023

(65) Prior Publication Data

US 2024/0048088 A1 Feb. 8, 2024

Related U.S. Application Data

(63) Continuation-in-part of application No. 17/070,124, filed on Oct. 14, 2020, now Pat. No. 12,258,545, and (Continued)

(51) Int. Cl.
*H02S 20/26* (2014.01)
*E04B 2/96* (2006.01)

(52) U.S. Cl.
CPC ................ *H02S 20/26* (2014.12); *E04B 2/96* (2013.01)

(58) Field of Classification Search
CPC ...... E06B 2009/2476; E06B 2009/2482; F24S 2020/183; F24S 2020/10; F24S 2020/11;

(Continued)

(56) References Cited

U.S. PATENT DOCUMENTS 7,202,410 B2 4/2007 Umemoto et al.
7,847,181 B2 12/2010 Brescia (Continued)

FOREIGN PATENT DOCUMENTS

CN 209250542 U * 8/2019
WO 20190039779 A1 2/2019

(Continued)

OTHER PUBLICATIONS

English machine translation of Teng (CN 209250542) published Aug. 13, 2019.*

(Continued)

*Primary Examiner* — Christina Chern
(74) *Attorney, Agent, or Firm* — Clements Bernard Walker; Christopher L. Bernard

(57) ABSTRACT

A photovoltaic curtain wall system includes a three-dimensional (3D) solar module configured to receive sunlight and reflect sun path geometry; an interior glass unit comprising a single or a double glass panel; an exterior glass panel offset from the interior glass unit forming a gap therebetween, wherein the gap is a conditioned, closed air cavity receiving the solar module. The solar module includes rotatable or fixed micro-oculus shaders at varying angles or curvatures, each micro-oculus shader including an ocular shape with an upper shading portion including photovoltaic elements and a lower shading portion, and the rotatable or fixed micro-oculus shaders are arranged in an array forming open areas therein that are configured to allow a view therethrough. The photovoltaic curtain wall system is a prefabricated curtain wall system configured to be integrated with a building.

20 Claims, 46 Drawing Sheets

Related U.S. Application Data a continuation-in-part of application No. 18/030,325, filed as application No. PCT/US2021/054912 on Oct. 14, 2021, which is a continuation-in-part of application No. 17/070,124, filed on Oct. 14, 2020, now Pat. No. 12,258,545.

(60) Provisional application No. 62/915,088, filed on Oct. 15, 2019, provisional application No. 62/915,077, filed on Oct. 15, 2019, provisional application No. 62/972,841, filed on Feb. 11, 2020, provisional application No. 63/452,482, filed on Mar. 16, 2023.

(58) Field of Classification Search
CPC .......... F24S 30/40; F24S 30/42; F24S 30/425; H02S 20/30
See application file for complete search history.

(56) References Cited

U.S. PATENT DOCUMENTS

| | | | | |
|---|---|---|---|---|
| 8,171,680 | B2 | 5/2012 | Brescia | |
| 9,273,840 | B1 | 3/2016 | Braun | |
| 9,281,186 | B2 | 3/2016 | Wootton | |
| 9,574,352 | B2 | 2/2017 | Den Boer et al. | |
| 10,050,163 | B2 | 8/2018 | Nobori | |
| 10,181,816 | B2 | 1/2019 | Aharon | |
| 10,732,605 | B2 | 8/2020 | Dayama et al. | |
| 10,941,612 | B2 | 3/2021 | Kirby | |
| 11,437,950 | B2 | 9/2022 | Benavente et al. | |
| 11,442,132 | B2 | 9/2022 | Ma et al. | |
| 2008/0163918 | A1* | 7/2008 | Li | E04B 2/88 136/244 |
| 2009/0165849 | A1 | 7/2009 | Chan et al. | |
| 2009/0277494 | A1 | 11/2009 | Mazzer et al. | |
| 2010/0071279 | A1* | 3/2010 | Brescia | E04B 2/88 52/173.3 |
| 2010/0126087 | A1 | 5/2010 | Brescia et al. | |
| 2011/0056534 | A1 | 3/2011 | Ding et al. | |
| 2011/0061711 | A1 | 3/2011 | Luo et al. | |
| 2011/0132455 | A1 | 6/2011 | Chiang et al. | |
| 2011/0194040 | A1 | 8/2011 | Chen | |
| 2011/0303282 | A1 | 12/2011 | Tsai et al. | |
| 2013/0319504 | A1 | 12/2013 | Yang et al. | |
| 2013/0319505 | A1 | 12/2013 | Yang et al. | |
| 2014/0158197 | A1 | 6/2014 | Rubenstein et al. | |
| 2014/0159636 | A1 | 6/2014 | Yang et al. | |
| 2014/0261621 | A1 | 9/2014 | Gruhlke et al. | |
| 2014/0261622 | A1 | 9/2014 | Floyd et al. | |
| 2015/0155410 | A1 | 6/2015 | Lin et al. | |
| 2016/0097236 | A1 | 4/2016 | Ko et al. | |
| 2017/0353145 | A1 | 12/2017 | Yang | |
| 2018/0309013 | A1 | 10/2018 | Pretorius et al. | |
| 2019/0036480 | A1 | 1/2019 | Barr et al. | |
| 2019/0221692 | A1 | 7/2019 | Wang | |
| 2019/0372352 | A1 | 12/2019 | Xiao et al. | |
| 2021/0203274 | A1 | 7/2021 | Jun | |
| 2021/0215396 | A1 | 7/2021 | Moslehi et al. | |
| 2022/0006420 | A1 | 1/2022 | Hadizadeh | |
| 2022/0302876 | A1 | 9/2022 | Pao | |
| 2022/0368273 | A1 | 11/2022 | Yu et al. | |

FOREIGN PATENT DOCUMENTS

| | | | |
|---|---|---|---|
| WO | 20190136936 | A1 | 7/2019 |
| WO | 20210184478 | A1 | 9/2021 |
| WO | 20230063463 | A1 | 4/2023 |
| WO | 2023082331 | A1 | 5/2023 |
| WO | 2023086031 | A2 | 5/2023 |
| WO | 2023131249 | A1 | 7/2023 |

OTHER PUBLICATIONS

Naumann, Volker, Dominik Lausch, and Christian Hagendorf. "Sodium decoration of PID-s crystal defects after corona induced degradation of bare silicon solar cells." Energy procedia 77 (2015): 397-401.
Siecker, J., K. Kusakana, and B. P. Numbi. "A review of solar photovoltaic systems cooling technologies." Renewable and Sustainable Energy Reviews 79 (2017): 192-203.
U.S. Department of Energy. n.d. "Solar Timeline." Accessed Dec. 29, 2022. https://www1.eere.energy.gov/solar/pdfs/solar_timeline.pdf.
Zaihidee, Fardila Mohd, Saad Mekhilef, Mehdi Seyedmahmoudian, and Ben Horan. "Dust as an unalterable deteriorative factor affecting PV panel's efficiency: Why and how." Renewable and Sustainable Energy Reviews 65 (2016): 1267-1278.

* cited by examiner

310

1100

1300

BUILDING INTEGRATED PHOTOVOLTAIC (BIPV) CURTAIN WALL SYSTEM

PRIORITY CLAIM

This application is a Continuation-in-Part (CIP) of and claims the benefit of U.S. patent application Ser. No. 17/070,124 entitled "SUSTAINABLE CURTAIN WALL," filed on Oct. 14, 2020, which claims the benefit of 1) U.S. Provisional Patent Application Ser. No. 62/915,088 entitled "MICROALGAE BUILDING ENCLOSURE SYSTEM; BIOCATALYST BUILDING ENCLOSURE SYSTEM; DIVIDED, INFLATED, STRANDED, SUSPENDED, AND WOVEN MICROALGAE BUILDING ENCLOSURE SYSTEMS," filed on Oct. 15, 2019, 2) U.S. Provisional Patent Application Ser. No. 62/915,077 entitled "MICRO-OCULI BUILDING ENCLOSURE SYSTEM: KINETIC AND STATIC APPLICATION," filed on Oct. 15, 2019, and 3) U.S. Provisional Patent Application Ser. No. 62/972,841 entitled "BIOCATALYST BUILDING ENCLOSURE SYSTEM," filed on Feb. 11, 2020, which are all hereby incorporated by reference. This application is also a Continuation-in-Part (CIP) of and claims the benefit of U.S. patent application Ser. No. 18/030,325 entitled "SUSTAINABLE CURTAIN WALL," filed on Apr. 5, 2023, which is a United States National Stage Patent Application of PCT/US2021/0549912. U.S. patent application Ser. No. 18/030,325 is also a Continuation-in-Part (CIP) of and claims the benefit of U.S. patent application Ser. No. 17/070,124, filed on Oct. 14, 2020, which claims the benefit of 1) U.S. Provisional Patent Application Ser. No. 62/915,088, filed on Oct. 15, 2019, 2) U.S. Provisional Patent Application Ser. No. 62/915,077, filed on Oct. 15, 2019, and 3) United States Provisional Patent Application Ser. No. 62/972,841, filed on Feb. 11, 2020, which are all hereby incorporated by reference.

STATEMENT OF GOVERNMENT RIGHTS

Funding was provided under Award Number 2122014 by the National Science Foundation.

TECHNICAL FIELD

The present disclosure generally relates to building integrated systems. More particularly, the present disclosure relates to systems and methods for photovoltaic systems with an integrated photovoltaic curtain wall for building enclosure.

BACKGROUND

Tall building enclosures, such as office buildings and apartments, represent a significant amount of the electricity use, energy use and greenhouse gas emissions, particularly those in dense urban areas. Glass enclosures have been preferred in contemporary buildings by architects and owners due to design opportunities such as daylighting, view-out and aesthetics. The aesthetic appeal of transparency and lightness of glass is a unique attribute that other building materials do not offer. Further, innovation in glass technology over the past decades has pushed the boundary of design opportunities and technical advancement for glass enclosures.

In addition to energy attributes, constructability of building enclosure systems is important in that the high-rise buildings and the dense urban site have additional construction challenges such as access to the site, building material storage and space for installation equipment.

Recently, building-integrated microalgae façades have drawn the attention of architects and designers in the field of net zero architecture due to its effective role in enhancing building energy efficiency, producing on-site biofuel as well as reducing air pollutions and processing wastewater treatment. It is estimated that such tall building enclosures fitted or retrofitted with microalgae facades could significantly reduce energy consumption as compared to the original building or a building constructed without microalgae facades.

Also recently, building integrated photovoltaic (BIPV) façades have drawn the attention of architects and designers in the field of net zero architecture. However, drawbacks exist. For example, conventional BIPV made of soda-lime glass is susceptible to performance degradation and shorter longevity due to potential induced degradation. Other drawbacks include limited flexibility in architectural aesthetics, limiting a wide range of architectural applications.

In view of the above, there is a need for improved facades. In particular, there is a need for a cost-effective prefabricated building integrated photovoltaic (BIPV) façade for use within a photovoltaic system, that integrates with tall building enclosures, with longevity and quality control that can comply with building codes and/or national industry standards, as well as reduces carbon emissions and energy use, and improves occupant health and comfort through increased indoor environmental quality.

The above-described background relating to various facades is merely intended to provide a contextual overview of some current issues and is not intended to be exhaustive. Other contextual information may become apparent to those of ordinary skill in the art upon review of the following description of exemplary embodiments.

SUMMARY

Embodiments of the present disclosure address the above needs and others. In particular, disclosed herein according to embodiments is a cost-effective prefabricated building integrated photovoltaic (BIPV) façade for use within a photovoltaic system, that integrates with tall building enclosures, with longevity and quality control that can comply with building codes and/or national industry standards, as well as reduces carbon emissions and energy use, and improves occupant health and comfort through increased indoor environmental quality. In this regard, Applicant has evaluated power production potentials of and multi-functionalities of a three-dimensional (3D) building integrated photovoltaic (BIPV) façade system, according to embodiments. Unlike traditional systems, in embodiments, the herein described 3D solar module is configured to reflect the sun path geometry to maximize year-round solar exposure and energy production. In embodiments, the 3D BIPV façade offers multiple functionalities—solar regulations, daylighting penetration, and view-out, resulting in energy savings from heating, cooling, and artificial lighting load. Its ability to produce solar energy offsets building energy consumption and contributes to net-zero-energy buildings. With climate emergency on the rise and the need for clean, sustainable energy becoming ever more pressing, the 3D BIPV façade, according to embodiments and further described below, offers a creative and innovative approach to tackling the problems of power production, building energy savings, and user health and wellbeing.

Accordingly, the present disclosure generally provides a multi-functional solar façade for high-rise buildings to reduce carbon emissions and energy use, and improve occupant health and comfort through increased indoor environmental quality (IEQ). Testing has demonstrated that Applicant's systems according to embodiments can outperform traditional BIPV windows by providing maximum solar power output, summer shading, winter solar gain, year-round daylighting, and a view to the outside.

In one exemplary embodiment, the present disclosure provides a photovoltaic curtain wall system. The system comprises a three-dimensional (3D) solar module configured to receive sunlight and reflect sun path geometry; an interior glass unit comprising a single or a double glass panel; and an exterior glass panel offset from the interior glass unit forming a gap therebetween, wherein the gap is a conditioned, closed air cavity receiving the solar module. The solar module thereof comprises: rotatable or fixed micro-oculus shaders of varying angles or curvatures, each micro-oculus shader including an ocular shape with an upper shading portion and a lower shading portion, the upper shading portion protruding outward from a circular base of the micro-oculus shader in the axial direction relative to the base and at least partially toward the axis of the base and the upper shading portion includes photovoltaic elements on a top portion of the upper shading portion. The lower shading portion protrudes outward from the circular base of the micro-oculus shade in the axial direction relative to the axis of the base and at least partially away from the axis of the base. The rotatable or fixed micro-oculus shaders are arranged in an array forming open areas therein that are configured to allow a view therethrough. The system also includes a transom holding the interior glass unit and the exterior glass panel therebetween; wherein the photovoltaic curtain wall system is a prefabricated curtain wall system configured to be integrated with a building.

The rotatable or fixed micro-oculus shaders may be arranged in a hexagonal array forming open areas therein that are configured to allow the view therethrough.

The upper shading portion of each micro-oculus shader may be configured to generate electricity with the photovoltaic elements and the lower shading portion is configured to reflect light passing adjacent to the micro-oculus shader.

The curvature of the upper shading portion may be configured to be changed depending upon solar positions.

The three-dimensional (3D) solar module is configured to receive the sunlight normal to the upper shading portion to reduce cosine effect.

The photovoltaic curtain wall system may further comprise a dynamic system including gears configured to rotate the micro-oculus shaders.

The photovoltaic elements on each micro-oculus shader may be configured to be positioned on the micro-ocular shader with use of wiring, inset surfaces and grooves.

The photovoltaic curtain wall system may further comprise a series-parallel circuit connection.

The rotatable micro-oculus shaders may be linked in series or in parallel, and the photovoltaic curtain wall system may further comprise a control system.

The control system may be linked to a central system or a standalone system comprising a battery.

The three-dimensional (3D) solar modular may be configured to be installed in the building, the building having a ceiling and floor, and the open areas of the solar modular at eye level may be configured to be larger and gradually reduced when moving up to the ceiling and down to the floor.

In another embodiment, the present disclosure provides a photovoltaic curtain wall system comprising a three-dimensional (3D) solar module configured to receive sunlight and reflect sun path geometry; an interior, insulated glass unit comprising a double glass panel; an exterior glass panel offset from the interior, insulated glass unit forming a gap therebetween, wherein the gap is a conditioned, closed air cavity receiving the solar module and the solar modular is suspended in the closed air cavity or attached to the interior, insulated glass unit. The solar module comprises: rotatable or fixed micro-oculus shaders of varying angles or curvatures, each micro-oculus shader including an ocular shape with an upper shading portion and a lower shading portion, the upper shading portion protruding outward from a circular base of the micro-oculus shader in the axial direction relative to the base and at least partially toward the axis of the base and the upper shading portion includes photovoltaic elements on a top portion of the upper shading portion. The lower shading portion protruding outward from the circular base of the micro-oculus shade in the axial direction relative to the axis of the base and at least partially away from the axis of the base; the rotatable or fixed micro-oculus shaders being arranged in an array forming open areas therein that are configured to allow a view therethrough. The system further comprises a transom holding the interior, insulated glass unit and the exterior glass panel therebetween; wherein the photovoltaic curtain wall system is a prefabricated curtain wall system configured to be integrated with a building, the building having a ceiling and floor, and the open areas of the solar modular at eye level are configured to be larger and gradually reduced when moving up to the ceiling and down to the floor.

The rotatable or fixed micro-oculus shaders may be arranged in a hexagonal array forming open areas therein that are adapted to allow the view therethrough.

The upper shading portion of each micro-oculus shader may be configured to generate electricity with the photovoltaic elements and the lower shading portion is configured to reflect light passing adjacent to the micro-oculus shader.

Curvature of the upper shading portion may be configured to be changed depending upon solar positions.

The three-dimensional (3D) solar module may be configured to receive the sunlight normal to the upper shading portion to reduce cosine effect.

In a further embodiment, the present disclosure provides a method for integrating a photovoltaic curtain wall system in a building comprising. The method comprises providing a photovoltaic curtain wall system comprising a three-dimensional (3D) solar module configured to receive sunlight and reflect sun path geometry; an interior glass unit comprising a single or a double glass panel; an exterior glass panel offset from the interior glass unit forming a gap therebetween, wherein the gap is a conditioned, closed air cavity receiving the solar module. The solar module comprises rotatable or fixed micro-oculus shaders with varying angles or curvatures, each micro-oculus shader including an ocular shape with an upper shading portion and a lower shading portion, the upper shading portion protruding outward from a circular base of the micro-oculus shader in the axial direction relative to the base and at least partially toward the axis of the base and the upper shading portion includes photovoltaic elements on a top portion of the upper shading portion. The lower shading portion protruding outward from the circular base of the micro-oculus shade in the axial direction relative to the axis of the base and at least partially away from the axis of the base; the rotatable or fixed micro-oculus shaders being arranged in an array forming open areas therein that are configured to allow a view therethrough. The system further includes a transom holding the interior glass unit and the exterior glass panel therebetween; wherein the photovoltaic curtain wall system is a prefabricated curtain wall system. The method further comprises integrating the prefabricated curtain wall system in the building, the building having a ceiling and floor, and the open areas of the solar modular at eye level are larger and gradually reduced when moving up to the ceiling and down to the floor.

The rotatable or fixed micro-oculus shaders may be arranged in a hexagonal array forming open areas therein that are adapted to allow the view therethrough.

The upper shading portion of each micro-oculus shader may generate electricity with the photovoltaic elements and the lower shading portion reflects light passing adjacent to the micro-oculus shader.

The three-dimensional (3D) solar module may receive the sunlight normal to the upper shading portion to reduce cosine effect.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF EXEMPLARY EMBODIMENTS

In various embodiments, the present disclosure relates to systems and methods for a photovoltaic curtain wall system. The photovoltaic curtain wall system includes a three-dimensional (3D) solar module configured to receive sunlight and reflect sun path geometry; an interior glass unit comprising a single or a double glass panel; and an exterior glass panel offset from the interior glass unit forming a gap therebetween, wherein the gap is a conditioned, closed air cavity receiving the solar modular. The solar module includes rotatable or fixed micro-oculus shaders with varying angles or curvatures, each micro-oculus shader including an ocular shape with an upper shading portion and a lower shading portion. The photovoltaic curtain wall system is a prefabricated curtain wall system configured to be integrated with a building.

In various embodiments, the present disclosure further relates to systems and methods for a micro-oculi building enclosure system. The micro-oculus building enclosure system includes micro-oculus shaders that are adapted to control daylight transmission and shading therethrough while producing energy via photovoltaic elements. In dynamic configurations, the micro-oculus shaders are rotatable allowing for dynamic control over the daylight transmission and solar heat gain as well as for optimizing the energy production thereof.

In various embodiments, the present disclosure also relates to systems and methods for a microalgae system. In particular, the microalgae system includes a microalgae curtain wall that serves as a primary building enclosure, such as a traditional window, that provides holistic utilitarian functions of adequate thermal and structural performance, good daylight transmission, shading efficacy as well as air tightness and water tightness in accordance with industry standards.

Figure 1:
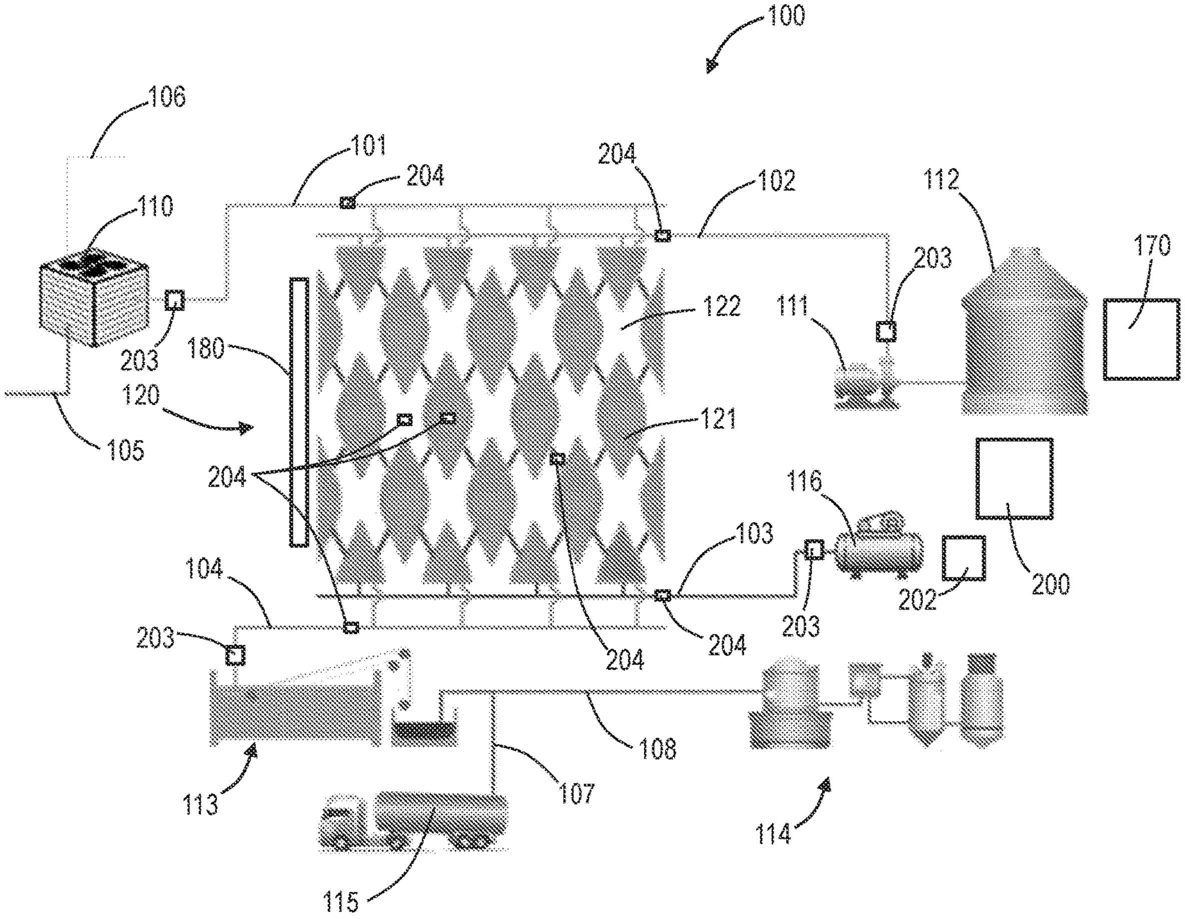
FIG. 1 is a schematic illustration of a microalgae system.

FIG. 1 is a schematic illustration of a microalgae system 100. The microalgae system 100 includes a microalgae curtain wall 120, a microalgae storage tank 112, and a dewatering facility 113. The microalgae curtain wall 120 is a facade for a building that serves as a building enclosure. In embodiments, the microalgae curtain wall is adapted to replace glass panel enclosures for buildings. The microalgae curtain wall 120 includes at least one photobioreactor 121 area and at least one vision area 122. In the embodiments illustrated, the microalgae curtain wall 120 includes an array of photobioreactors 121 with vision areas 122 interspersed within the array of photobioreactors 121. The photobioreactors 121 are adapted to encourage microalgae growth by providing a nutrient-rich environment. Further, the growth density of the microalgae provides shading to the interior space. The photobioreactors 121 include a cavity adapted to receive microalgae cultures and are formed of a material that permits sunlight to pass therethrough to the microalgae. The vision areas 122 are adapted to allow view-out by building occupants and daylighting penetration into the building.

The microalgae storage tank 112 is adapted to store microalgae for distribution to the photobioreactors 121. In particular, the microalgae storage tank 112 is adapted to store young microalgae cultures. In some embodiments, the microalgae storage tank 112 is also adapted to store nutrients, water, and the like that are used to facilitate microalgae growth. The nutrients, water, and the like can be stored in separate containers from the young microalgae cultures within the microalgae storage tank 112 or in a separate microalgae storage tank 112 altogether.

The microalgae is provided from the microalgae storage tank 112 to the photobioreactors 121, such as by a pump 111 and a microalgae inlet line 102. In embodiments, the microalgae inlet line 102 supplies the microalgae to a top of the microalgae curtain wall 120, such as at a top of each of the photobioreactors 121. Water, nutrients, and the like, are also provided to the photobioreactors 121, such as by the microalgae inlet line 102.

Air containing $CO_2$ is supplied to the photobioreactors 121, such as by a compressor 116 and an air inlet line 103. In embodiments, the air inlet line 103 supplies the $CO_2$ containing air to a bottom of the microalgae curtain wall 120, such as at a bottom of each of the photobioreactors 121. In some embodiments, the compressor 116 integrates an Ultraviolet-C (UVC) light tunnel to disinfect harmful bacteria and viruses in the $CO_2$ containing air.

The $O_2$ produced by the microalgae is removed from the photobioreactors 121 using an air outlet line 101. The air outlet line directs the $O_2$ produced by the microalgae away from the photobioreactors 121 for release into the atmosphere or for a specific use, such as for direct injection of the $O_2$ into the Heating, Ventilation, and Air Conditioning system (HVAC) 110 of the building. Moisture from the air can be extracted via a moisture extraction line 105, while the $O_2$ rich air can be supplied to the building via an oxygen release line 106.

The microalgae is extracted from the photobioreactors 121 via a microalgae outlet line 104 and supplied to the dewatering facility 113. In embodiments, the microalgae is gravity fed from the photobioreactors 121 to the dewatering facility 113. However other methods, such as using pumps, is also contemplated. The dewatering facility 113 is adapted to separate the microalgae from water. In embodiments, the water is directed for other uses, and in other embodiments, the water is recycled back to the microalgae storage tank 112 for reuse in the photobioreactors 121 or supply heat for the space heating and water heating demand.

The dewatering facility 113 can include a sump or storage tank that holds the microalgae until the microalgae is needed for further distribution. In embodiments, the microalgae system 100 further includes at least one of an onsite energy production system 114 and microalgae transport 115. Onsite and offset outlet lines 107, 108 direct the microalgae for further use. The onsite energy production system 114 is adapted to use the microalgae as fuel and is adapted to provide energy for use. The microalgae transport 115 is adapted to transport the microalgae to processing plants for further use of the microalgae.

In embodiments, the various lines of the microalgae system including the air outlet line 101, the microalgae inlet line 102, the air inlet line 103, the microalgae outlet line 104, the offsite outlet line 107, and the onsite outlet line 108 are pipes formed of a material that will not react with microalgae, such as Polyvinyl Chloride (PVC) pipes.

In embodiments, the microalgae system 100 includes a controller 200, a heat exchanger 170, and light panel 180, such as a panel of Light Emitting Diode (LEDs). The controller 200 is configured to monitor the microalgae system 100, such as by the use of sensors 204 positioned at varying positions within the system, and to control the various flows and temperature throughout the system, such as via the pump 111, the compressor 116 and various control valves 203 positioned throughout the microalgae system 100. While control valves 203 are illustrated on the main lines (outlet line 101, the microalgae inlet line 102, the air inlet line 103, and the microalgae outlet line 104), in some embodiments, control valves 203 are also included on each of the photobioreactor inlets and outlets. In various embodiments, the sensors 204 include temperature sensors, photometers, pH sensors, oxygen sensors, turbidity sensors, flow meters, and the like. In various embodiments, the sensors 204 are in line sensors positioned at any of on the main lines, within the photobioreactors 121, and the like. In some embodiments, such as for light sensors and temperature sensors, the sensors 204 are also positioned outside of the photobioreactors 121, such as in vision areas 122.

In some embodiments, the heat exchanger 170 conditions algae medium to regulate the temperature of the photobioreactors 121 to maintain the microalgae with optimal temperature ranges for growth thereof. In embodiments, the heat exchanger 170 is integrated with the storage tank 112 to regulate extreme cold and hot temperatures in the photobioreactors 121. In embodiments, the light panel 180 includes optical fibers. The light panel 180 is adapted to at least provide an artificial light source at night, to stimulate growth of the microalgae. In some embodiments, the light panel 180 is adapted to emit light that kills harmful organisms, such as bacteria, to protect the microalgae.

Figure 2:
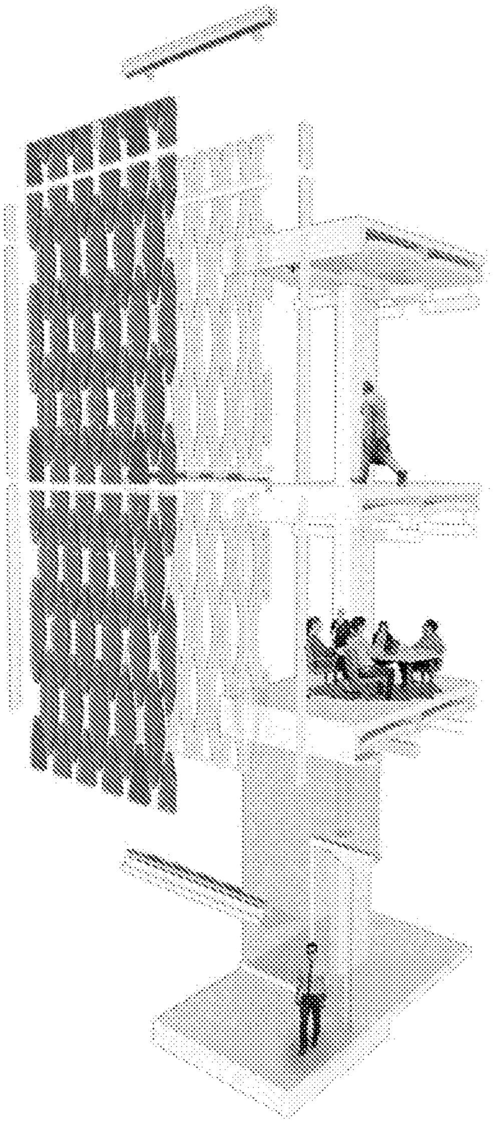
FIG. 2 is a partially exploded schematic illustration of an embodiment of the microalgae curtain wall of FIG. 1.
Figure 3:
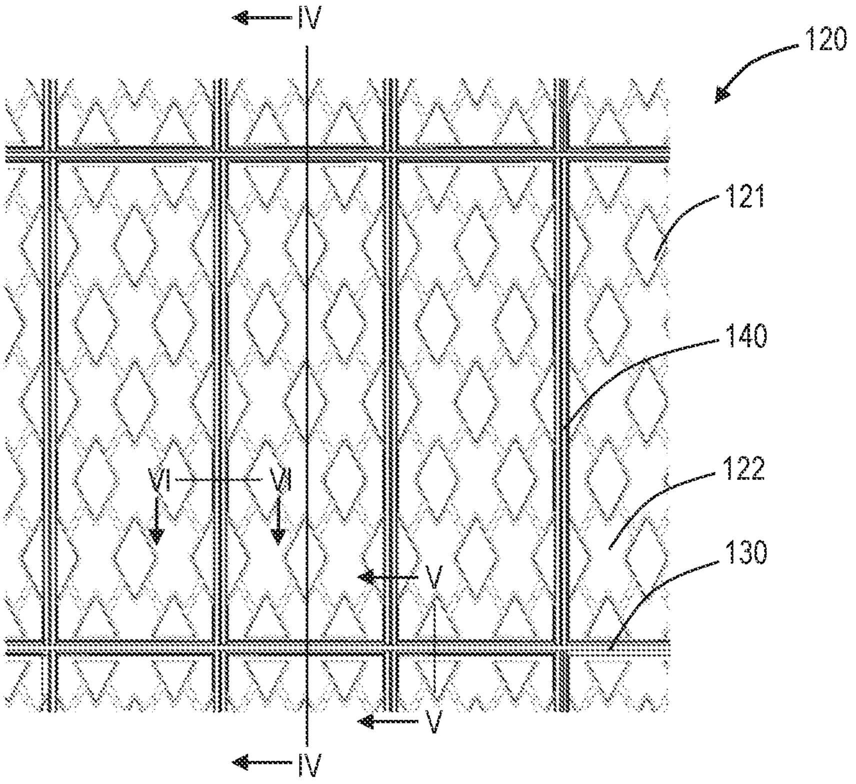
FIG. 3 is a schematic illustration of an elevation of the microalgae curtain wall of FIGS. 1-2.
Figure 4:
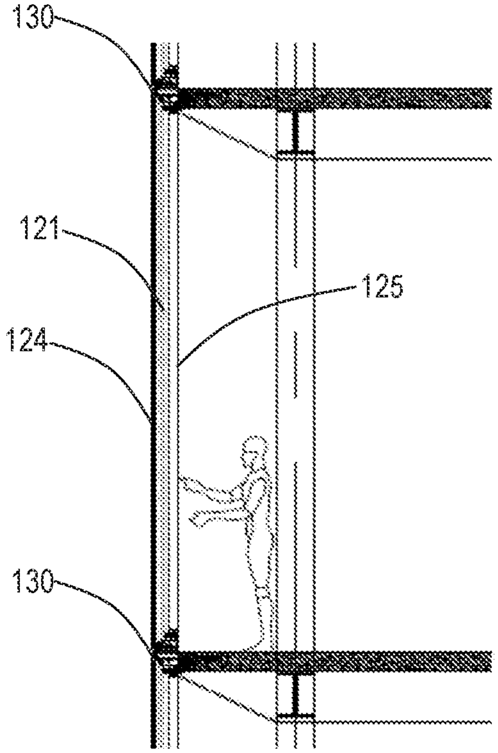
FIG. 4 is a schematic illustration of a cross-section of the microalgae curtain wall of FIG. 3 taken along the line IV-IV.
Figure 5:
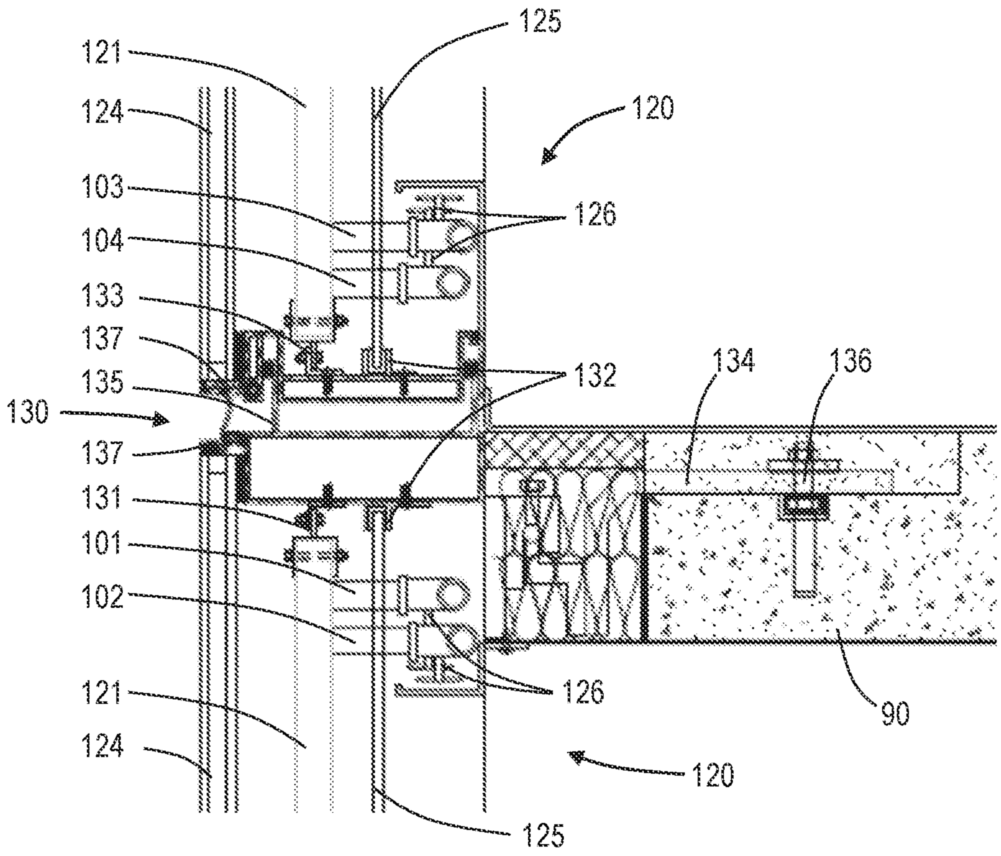
FIG. 5 is a schematic illustration of a partial cross-section of the microalgae curtain wall of FIG. 3 taken along the line V-V.
Figure 6:
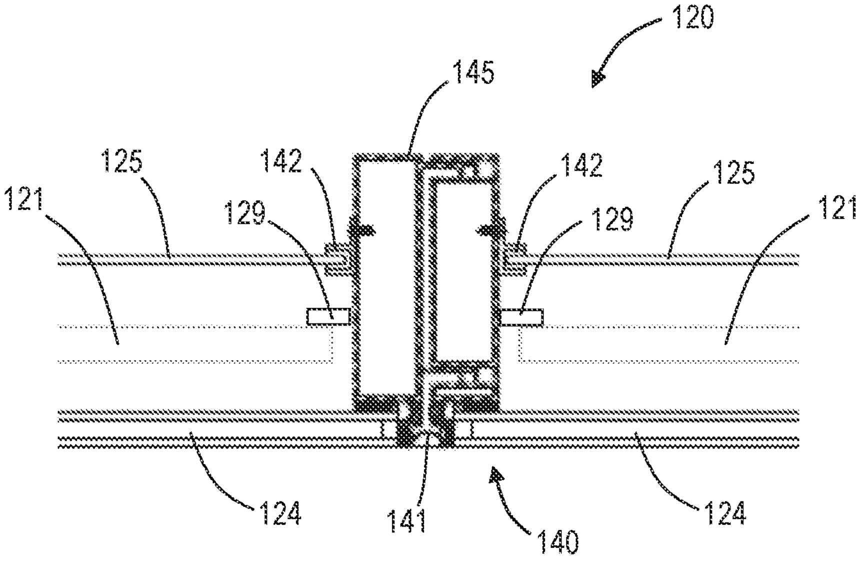
FIG. 6 is a schematic illustration of a partial cross-section of the microalgae curtain wall of FIG. 3 taken along the line VI-VI.

FIG. 2 is a partially exploded schematic illustration of an embodiment of the microalgae curtain wall of FIG. 1. FIG. 3 is a schematic illustration of an elevation of the microalgae curtain wall of FIGS. 1-2. FIG. 4 is a schematic illustration of a cross-section of the microalgae curtain wall of FIG. 3 taken along the line IV-IV. FIG. 5 is a schematic illustration of a partial cross-section of the microalgae curtain wall of FIG. 3 taken along the line V-V. FIG. 6 is a schematic illustration of a partial cross-section of the microalgae curtain wall of FIG. 3 taken along the line VI-VI.

In the embodiment illustrated in FIGS. 2-6, The photobioreactors 121 are suspended by transoms 130 between mullions 140 and between glass panels 124, 125.

In embodiments, and as shown in FIGS. 3-6, an exterior glass panel 124 is offset from an interior glass panel 125 forming an air cavity 128 therebetween within which the photobioreactors 121 are suspended. In embodiments, the interior glass panel 125 is a single pane of glass, while the exterior glass panel 124 is insulated panel, such as a dual pane glass panel with an air gap for insulation therein. However, other types and styles of glass panels for each of the interior glass panel 125 and the exterior glass panel 124 are also contemplated.

Referring to FIG. 5, the transom 130 includes interior glass support brackets 132 and exterior glass support brackets 137 mounted to a body 135 thereof. In embodiments, the body 135 is a single body, and in other embodiments, the body 135 is formed of two separate bodies joined together. The interior and exterior glass support brackets 132, 137 are adapted to support the interior and exterior glass panels 125, 124. In embodiments, the interior and exterior glass support brackets 132, 135 are adapted to form a seal with the interior and exterior glass panels 125, 124. In some embodiments, a single transom 130 is adapted to support the top of a first set of the interior and exterior glass panels 125, 124 and the bottom of a second set of the interior and exterior glass panels 125, 124. In another embodiment, separate transoms 130 are used.

In the embodiment illustrated, the transom 130 includes an upper photobioreactor support bracket 131 and a lower photobioreactor support bracket 133. While a single transom 131 is shown with both the upper photobioreactor support bracket 131 and the lower photobioreactor support bracket 133, in other embodiments, separate transoms 130 are used. The upper photobioreactor support bracket 131 of a transom 130 above the photobioreactor 121 and the lower photobioreactor support bracket 133 below the photobioreactor 121 are adapted to connect to the body 135 of the transom 130 and to suspend the photobioreactor 121 therebetween and to suspend the photobioreactor 121 with the air cavity 128 formed by the interior and exterior glass panels 125, 124.

In some embodiment, the transom 130 also includes an anchor 134 that extends into or adjacent to a building support structure 90, such as a floor of the building, and an anchor bolt 136 that is adapted to ensure that the transom 130 remains anchored to the building support structure.

The mullion 140 includes interior glass support brackets 142 and exterior glass support brackets 141 connected to a body 145 thereof In embodiments, the body 145 is a single body, and in other embodiments, the body 145 is formed of two separate bodies joined together. The interior and exterior glass support brackets 142, 141 are adapted to support the sides interior and exterior glass panels 125, 124. In embodiments, the interior and exterior glass support brackets 142, 141 are adapted to form a seal with the interior and exterior glass panels 125, 124. In the embodiment illustrated, a single mullion 140 is adapted to support a side of a first set of the interior and exterior glass panels 125, 124 and a side of a second set of the interior and exterior glass panels 125, 124. In another embodiment, separate mullions are used to support adjacent sides of two sets of the interior and exterior glass panels 125, 124.

In some embodiments, the mullion 140 is adapted to support the bottom of a second set of the interior and exterior glass panels 125, 124.

As can be seen in FIG. 6, in some embodiments, the mullion 140 and the photobioreactor 121 is adapted to form a gap therebetween. In embodiments, a localized bracket 129 is adapted to connect the photobioreactor 121 to the mullions 140, which provides further support for the photobioreactor 121 from the mullions 140, while maintaining the suspended nature of the photobioreactor 121 between the upper and lower transoms 130.

Referring again to FIG. 5, in embodiments, each of the air outlet line 101, microalgae inlet line 102, air inlet line 103, and microalgae outlet line 104 includes a valve 126 for controlling a flow therethrough. In some embodiments, the valves 126 are control valves that are adapted to be controlled by the controller 200.

In some embodiments, the microalgae curtain wall 120 is a modular component, where the photobioreactor 121, the interior and exterior glass panels 125, 124, the transoms 130 above and below the photobioreactor 121, and the mullions 140 on each side of the photobioreactor 121 are a modular, prefabricated component. In these embodiments, the bodies 135 of adjoining transoms 130 are adapted to connect together to form a single transom 130, and the bodies 145 of adjoining mullions 140 are adapted to connect together to form a single mullion 140.

In embodiments, various designs shapes, materials, and typologies are used for the photobioreactor 121. In the embodiment illustrated in FIGS. 2-6, the photobioreactors 121 include walls formed of at least a semitransparent material, such as a polymer (e.g. bioplastic, Polyethylene terephthalate) or glass (e.g. borosilicate, float), which are adapted to contain the microalgae. In the embodiment illustrated in FIGS. 2-6, the photobioreactor 121 includes an array of divided, diamond or circular shaped, bodies connected by tubes.

In embodiments, the photobioreactor 121 are one of screen types and louver/fin type, which result in the regulation of energy transfer between indoor and outdoor while balancing daylighting, view-out, and solar radiation, all while encouraging microalgae growth, $CO_2$ reduction, and $O_2$ generation.

Figure 7:
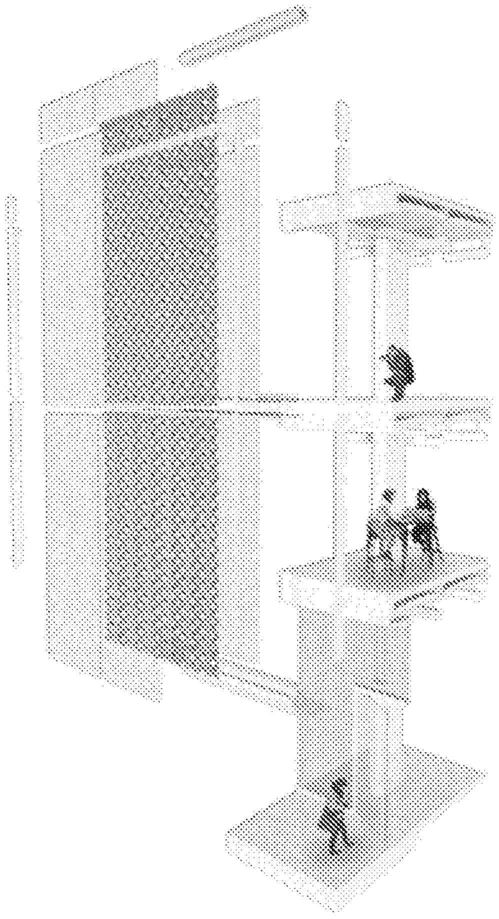
FIG. 7 is a partially exploded schematic illustration of an embodiment of the microalgae curtain wall of FIGS. 1-6.
Figure 8:
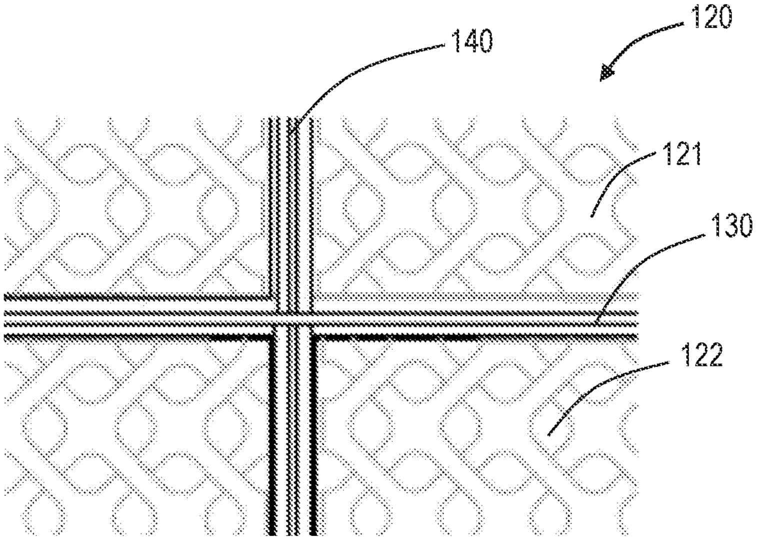
FIG. 8 is a schematic illustration of a partial elevation of the microalgae curtain wall of FIG. 7.
Figure 9:
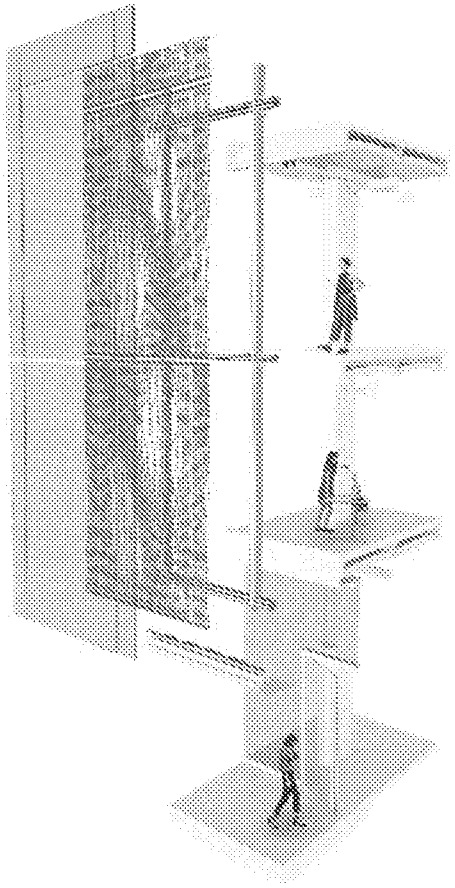
FIG. 9 is a partially exploded schematic illustration of an embodiment of the microalgae curtain wall of FIGS. 1-6.
Figure 10:
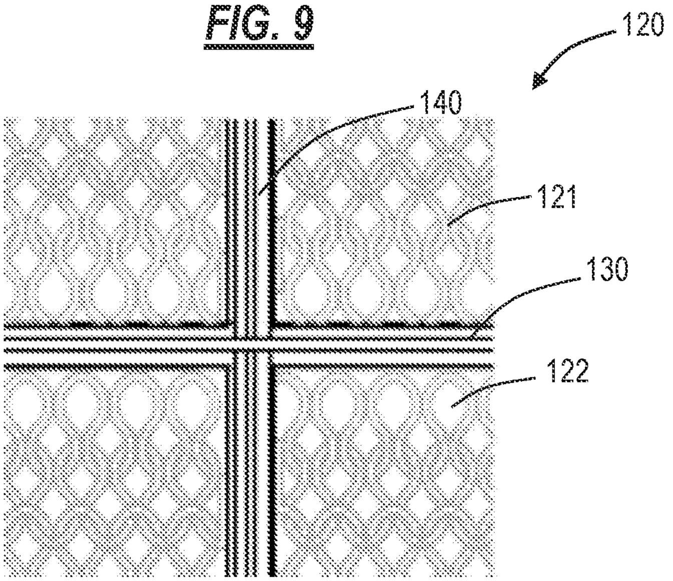
FIG. 10 is a schematic illustration of a partial elevation of the microalgae curtain wall of FIG. 9.

FIG. 7 is a partially exploded schematic illustration of an embodiment of the microalgae curtain wall of FIGS. 1-6. FIG. 8 is a partially exploded schematic illustration of a partial elevation of the microalgae curtain wall of FIG. 7. FIG. 9 is a partially exploded schematic illustration of an embodiment of the microalgae curtain wall of FIGS. 1-6. FIG. 10 is a partially exploded schematic illustration of a partial elevation of the microalgae curtain wall of FIG. 9.

FIGS. 7-10 illustrate varying shapes of the photobioreactors 121 in accordance with various embodiments. Referring to FIGS. 7 and 8, the photobioreactors 121 illustrated are suspended and formed of a continuous and plaited three-dimensional (3D) tubes that alternate between intersecting (fluidly connecting) and overlapping or interlocking (without fluidly connecting) to form a photobioreactor 121 array.

Referring to FIGS. 9 and 10, the photobioreactors 121 illustrated are suspended and are small, woven tubes that overlap with an adjoining weave, such as above and below (as shown) or with each weave to the sides thereof. In the embodiment illustrated, each weave is connected to the adjoining weave(s) on the sides thereof, adjacent to the mullions 140. In such a woven topology, a continuous watertight microalgae culture is contained while the density of wefts and warps of the weaves are adjustable to balance the solar exposure for maximum microalgae growth, access to view-out and daylighting potentials while regulating thermal and visual environments.

In embodiments, woven photobioreactors 121 are made of continuous flexible tubing while woven knots provide the geometric stability for the tubing as a photobioreactor. In embodiments, woven photobioreactors 121 are hung within the air cavity 128 as disclosed above. In other embodiments, the woven photobioreactors 121 are cast within resin, which is a glazing layer for the photobioreactors 121. The small diameter of tubing and its flexibility guarantee even solar exposure for microalgae growth.

Figure 11:
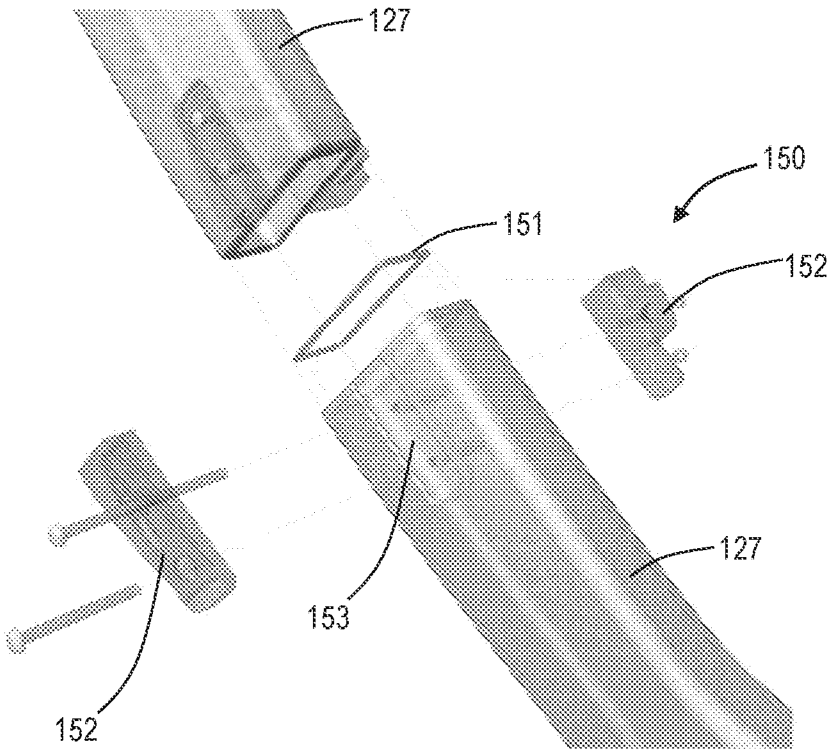
FIG. 11 is an exploded schematic illustration of a joint between adjoining photobioreactor components of the photobioreactor of FIGS. 1-10.

FIG. 11 is an exploded schematic illustration of a joint 150 between adjoining photobioreactor components 127 of the photobioreactor 120 of FIGS. 1-10. In embodiments, the joint 150 includes adjoining photobioreactor components 127, such as tubing, a gasket positioned between the adjoining photobioreactor components 127, a key 153 on each side of the photobioreactor components 127, and one or more brackets 152 adapted to fit within the keys 153 to hold the photobioreactor components 127 together with the gasket 151 held tightly therebetween so as to form a seal. In embodiments, the gasket 151 is formed of silicon. However, other materials are also contemplated.

Figure 12:
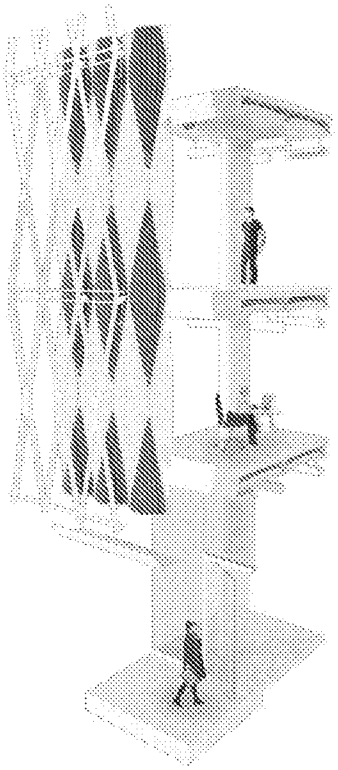
FIG. 12 is a partially exploded schematic illustration of an embodiment of the microalgae curtain wall of FIG. 1.
Figure 13:
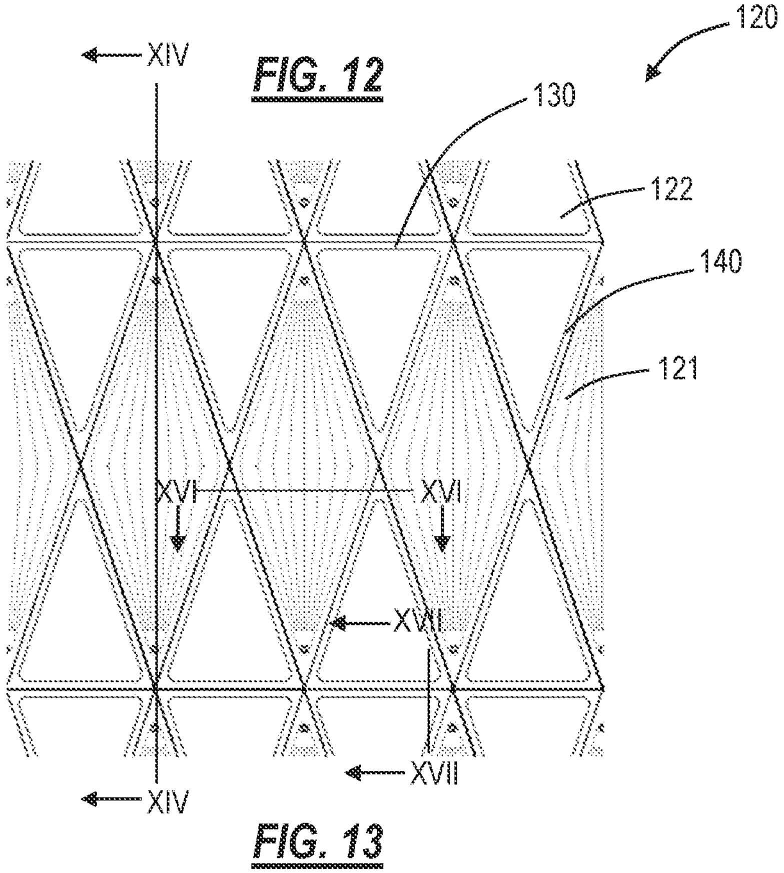
FIG. 13 is a schematic illustration of a partial elevation of the microalgae curtain wall of FIG. 12.
Figure 14:
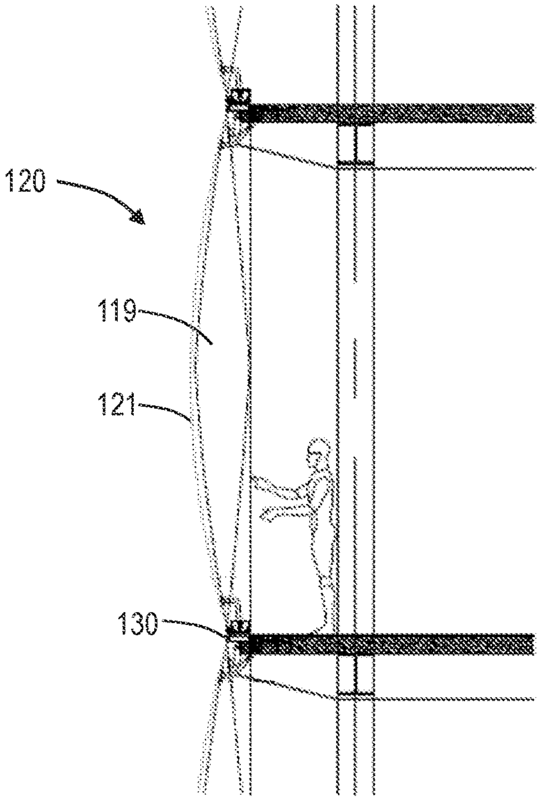
FIG. 14 is a schematic illustration of a cross-section of the microalgae curtain wall of FIG. 13 taken along the line XIV-XIV.
Figure 15:
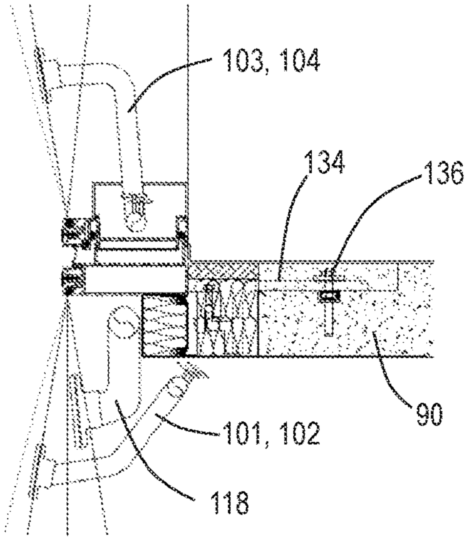
FIG. 15 is a schematic illustration of a partial cross-section of the microalgae curtain wall of FIG. 13 taken along the line XV-XV.
Figure 16:
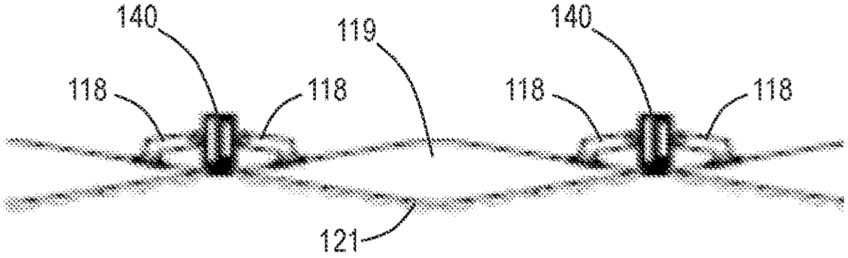
FIG. 16 is a schematic illustration of a partial cross-section of the microalgae curtain wall of FIG. 13 taken along the line XVI-XVI.

FIG. 12 is a partially exploded schematic illustration of an embodiment of the microalgae curtain wall of FIG. 1. FIG. 13 is a schematic illustration of a partial elevation of the microalgae curtain wall of FIG. 12. FIG. 14 is a schematic illustration of a cross-section of the microalgae curtain wall of FIG. 13 taken along the line IX-IX. FIG. 15 is a schematic illustration of a partial cross-section of the microalgae curtain wall of FIG. 13 taken along the line XV-XV. FIG. 16 is a schematic illustration of a partial cross-section of the microalgae curtain wall of FIG. 13 taken along the line XVI-XVI.

Referring to FIGS. 12-16, in embodiments, the microalgae curtain wall 120 includes transoms 130, mullions 140, photobioreactors 121, and inflatable pillows 119. In the embodiment illustrated, the photobioreactors 121 are supported from the top and bottom by transoms 130 and the mullions 140 form a crossing pattern that further supports the photobioreactors 121 by providing support for the inflatable pillows 119.

In embodiments, the inflatable pillows 119 include a body formed of a fluorine based plastic, such as Ethylene tetrafluoroethylene (ETFE) that is adapted to inflate. Air inlet lines 118 are adapted to supply air to the inflatable pillows 119 for inflation thereof. In embodiments, the microalgae system 100 includes a compressor for supplying the air thereto.

The photobioreactors 121 are positioned on an outer surface of the inflatable pillows 119, opposite the building. The photobioreactors 121 and the inflatable pillows 119 form separate, dissociated cavities. In embodiments, the photobioreactors 121 are integrated into the inflatable pillow 119. By integrating the photobioreactors 121 into the inflatable pillows 119, a primary enclosure with good structural, thermal, and solar performance is provided for the building. Further, the integration of photobioreactors 121 within the inflatable pillows 119 provides noise attenuation, such as for noise from rain droplets.

Figure 17:
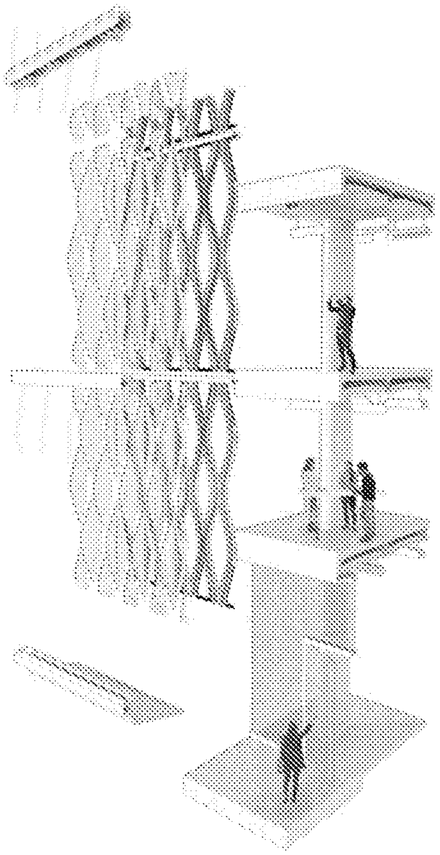
FIG. 17 is a partially exploded schematic illustration of an embodiment of the microalgae curtain wall of FIG. 1.
Figure 18:
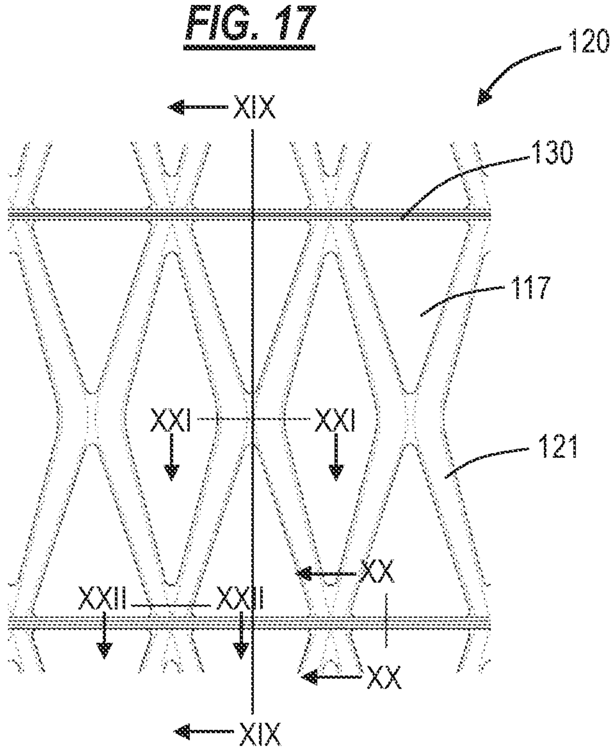
FIG. 18 is a schematic illustration of a partial elevation of the microalgae curtain wall of FIG. 17.
Figure 19:
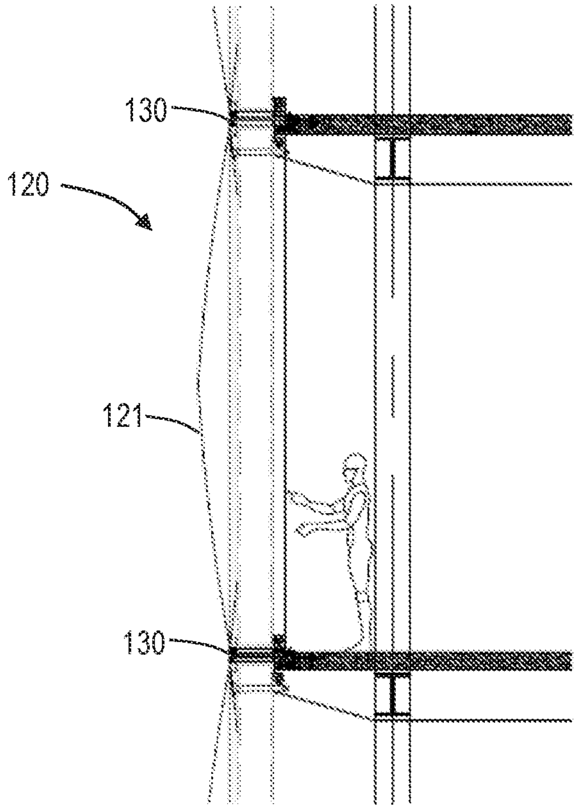
FIG. 19 is a schematic illustration of a cross-section of the microalgae curtain wall of FIG. 18 taken along the line XIX-XIX.
Figure 20:
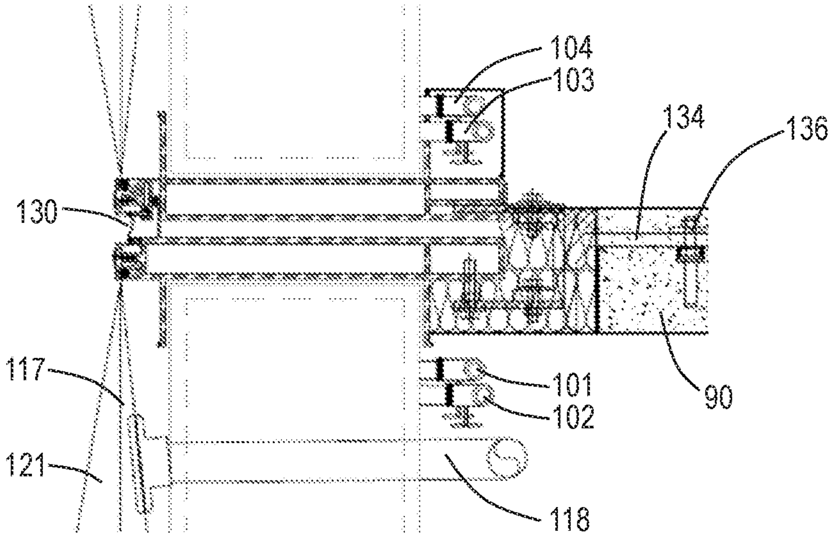
FIG. 20 is a schematic illustration of a partial cross-section of the microalgae curtain wall of FIG. 18 taken along the line XX-XX.
Figure 21:
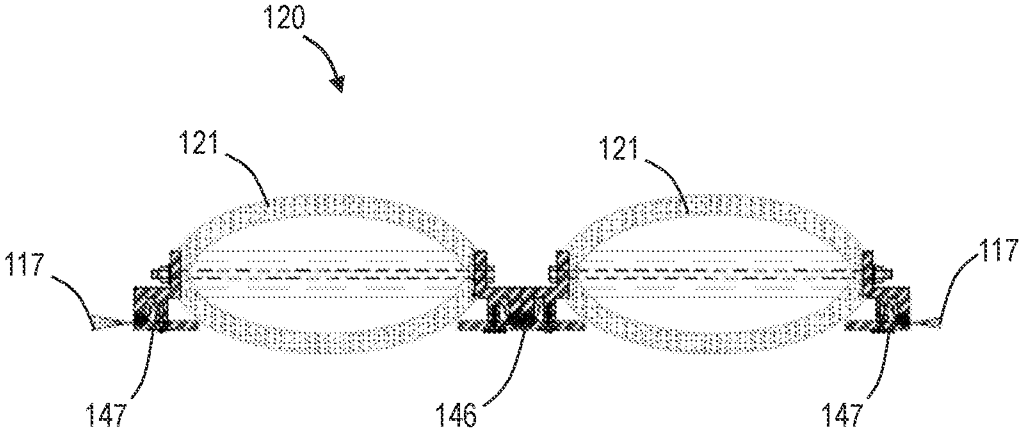
FIG. 21 is a schematic illustration of a partial cross-section of the microalgae curtain wall of FIG. 18 taken along the line XXI-XXI.
Figure 22:
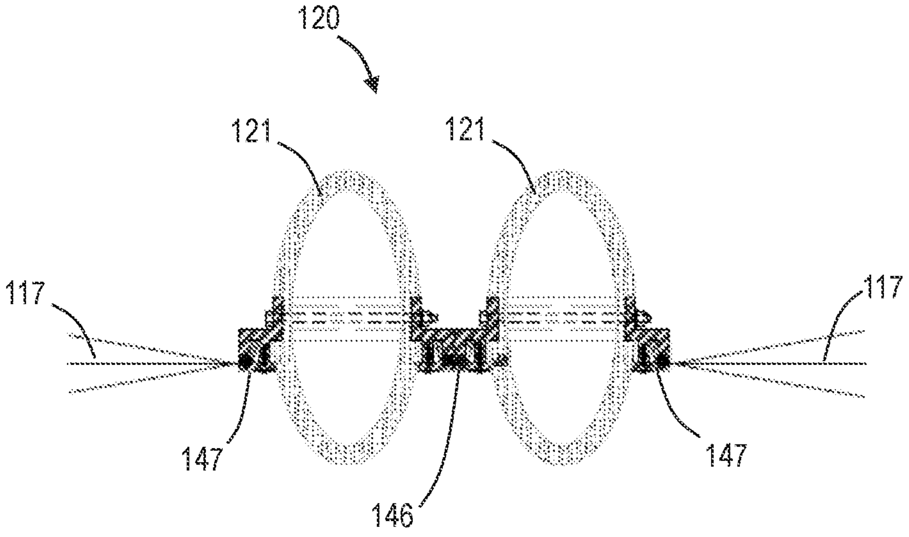
FIG. 22 is a schematic illustration of a partial cross-section of the microalgae curtain wall of FIG. 18 taken along the line XXII-XXII.

FIG. 17 is a partially exploded schematic illustration of an embodiment of the microalgae curtain wall of FIG. 1. FIG. 18 is a schematic illustration of a partial elevation of the microalgae curtain wall of FIG. 17. FIG. 19 is a schematic illustration of a cross-section of the microalgae curtain wall of FIG. 18 taken along the line XIV-XIV. FIG. 20 is a schematic illustration of a partial cross-section of the microalgae curtain wall of FIG. 18 taken along the line XX-XX. FIG. 21 is a schematic illustration of a partial cross-section of the microalgae curtain wall of FIG. 18 taken along the line XXI-XXI. FIG. 22 is a schematic illustration of a partial cross-section of the microalgae curtain wall of FIG. 18 taken along the line XXII-XXII.

Referring to FIGS. 17-22, in embodiments, the microalgae curtain wall 120 includes strands of photobioreactors 121 extending vertically between transoms 130. In embodiments the strands include an arced or wave shape and are connected to adjacent strands at the maximum/minimums of the arcs/waves. In particular, a middle edge adapter 146 is adapted to connect sections of the strands together. In embodiments, the strands of photobioreactors 121 are extrusions and form structural framing of the microalgae curtain-wall 120.

In embodiments, inflatable pillows 117 are adapted to fill the gaps between the strands of photobioreactors 121. In some embodiments, inflatable pillows 117 include a body formed of a fluorine based plastic, such as EFTFE that is adapted to inflate. Air inlet lines 118 are adapted to supply air to the inflatable pillows 117 for inflation thereof. In embodiments, side edge adapters 147 are adapted to connect the inflatable pillows 117 to the strands of photobioreactors 121, such as around a perimeter of the inflatable pillows 117.

As the inflatable pillows 117 are infilled between the photobioreactor extrusions, the inflatable pillows 117 can be adapted to provide view-out, daylight transmittance, waterproofing, airtightness, thermal insulation, and natural ventilation.

Figure 23:
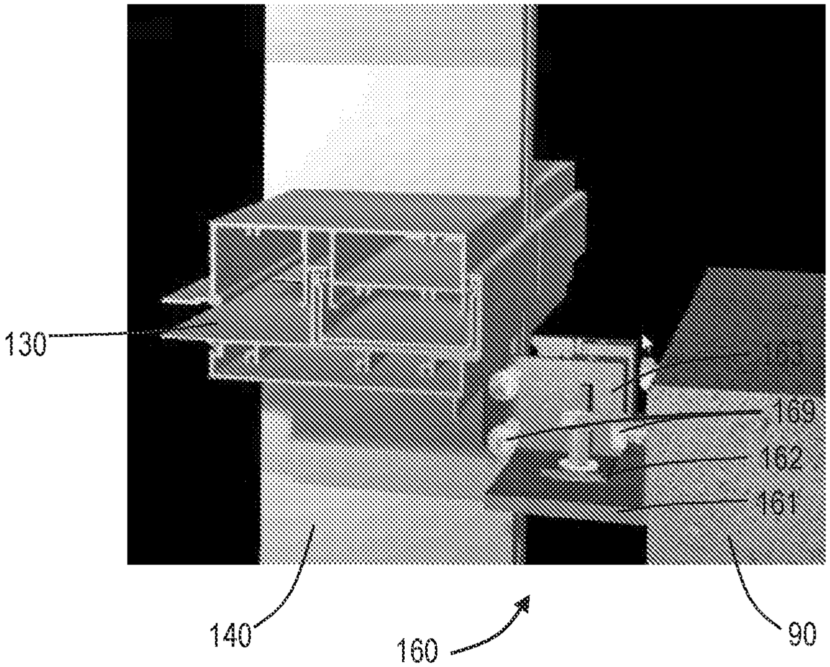
FIG. 23 is a schematic illustration of an embodiment of a mounting bracket assembly for the microalgae curtain wall of FIGS. 1-22.
Figure 24:
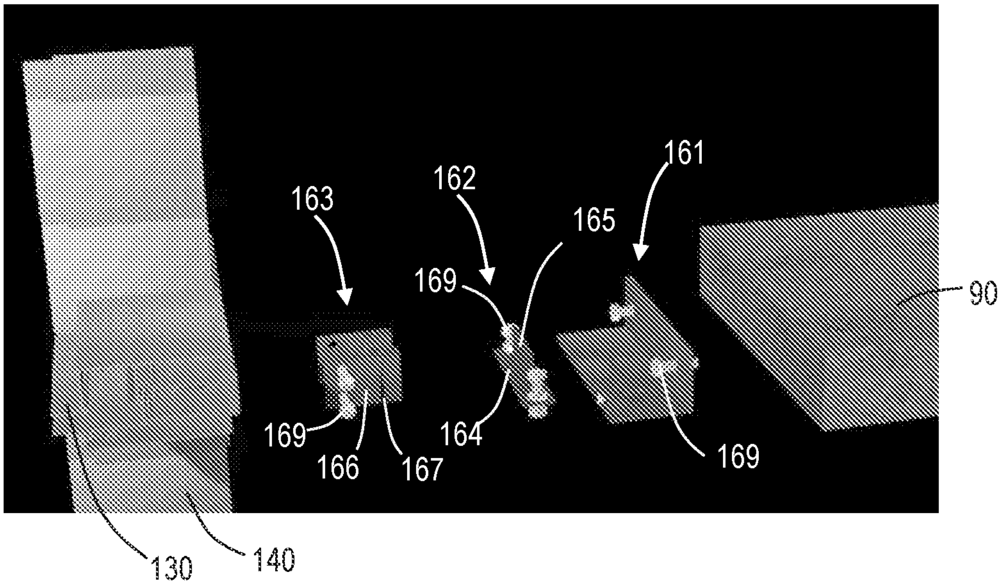
FIG. 24 is an exploded schematic illustration of an embodiment of a mounting bracket assembly for the microalgae curtain wall of FIG. 23.

FIG. 23 is a schematic illustration of an embodiment of a mounting bracket assembly for the microalgae curtain wall of FIGS. 1-22. FIG. 24 is an exploded schematic illustration of an embodiment of a mounting bracket assembly for the microalgae curtain wall of FIG. 23. Referring to FIGS. 23 and 24, in some embodiments, microalgae system 100 includes one or more mounting bracket assemblies 160 adapted to secure the microalgae curtain wall 120 to the building support structure 90.

In embodiments, the mounting bracket assembly 160 is adapted to receive and hold a portion of a mullion 140, such as the portion adjacent to a transom 130. In the embodiment illustrated, the mounting bracket assembly 160 includes an 'L' shaped bracket 161, a slider bracket 162, and a sliding bracket 163. However, other configurations are also contemplated. The 'L' shaped bracket 161 includes a vertical portion adapted to secure to the building support structure 90 by fasteners 169, such as bolts and includes a horizontal portion extending out from the vertical portion.

The slider bracket 162 includes a base 164 and a slider 165. The base is adapted to be joined to the horizontal portion of the 'L' shaped bracket 161 by fasteners 169. The slider extends upward from the base 164 and is adapted to slidably couple with the sliding bracket 163.

The sliding bracket 163 is adapted to receive and be fastened to the mullion 140 by fasteners 169 and is adapted to slidably couple with the slider bracket 162. In the embodiment illustrated, the sliding bracket 163 includes bracket arms 166 that are spaced apart and that receive the mullion 140 therebetween. Each bracket arm 166 includes a slot 167 that is adapted to receive the slider 165. In the embodiment illustrated, the bracket arms 166 are adapted to be transverse, such as orthogonal, to each of the base 164, the slider 165, and the vertical and horizontal portions of the 'L' shaped bracket 161.

Figure 25:
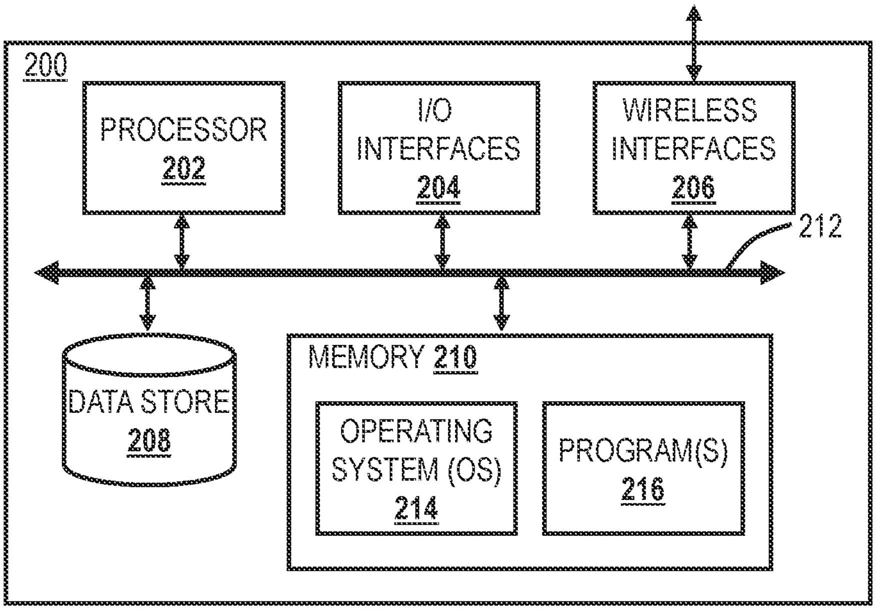
FIG. 25 is a block diagram of the controller of FIG. 1.

FIG. 25 is a block diagram of the controller 200 of FIG. 1. The controller 200 can be a digital device that, in terms of hardware architecture, generally includes a processor 202, input/output (I/O) interfaces 204, wireless interfaces 206, a data store 208, and memory 210. It should be appreciated by those of ordinary skill in the art that FIG. 25 depicts the controller 200 in an oversimplified manner, and a practical embodiment may include additional components and suitably configured processing logic to support known or conventional operating features that are not described in detail herein. The components (202, 204, 206, 208, and 202) are communicatively coupled via a local interface 212. The local interface 212 can be, for example, but not limited to, one or more buses or other wired or wireless connections, as is known in the art. The local interface 212 can have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chip set), or generally any device for executing software instructions. When the controller 200 is in operation, the processor 202 is configured to execute software stored within the memory 210, to communicate data to and from the memory 210, and to generally control operations of the controller 200 pursuant to the software instructions. The I/O interfaces 204 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like. The I/O interfaces 204 can also include, for example, a serial port, a parallel port, a small computer system interface (SCSI), an infrared (IR) interface, a radio frequency (RF) interface, a universal serial bus (USB) interface, and the like. The I/O interfaces 204 can include a graphical user interface (GUI) that enables a user to interact with the controller 200.

The wireless interfaces 206 enable wireless communication to an external access device or network. Any number of suitable wireless data communication protocols, techniques, or methodologies can be supported by the wireless interfaces 206, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The wireless interfaces 206 can be used to communicate with external networks for receiving command and control instructions as well as to relay data.

The data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. The memory 110 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 can include one or more software programs, each of which includes an ordered listing of executable instructions for implementing logical functions. In the example of FIG. 25, the software in the memory 210 includes a suitable operating system (O/S) 214 and programs 216. The operating system 214 essentially controls the execution of other computer programs and provides scheduling, input-output control, file and data management, memory management, and communication control and related services. The programs 216 may include various applications, add-ons, etc. configured to provide end-user functionality with the controller 200, including performing various aspects of the systems and methods described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 26:
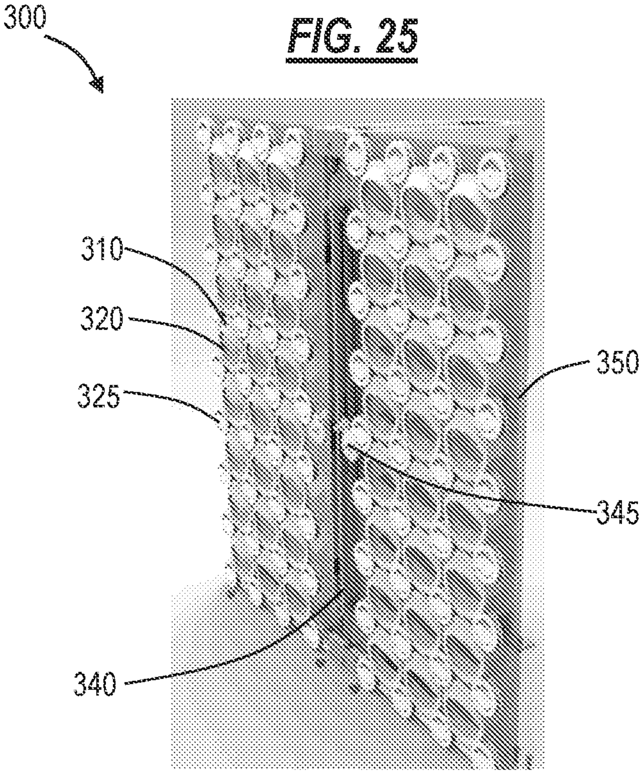
FIG. 26 is a schematic illustration of a micro-oculi building enclosure system.
Figure 27:
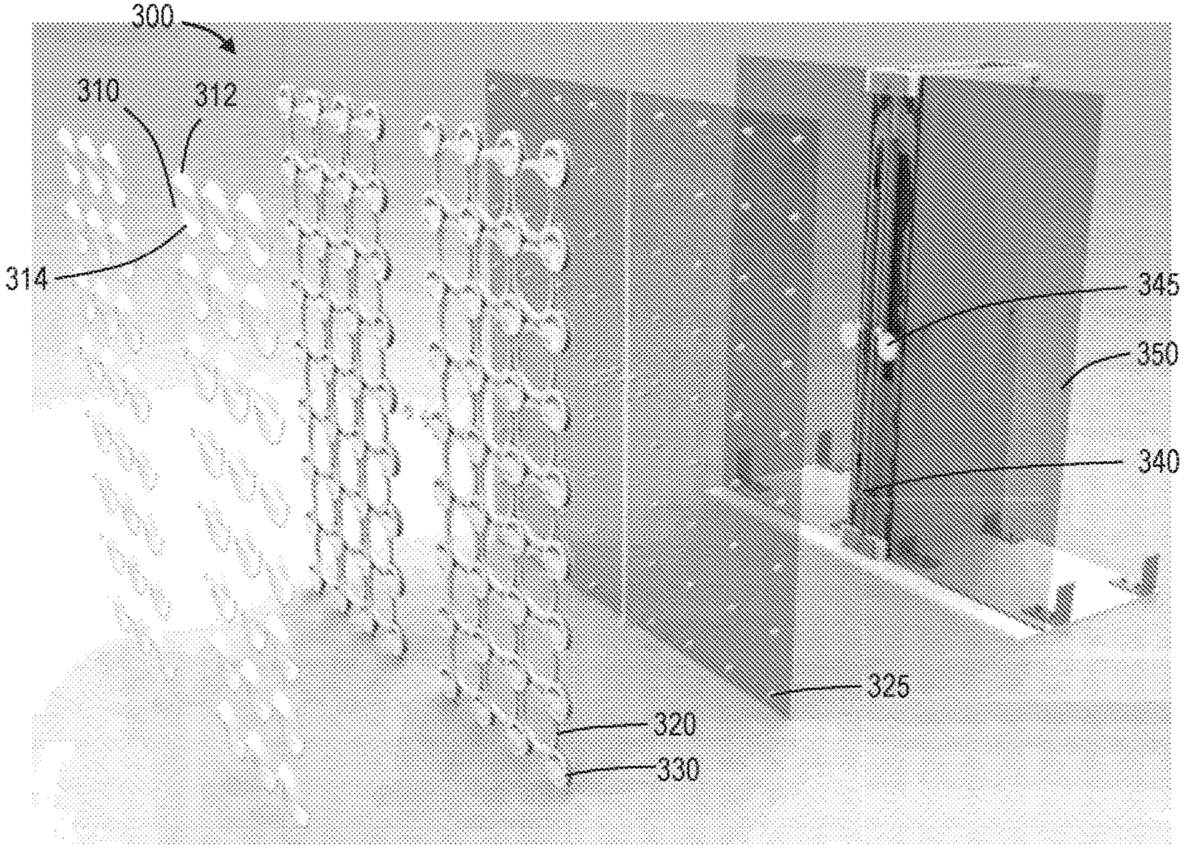
FIG. 27 is an exploded schematic illustration of the micro-oculi building enclosure system of FIG. 26.
Figure 28:
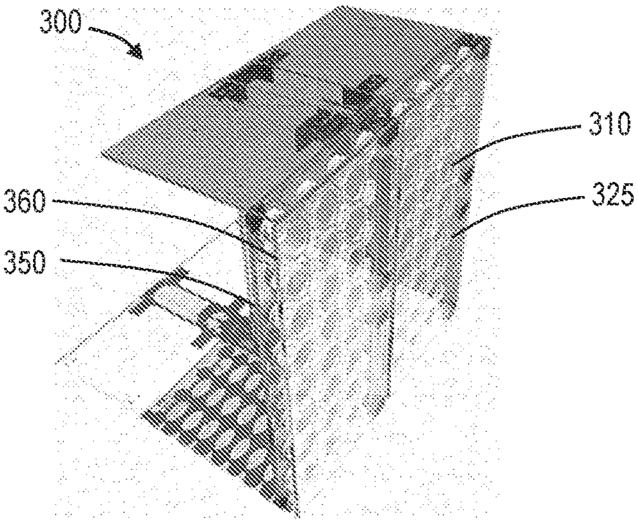
FIG. 28 is a schematic illustration of an embodiment of the micro-oculi building enclosure system of FIG. 26.
Figure 29:
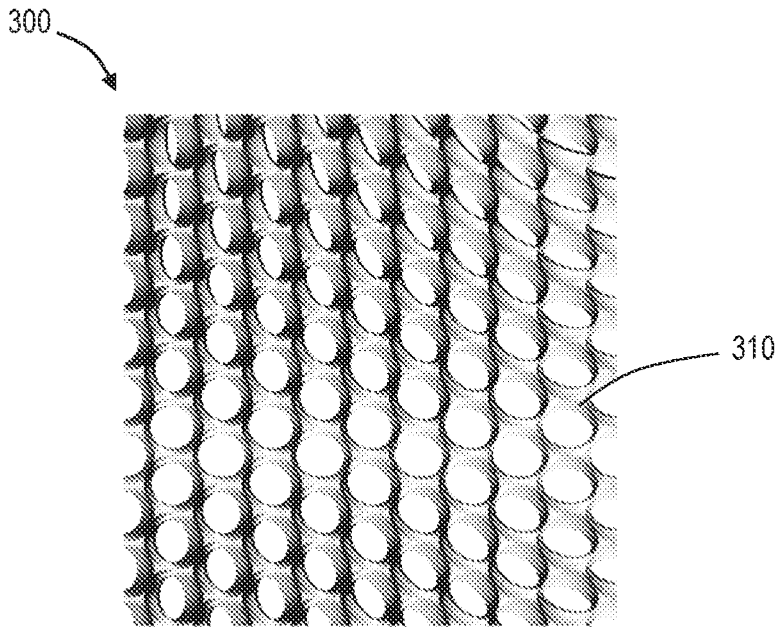
FIG. 29 is a schematic illustration of an alternate embodiment of micro-oculi building enclosure system of FIG. 26.

FIG. 26 is a schematic illustration of a micro-oculi building enclosure system 300. FIG. 27 is an exploded schematic illustration of the micro-oculi building enclosure system 300 of FIG. 26. FIG. 28 is a schematic illustration of an embodiment of the micro-oculi building enclosure system 300 of FIG. 26. FIG. 29 is a schematic illustration of an alternate embodiment of micro-oculi building enclosure system 300 of FIG. 26.

Referring to FIGS. 26-29, the micro-oculi building enclosure system 300 includes micro-oculus shaders 310. The micro-oculus shaders 310 are one of statically oriented, such as in the static system illustrated in FIG. 29, and adapted to dynamically rotate, such as in the dynamic system illustrated in FIGS. 26-28. The geometry and movements of kinetic micro-oculi device are optimized for solar gain, daylighting, and views, and in particular for solar power production. In embodiments, micro-oculi building enclosure system 300 is a prefabricated unit that serves as a primary building enclosure.

In embodiments, the micro-oculus shaders 310 are mounted on an interior glass pane 350. And in some embodiments, such as the embodiment illustrated in FIG. 28, the micro-oculus shaders 310 are mounted between an interior glass pane 350 and an exterior glass pane 360. In embodiments, the interior glass pane 350 and the exterior glass pane 360 form an insulated glass unit, which provides insulation for the building. Both the kinetic and static systems provide adequate thermal and structural performance, good daylight transmission, shading efficacy, longevity, as well as air tightness and water tightness in accordance with industry standards.

In embodiments, the micro-oculus shaders 310 include photovoltaic elements, such as organic photovoltaic elements, for solar energy production. Each of the micro-oculus shaders 310 includes an ocular shape with an upper shading portion 312 and a lower shading portion 314. The upper shading portion 312 protrudes outward from a circular base of the micro-oculus shader 310 in the axial direction relative to the base and at least partially toward the axis of the base. The lower shading portion 314 protrudes outward from the circular base of the micro-oculus shader 310 in the axial direction relative to the axis of the base and at least partially away from the axis of the base. In embodiments, the upper shading portion 312 and the lower shading portion 314 generally include a hollow cylindrical wedge shape with an axis that is at a different angle than that of the base.

The upper shading portion 312 is adapted to partially block light passing through the micro-oculus shader 310, while the lower shading portion 314 is adapted to reflect light passing adjacent to the micro-oculus shader 310.

In embodiments, the dynamic system includes a gear chain 340, at least one driving gear 345, oculus rotation gears 320, and interstitial rotation gears 330. The gear chain 340 is adapted to rotate the micro-oculus shaders 310. In particular, the gear chain 340 is adapted to rotate the driving gear(s) 345. Each driving gear 345 is adapted to drive rotation of one of an oculus rotation gear 320 and an interstitial rotation gear 330. In the embodiment illustrated, each driving gear 345 is in a geared relationship with an interstitial gear anchor 325. Each oculus rotation gear 320 is adapted to rotate a micro-oculus shader 310. While the oculus rotation gears 320 are shown as separate devices in the embodiment shown, in embodiments, the oculus rotation gear 320 and the corresponding micro-oculus shader 310 are unitary structure that is a single structurally formed entity.

The interstitial rotation gears 330 are positioned between adjacent oculus rotation gears 320 and are adapted to transmit rotation between the adjacent oculus rotation gears 320. In the embodiment illustrated, the interstitial rotation gears 330 are in a geared relationship with four oculus rotation gears 320 when positioned in an interior of the dynamic system, are in a geared relationship with two oculus rotation gears 320 when positioned along a side of the dynamic system, and in a geared relationship with one oculus rotation gear 320 when positioned at a corner of the dynamic system.

In the embodiment illustrated, each interstitial rotation gear 330 is rotationally mounted to one of the glass panes 350, 360 via a mounting pin 330, and the interstitial rotation gears 330 are adapted to hold the micro-oculus shaders 310 in place via the oculus rotation gears 320. With the rotation of the micro-oculus shaders 310, an amount of light passing therethrough and into the building is controllable.

Further, with integrated photovoltaic elements, the micro-oculus shaders 310 can be rotated to the optimum angle for energy production.

Figure 38:
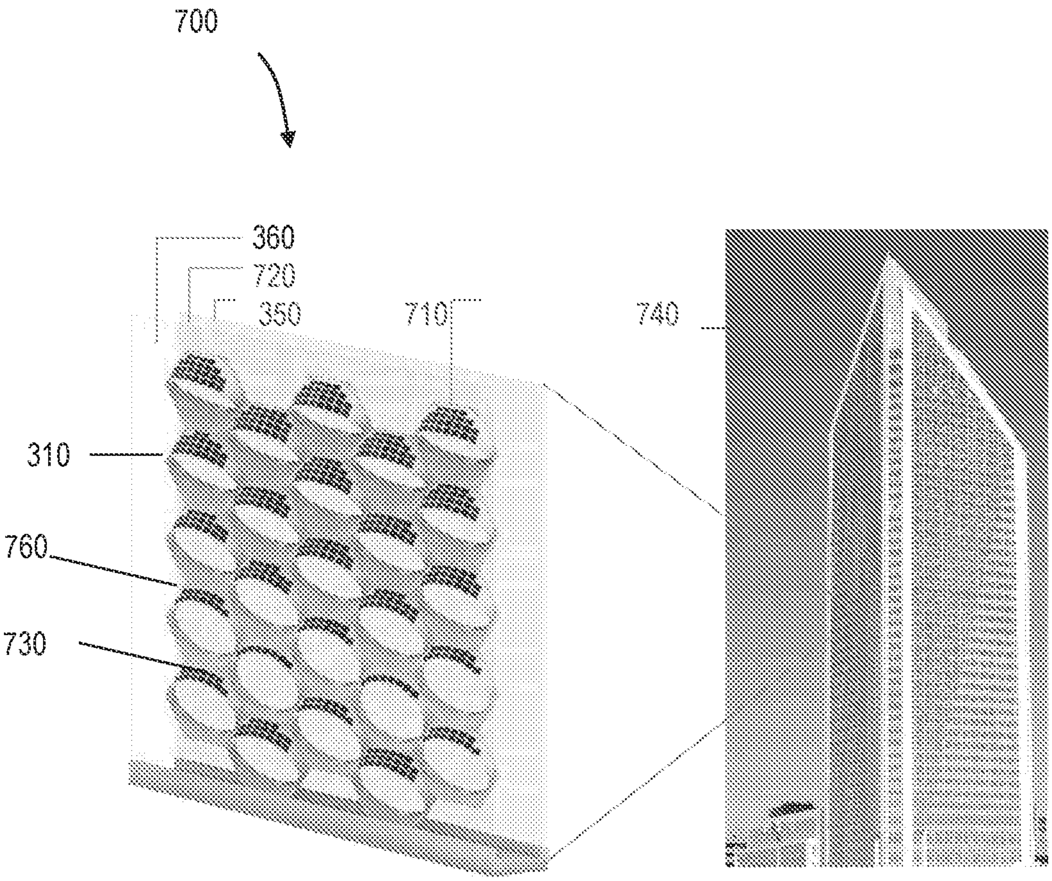
FIG. 38 is a schematic illustration of a photovoltaic curtain wall system.

Building upon the foregoing embodiments and as noted above with particular reference to FIG. 26-29, and as further shown in FIG. 38, the present disclosure thus provides a photovoltaic curtain wall system 700 comprising: a three-dimensional (3D) solar module 710 configured to receive sunlight and reflect the sun path geometry; an interior glass unit 350 comprising a single or a double glass panel; and an exterior glass panel 360 offset from the interior glass unit 350 forming a gap therebetween, wherein the gap is a conditioned, closed air cavity 720 receiving the solar module 710. The solar module 710 comprises rotatable or fixed micro-oculus shaders 310 with varying angles or curvatures, each micro-oculus shader 310 including an ocular shape with an upper surface/shading portion 312 and a lower surface/shading portion 314, the upper shading portion 312 protruding outward from a circular base of the micro-oculus shader 310 in the axial direction relative to the base and at least partially toward the axis of the base and the upper shading portion 312 includes photovoltaic elements 730 on a top portion of the upper shading portion 312; and the lower shading portion 314 protruding outward from the circular base of the micro-oculus shader 310 in the axial direction relative to the axis of the base and at least partially away from the axis of the base. The photovoltaic curtain wall system 700 also comprises a transom holding the interior glass unit 350 and the exterior glass panel 360 therebetween; wherein the photovoltaic curtain wall system 700 is a prefabricated curtain wall system configured to be integrated with a building 740.

Figure 39:
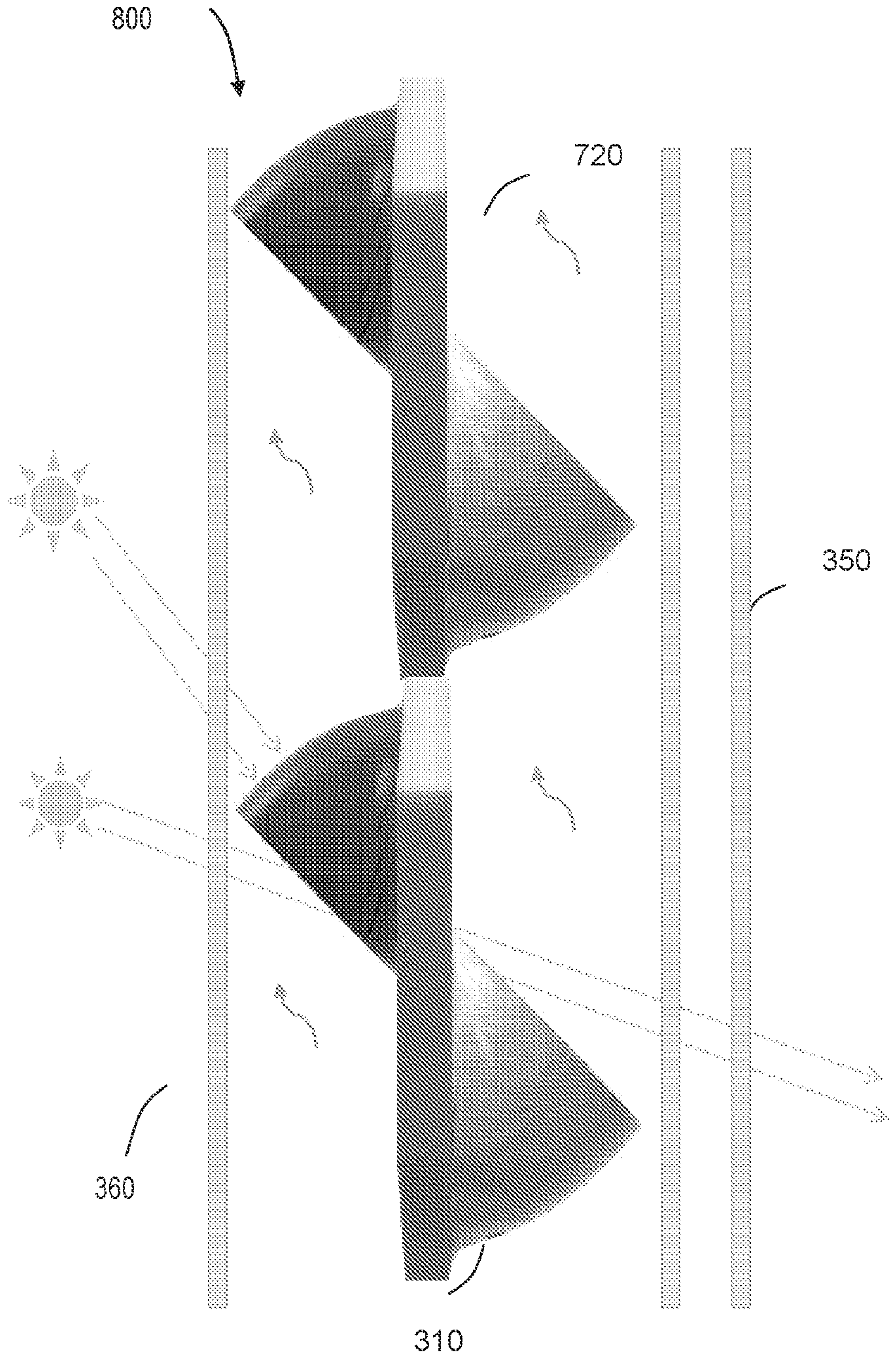
FIG. 39 is a schematic illustration of a system encapsulating the three-dimensional (3D) solar module including micro-ocular shaders.

FIG. 39 is a schematic illustration of system 800 encapsulating the three-dimensional (3D) solar module 710 including micro-ocular shaders 310 inside closed-air cavity 720 and between interior glass unit or panel 350 and exterior glass panel 360.

Figure 40:
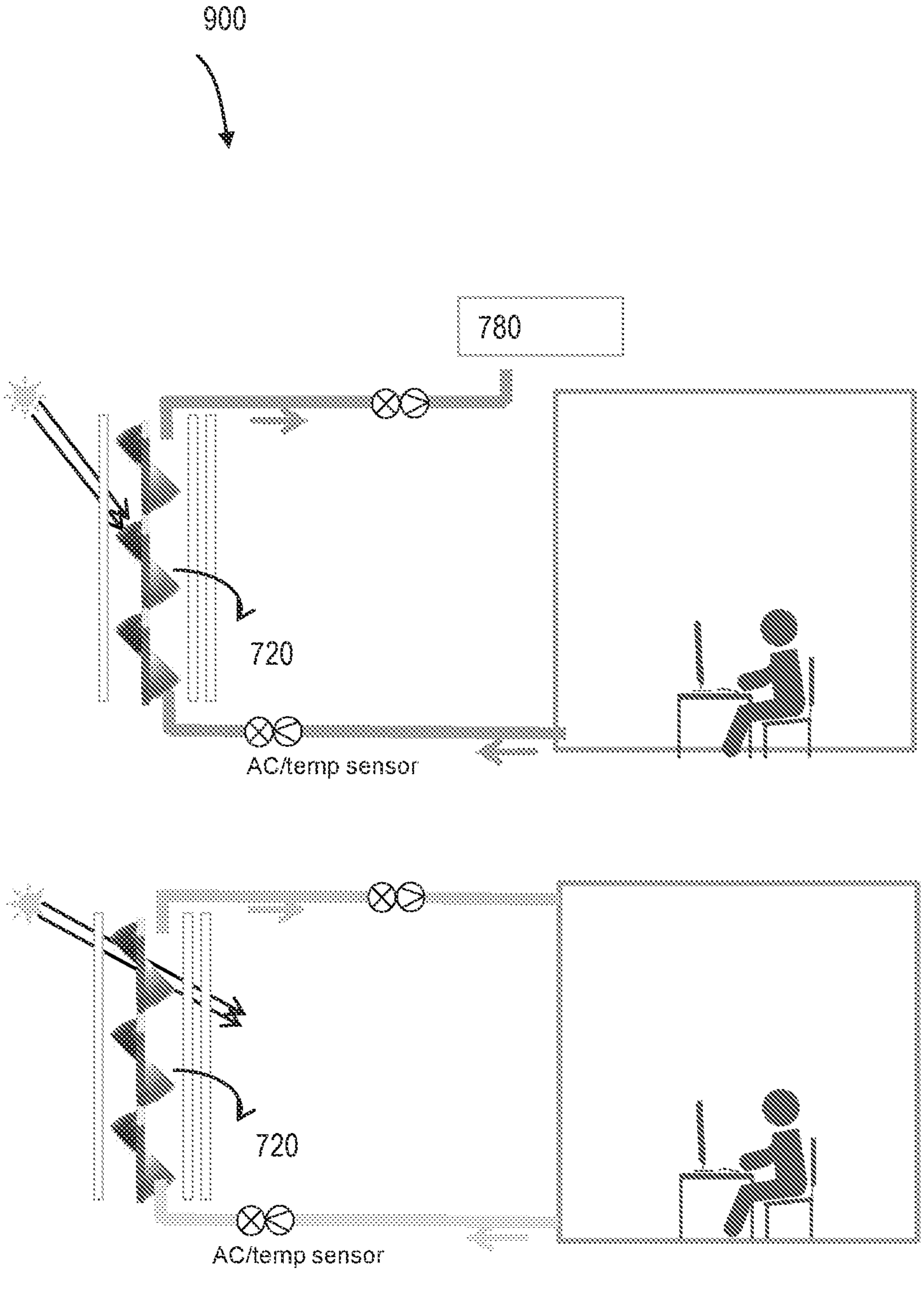
FIG. 40 is a schematic illustration of a system integrated within a closed air cavity system.

Similarly, FIG. 40 is a schematic illustration of building integrated photovoltaic system (BIPV) 900 depicting reclaimed solar energy for water heating (top) and reclaimed solar energy for space and water heating (bottom). As shown in FIG. 40, system 900 is integrated within a closed air cavity system where the solar cells/micro-ocular shaders 310 are installed in the conditioned air cavity 720 to improve the conversion efficiency and longevity by preventing heat build-up, dust accumulation, and moisture infiltration. The closed air cavity 720 is supplied with conditioned air as needed; heat recovery from returned room air. As shown in FIG. 40 (top) in embodiments, reclaimed solar energy is directed to water heater 780 for water heating. Similarly, as also shown in FIG. 40 (bottom), in embodiments, reclaimed solar energy is directed for space and water heating. A balance of summer solar blocking, winter solar gain, and year-round daylight illumination advantageously may be achieved.

As explained in further detail below, advantages of such embodiments include cooling of the cells/micro-ocular shaders 310, no moisture buildup or dust accumulation, optimized shading and daylighting, winter sunlight penetration and view out.

Thus, according to embodiments, a 3D BIPV facade may comprise a single pane glass 360 at the exterior side of the assembly and insulated glass unit (IGU) 350 at the interior side of the assembly and a closed-air cavity 720 created by the external glass pane 360 and the internal IGU 350. In embodiments, the 3D solar module 710, a network of solar cell units/micro-ocular shaders 310, are suspended in the closed-air cavity 720 where the photovoltaic cells are protected against harsh outdoor environments. In embodiments, the network of solar cell units/micro-ocular shaders 310 are attached to/integrated with the inner, glass panel/IGU 350. In embodiments, the facade is configured as a prefabricated curtainwall system for speedy installation and quality control.

As the sun constantly moves from the east and west during the day and its altitude and azimuth change across the seasons, the geometry of the solar unit mimics the sun's path to maximize solar exposure to produce electricity while regulating solar gains and penetrating daylight, according to embodiments. Thus, the solar module 710 blocks the summer sun and admits the winter solar gain. It is believed that the curved solar unit following the sun path diagram yields better energy performance compared to a traditional flat BIPV window. The closed air cavity offers optimum environments for the solar module 710, keeping away from HAM (heat, air, and moisture) and dust accumulation and leading to the longevity and performance of the solar module 710.

Moreover, it has been observed that while the closed cavity system yields high performance for the photovoltaic cell, it may cause condensation in the air cavity in winter and heat build-up in summer. In embodiments, an active system to condition the air cavity while optimizing solar module geometry and cavity dimensions depending on different climate zones and building orientations may be employed. For example, an integrated multi-objective optimization using a genetic algorithm and Energy Plus performance simulation to estimate energy savings and power production may be employed.

Referring again to FIG. 38, FIG. 38 is a schematic illustration of a photovoltaic curtain wall system 700, prefabricated for speedy building installation and quality control. The depicted facade system balances photovoltaic electricity generation, solar heat gain, daylighting and view out. In embodiments and also shown in FIG. 38, it is built on a hexagonal grid 760 with an array of circular openings. The geometries of the 3D solar modular 710 may be parametrically controlled such that the overall performance can be optimized based on different climate conditions and facade orientations.

Figure 41:
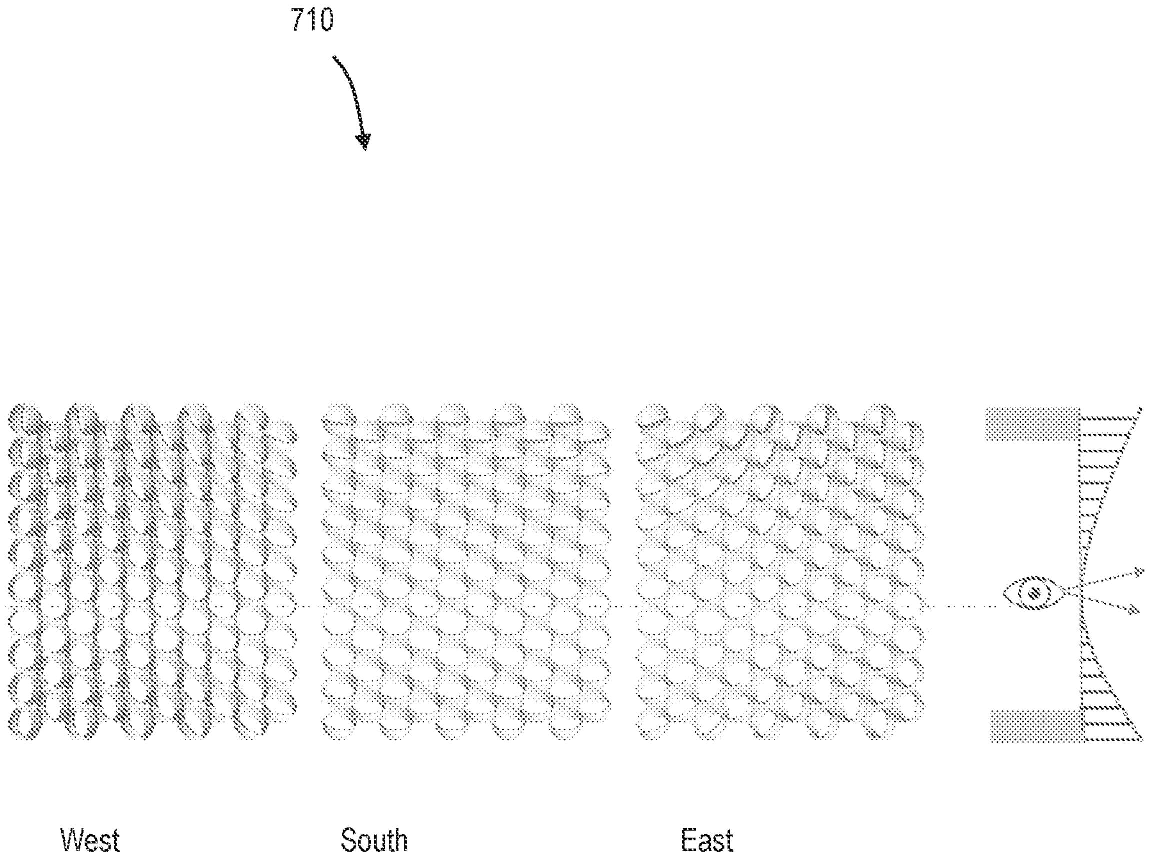
FIG. 41 is a schematic illustration of 3D solar modular facing different orientations, west (left), south (middle), and east (right) elevations.

For instance, FIG. 41 is a schematic illustration of 3D solar modular 710 facing different orientations, west (left), south (middle), and east (right) elevations; it balances solar energy production, energy savings, and user satisfaction through solar regulations, year-round daylight penetration, and view to outside. The 3D solar modular 710 advantageously combines solar-responsive design principles to provide optimal shading efficacy and solar exposures based on orientation. Between the south and east/west facades, the geometries smoothly transform from horizontal to vertical. In addition, to provide occupants with maximum view-out, in embodiments the openings at eye level are larger and gradually reduced to the size for optimum shading when moving up to the ceiling and down to the floor. In embodiments, eye level may be measured from between about 5 feet to about 6.5 feet above a floor surface, for example.

In embodiments and as also shown in FIG. 38, each cell or micro-ocular shader 310 is connected in an array and has a hexagonal shape containing upper surface/shading portion 312 and lower surface/shading portion 314. The upper surface 312 functions as a shading device while generating electricity with photovoltaic cells/elements 730 that are installed on the top of the surface. The photovoltaic cells/elements are made of any suitable photovoltaic material and in any desired shape. For example, suitable materials may include thin film PV semiconductor materials or other suitable semiconductor material, cadmium telluride materials, copper indium gallium diselenide etc. Typically, a plurality of rectangular photovoltaic cells/elements 730 are arranged on the top of upper surface 312. The curvature of the upper surface 312 is parametrically controlled to optimize electricity generation based on the solar altitude of the building location.

Figure 42:
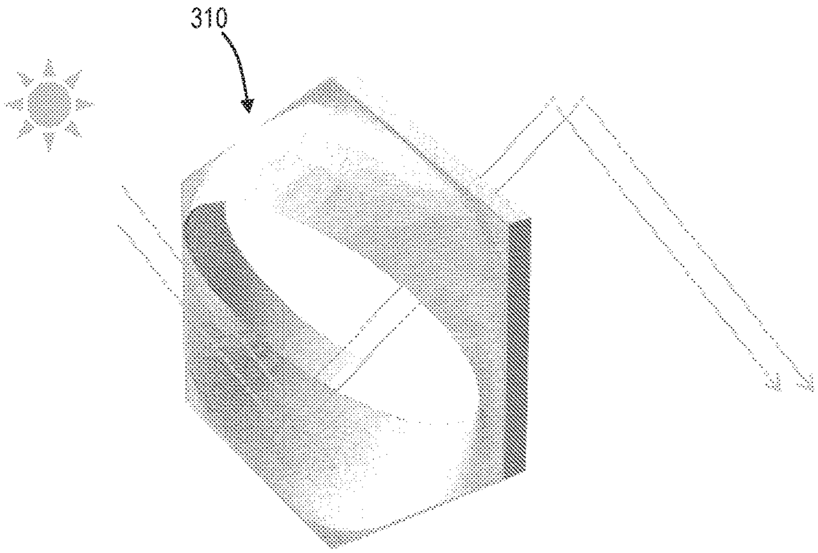
FIG. 42 is a schematic illustration of micro-ocular shader/cell depicting various curvatures.
Figure 42:
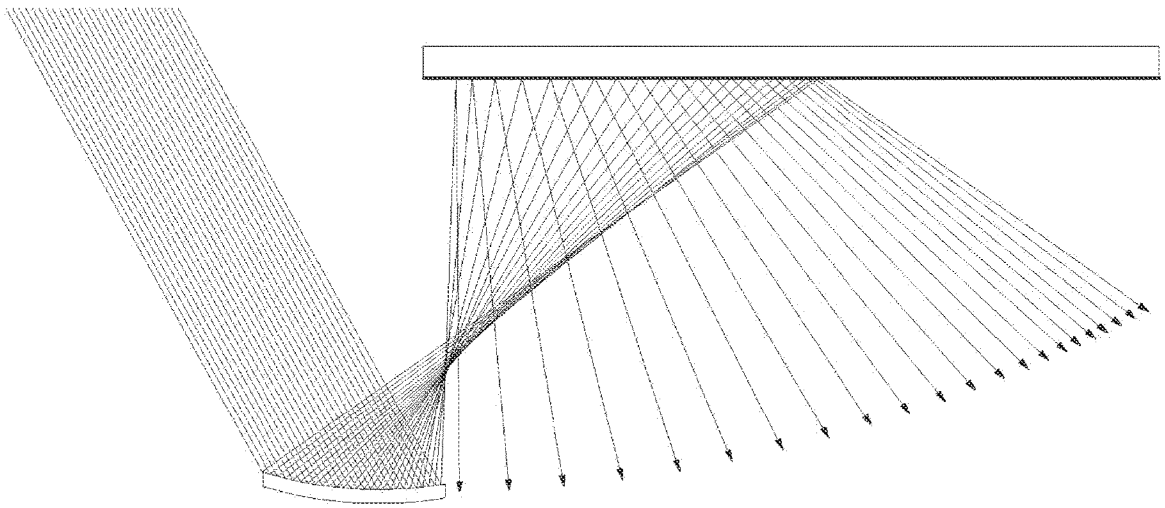

FIG. 42 schematically illustrates micro-ocular shader/cell 310 depicting various curvatures of the upper surface/shading portion 312 integrated with the polyvoltaic cells/elements 730 to adapt to different facade orientations and climate conditions. As shown in FIG. 42, the rectangles represent sections of polyvoltaic cells/elements 730 and the arrows represent the normal direction of the cells. When the normal of the polyvoltaic cells/elements 730 is aligned with the sun angle, the polyvoltaic cells/elements 730 are at their maximum efficiency. Therefore, the curvature of the upper surface 312 can be effectively changed depending on solar positions when each cell can produce the maximum electricity. For instance, in embodiments, the lower surface/shading portion 314 of a hexagonal micro-ocular shader/cell 310 can function as a light shelf to redirect visible light deeper into the space, as also shown in FIG. 42. For a traditional light shelf, the sunlight landing on a flat panel is reflected onto the ceiling, and is reflected again by the ceiling deeper into the space. In embodiments, the curvature of the lower surface 314 is parametrically controlled to improve daylighting quality. Convex and concave light shelves can bring daylight into the space deeper with a wider spread compared to conventional flat light shelves. While the convex light shelf can effectively bring light deeper into the space, the concave light shelf can distribute more light toward the space further away from the window where more daylight is needed. Thus, embodiments have the potential to effectively distribute daylight to where it is needed.

EXAMPLE/EXPERIMENTAL

Figure 43:
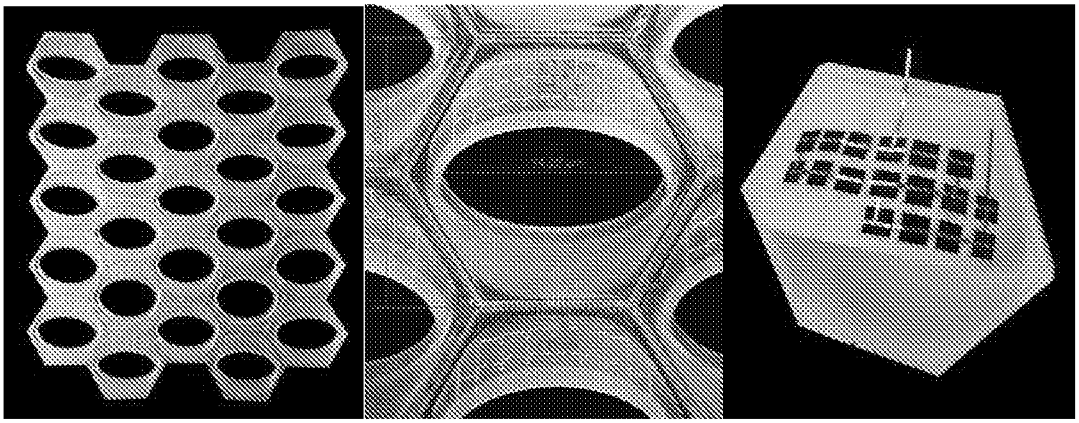
FIG. 43 depicts 3D printed twenty-five oculi units.

Additive manufacturing technology was employed to prototype and test twenty-five oculi units. FIG. 43 depicts 3D printed twenty-five oculi units/shaders 310 using clear rein (see, left). Each hexagonal solar unit measured 12.20 cm (h)×14.22 cm (w) and was interconnected to form a network of the multi-functional solar module 710. The solar units had adjustable opening sizes for view-out and the upper surface of the unit allowed a maximum of twenty-six and a minimum of eight 1 cm×1 cm micro solar cells to be installed. In order to ensure the proper placement of micro solar cells and their wiring, a novel approach was employed that incorporated inset surfaces and grooves. These geometric features provide a precise registration point that allows the solar cells to be installed in the correct locations while ensuring secure soldering connections.

Construction tolerance is an important consideration to ensure solar cell installation within the inset surface. To accommodate material and fabrication tolerances, the insets on the physical model for the solar cells to be inserted into are 110% of the cell size (FIG. 43, middle), with connecting groves on all sides which allow various configurations of cell soldering connections. In addition, a 0.22 cm wide grove for the wire path is embedded along the border of each oculus unit (FIG. 43, right). Due to the unique geometry of each of the solar units, 3D printing the entire prototype was selected as the method for physical prototyping. The units were printed one at a time by a Form 2 printer (FormLabs) using clear resin. The thickness of the units is optimized both for achieving a short printing time and ensuring surface properties for assembly. The average printing time for the prototype/test was 5.5 hr/unit, and each unit needed an average of 60 ml liquid resin including model supports automatically generated for printing.

For the test, two generic office buildings with a 3D BIPV facade and a flat vertical BIPV facade on the south-facing wall were modeled in Rhino software to simulate how the 3D BIPV façade outperforms the flat vertical BIPV on power production. To compare the power output results of the 3D BIPV facade with the traditional BIPV flat window, a vertical PV surface facing towards the south, with an area equal to the total PV cells area in the 3D BIPV window was modeled. The geographical location of the test analysis building was set to be the city of Charlotte in the state of North Carolina, U.S.

Equinoxes and solstices are four key days during the year that can provide insight into the solar power potential of the BIPV facades, and therefore, these four days were chosen for the analysis period. By analyzing these four seasonal days, an understanding of the amount of solar energy produced by the system throughout the year may be gained. Hourly average irradiance on the PV cells was simulated in those four days, using Grasshopper, Ladybug (LB), and ClimateStudio (CS) plugins. The analysis grid size of the LB incident radiation component was set to 1 cm which is the same size as the PV cells of the physical prototype, allowing for accurate results and fast simulation process.

Higher conversion efficiency of the solar module and its improved longevity result in lower electricity costs and a quick return on investment. In other words, the initial investment in BIPV systems can be quickly recouped through substantially lower electricity bills during the building use phase, contributing to economic and environmental sustainability. Conventional BIPV windows have been placed in vertical surfaces, but their power production has been limited due to the cosine effect. The cosine effect reduces conversion efficiency when sunlight is not perpendicular to the surface of the BIPV, limiting the amount of energy that can be collected and converted into usable electricity.

Figure 44:
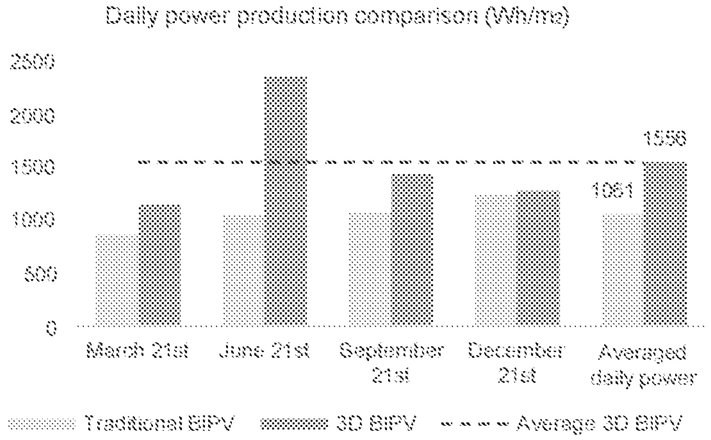
FIG. 44 is a schematic illustration of a Chart depicting a power output comparison.

Thus, to minimize cosine loss and maximize annual energy production, embodiments of the herein invention, incorporate sun path-like curved geometries, which are optimized for the more prevalent summer design day, thereby providing more energy-efficiency than a traditional BIPV system, as demonstrated by FIG. 44. FIG. 44 is a chart depicting daily power production comparison of a traditional BIPV system and embodiments of the invention.

As shown in FIG. 44, testing/experimental results indicated that embodiments of the herein 3D BIPV facade outperformed during the solstice equinoxes and the power production improvement was significantly higher during the summer solstice. FIG. 44 is a schematic illustration of Chart 1100 depicting power output comparison of a system in accordance with embodiments and a traditional system. Assuming that the polyvoltaic (PV) cells have 18% efficiency, the 3D BIPV facade outputted a daily average of 1556 Wh/m2 energy while the traditional vertical PVs generated 1016 Wh/m2 during the experimental analysis period/testing, equivalent to an average of 31.9% greater power production year-round compared to the counterpart. In comparison to a flat, conventional BIPV system, embodiments of the herein BIPV facades yielded 55.2% greater power production during summer seasons, about 25% during equinox seasons, and 2.5% during winter seasons.

The testing/analysis confirms that a 3D-shape reflecting various solar paths as described herein improves both architectural and energetic performances. Thus, embodiments of the herein described systems can advantageously accommodate the changing sun angles throughout the day and provide maximum solar harnessing while still regulating solar gains and allowing sunlight to enter a building, resulting in increased energy savings. Again, FIG. 44 presents energy production comparisons between embodiments of the inventive system and a flat BIPV vertical façade thereby demonstrating the superior and unexpected results of embodiments of the invention.

Accordingly, embodiments of the invention can provide a sustainable solution to reduce the carbon footprint and help achieve a net zero energy goal. By integrating solar modules within a window assembly, embodiments of the invention not only provide energy savings but also improve the comfort level of interior spaces. The herein described 3D BIPV facade is an innovative way to help achieve carbon-neutral net zero energy buildings, according to embodiments.

In embodiments and as described above, the herein described 3D system includes a network of solar units/micro-oculus shaders 310 with varying angles that balance power production, building energy efficiency, and view out. Because the path of the sun moves along with the spherical surface, the herein described solar unit geometry takes into account the path of the sun, allowing maximum solar exposure throughout the day and across all seasons. In embodiments and testing, the herein described BIPV facades yielded an average of 31.9% more power production year-round compared to their counterparts. During summer seasons, the facades produced 55.2% more power than a conventional BIPV system, 25% more during equinox seasons, and 2.5% more during winter seasons.

Accordingly, embodiments offer a unique approach to solar module protection by installing them in a closed air cavity created between two panes of glass. This closed air cavity is conditioned to prevent heat build-up, moisture penetration, and dust accumulation on solar cells, thus providing the solar modules with higher power production and system longevity. In addition, it is expected to yield high thermal attributes, shading efficacy, and daylighting penetration, reducing heating, cooling, and artificial lighting load respectively. Unlike a traditional BIPV facade, in embodiments, the 3D BIPV façade offers an improved user experience by providing view contact with the outside and better sound insulation. Other advantages include clean power production, building energy conservation, and user healthy and well-being attributes.

Further to the above and in embodiments, an optimum circuit connection of the herein described BIPV façade systems have been determined. As further described below, experimental tests conducted indicated that the maximum power generation occurred when the circuit connection between cells within a string is series, and the circuit connection between the strings within a PV panel is parallel. Results of the experimental tests showed that the series-parallel circuit connection increases the energy yields of the herein BIPV facades 71 times in real-world applications. Comparison analysis of Ladybug energy simulations and Grasshopper analysis recipe power output showed that the developed Grasshopper script will increase the BIPVs energy yields by 90% in simulations.

EXAMPLE/EXPERIMENTAL

Accordingly, to define the optimum circuit connection of the BIPV facade system according to embodiments, considering irradiance nonuniformity on the PV surface, the irradiance levels on the PV cells were simulated using Grasshopper, and other plugins such as Ladybug (LB), ClimateStudio (CS), PVLightHouse website, Python programing language and Excel. Setting the grid size of the LB incident radiation component equal to 0.05 m, it creates the solar irradiance analysis grid exactly the same size of each PV cells that were used in the experimental tests. LB outputs the results based on kWh/m2. Since the total PV panel size were 1 m2, the output units of hourly irradiance simulation on the PV surface will be kW, Therefore, after multiplying the PV cells efficiency to those values, the BIPV power output will be calculated.

The top PV panel of the array in a BIPV façade system will receive the highest amount of solar radiation. Studying the simulated shadow patterns on the PV surface of the louvered PVs—excluding the first panel installed on the south façade showed that the string of PV cells that is closer to the building exterior surface, will receive less irradiance. However, the strings of the PV cells that are located closer on the exterior edge of the PV panel will receive higher irradiance level. Thus, to connect cells that receive same range of irradiance on their surfaces, the cells in the analysis grid rows should be connected in one circuit and then each row should be connected together. To reduce the time of simulations, a single PV panel that was located at the middle of the array chose to simulate the incident radiation and calculate the power output of the cells in different circuit connections. Maximum current (Imp) and maximum voltage (Vmp) output of a 1 cm2 PV cell, in different irradiance levels were extracted from the PVLighthouse website (PVLightHouse, 2022), Using the PA/Lighthouse website data, a Grasshopper script were developed to calculate the hourly power output of one partially shaded PV panel based on the Imp and Vmp of the irradiance received on each analysis grid cells during the sun hours of the entire year. Different circuit connections including 1) series connection between cells and series connection between strings, 2) series connection between cells and parallel connection between strings, 3) parallel connection between cells and parallel connection between strings. Herein, series-series, series-parallel, and parallel-parallel circuit connections refer to the mentioned circuit configurations, respectively.

The Grasshopper script determined the Imp and Vmp of the grid cells based on the kW irradiance ranges that each analysis grid was received, Afterward, by having Imp and Vmp associated with each cell, the power output (P) of the circuit connections can be calculated using the formula below. For parallel connection, $$P=(I_1+I_2+ \ldots +I_n)\times V_{min}$$

and for series connection, $$P=I_{min}\times(V_1+V_2+\ldots+V_n)$$

where n is the number of cells in the electrical circuit.

Figure 45:
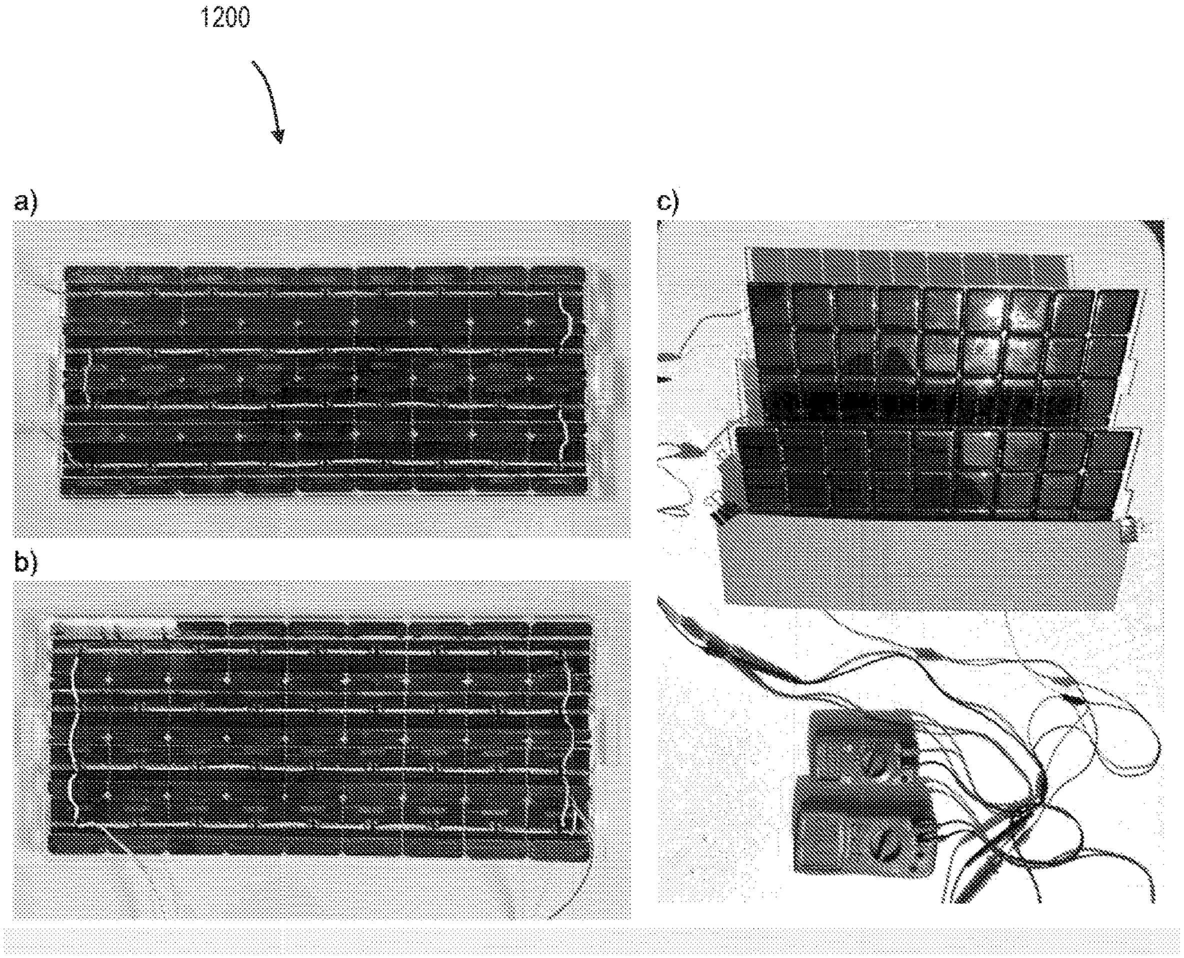
FIG. 45 depicts an Experimental Set Up.

Experimental tests were conducted to validate the simulation results and FIG. 45 depicts an experimental set up 1200 employed. To determine the PV cells efficiencies, I and V of a string consist of 9 PV cells connected in series circuit connections were measured outdoor in 1000 w/m2 irradiance condition. Comparing the I and V output with the I and V provided in the PV cells data sheet, the efficiency of. The cells calculated which was 12%. Two panels, each including 36 mini monocrystalline solar cells were made by installing mini PV cells on a rectangle acrylic board. In one panel the PV cells were connected in a conventional series-series (FIG. 45 at a). The PV cells in the other panel were connected in a series-parallel electric circuit where the PV cells in each row were connected in series, and the strings of PV cells were connected in parallel (FIG. 45 at b)). The tilting angle of the panels were 35.22° which is equal to the latitude of city of Charlotte. To make the experimental setup similar to the south facade, the panels located towards the south geographic direction (FIG. 45 at c)). While the panel in the front casted shadows on the half of the panel in the back, a piece of cardboard was used to cast shadows on the same area of the front PV panel. The distance between PV panels were exactly same as the simulation's geometry. The irradiance levels on the PV panels' surface were measured using the day star meter sensor. I and V output of the panels were measured by multimeters. All of the measured data were recorded every 15 minutes from 11:30 am to 12:30 pm, for five days from October 5th to October 9th.

The results of the experiment tests showed that the conventional PV panel with series connection outputted 7.8 mA to 13.7 mA, and 77.8 v to 83.0 v current and voltage respectively. However, the PV panel with a series-parallel circuit connection generated 1.07 A to 3.3 A and 19.6 v to 21.5 v of current and voltage respectively. The overall irradiance levels during the experiment in those five days were changed from 210 W/m2 to 1020 Wm2.

Figure 46:
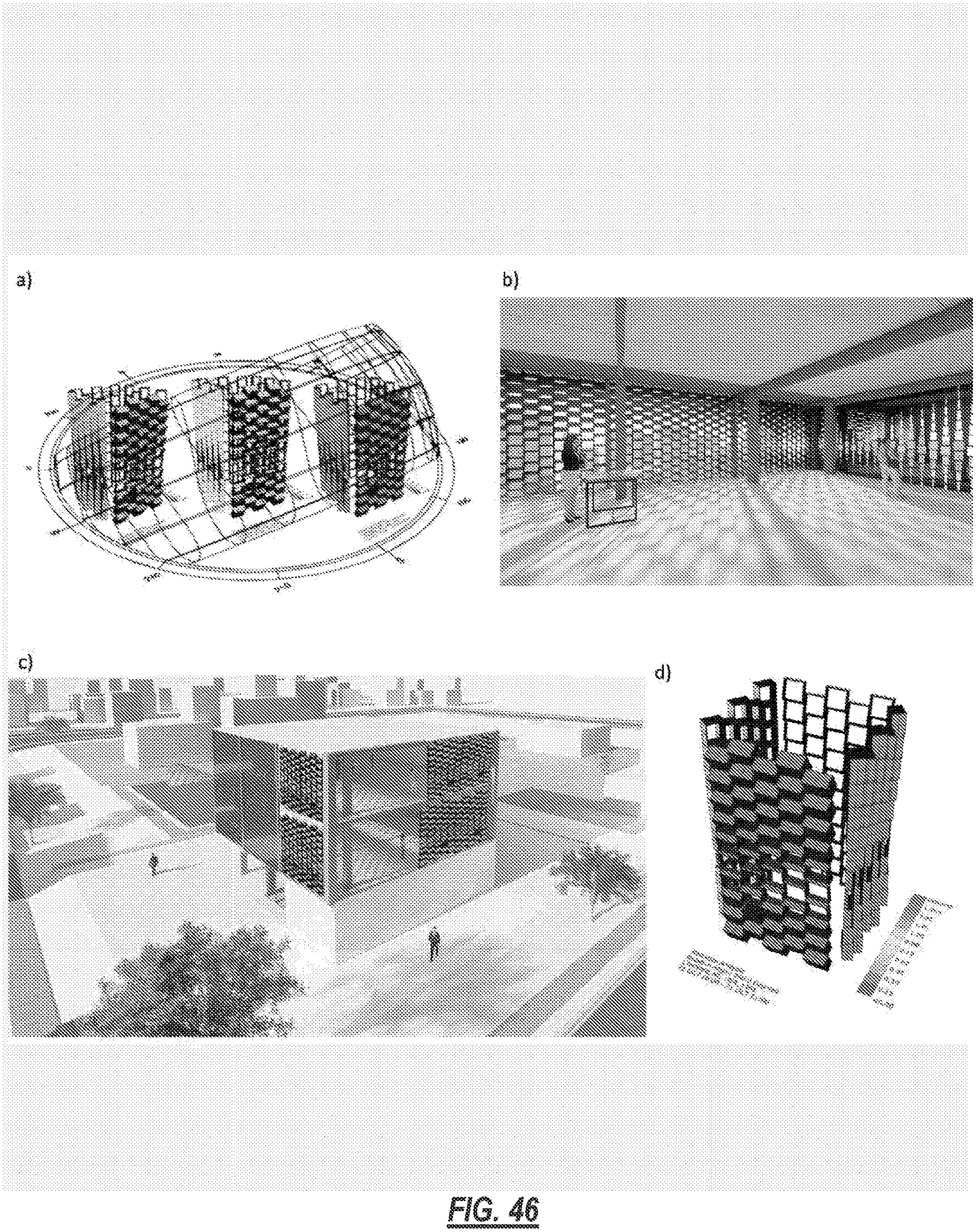
FIG. 46 is a schematic illustration of one typology of a BIPV façade system and its simulated performance.

The PV panels integrated in the façade can also perform. as a shading device to reduce cooling loads, carbon emissions and glare problems while offering view out, on-site clean energy. FIG. 46 is a schematic illustration of one Typology 1300 of the BIPV façade systems and its simulated performance, according to embodiments. With further reference to FIG. 46, depicted at a) is an incident radiation on PV surface simulations on Oct 21st at 8 pm, 5 pm, 2 pm from left to right respectively, depicted at b) is an interior view, depicted at c) is a bird eye view, and depicted at d) is an incident radiation on PV surface simulations on Oct 21st at 10 am.

Thus, in this testing/experiment, an optimum circuit connection for BIPV façade systems through simulation and experiment tests were conducted, according to embodiments. After an in-depth shadow analysis, the simulations were conducted in two methods, 1) using LB incident radiation component and applying PV material efficiency to calculate the power output, 2) a Grasshopper script were developed to define the current and voltage output and calculate the power output of the panel of different circuit connections including series-parallel and parallel-parallel.

Although the power output of the parallel-parallel circuit connection is higher than the series-series and series-parallel connection, it will be unapplicable for the BIPV systems due to significantly low voltage output that will not meet the minimum required voltage input of the microinverter.

The results of the experiment tests were compared with the simulated circuit connections' power output in the corresponding day of the year. The LB incident radiation simulation results on Oct 8th at noon were 61 W. After applying the cells efficiency, the simulated power output will be 7.32 W. However, in the experimental tests the measured I and V of the partially shaded panel with series-series connection were 0.011 A and 83 v respectively. Therefore, the power output of that PV panel in real-world applications will be about 1 W. To make sure that the comparison between the LB incident radiation output and the experimentation results are accurate, the least value of the simulated incident radiation list which is related to the grid cell of the analysis grid that receives minimum amounts of incident radiation on Oct 8th, were extracted. After applying the PV cells efficiency, the power output of that specific cell was calculated. The calculation result was 2.8 W which is close to what measured in the experiment. The power output result of the series-parallel circuit connection that the Grasshopper script calculated was 78 W. The measured I and V of the PV panel with the series-parallel circuit connection were 3.3 A and 21.5 v respectively. Therefore, the generated power was about 71 W.

Accordingly, as explained herein, the façade of a building is a great place to harness solar energy and enhance the building's overall energy performance. However, the BIPV façade systems are often subject to partial shadows from panels self-shading and building walls. Therefore, traditional default circuit connections do not output maximum power for BIPV applications. Accordingly, it has herein been determined according to embodiments how to maximize energy yields of BIPV façade systems while minimizing discrepancies between simulation results and real-world applications performance. Simulation and experimental power output of the partially shaded. PV panels in different circuit connections were tested, as noted above, Comparison analysis of the results of the LB incident radiation simulations and the measured data in the experiment setup showed that there is a difference between simulation results and real-world performance of the partially shaded solar panels. LB does not consider the current drop due to the nonuniform irradiance levels on the PV surface under partially shaded conditions. Therefore, the impact of current drop in the electric circuit caused by partial shadows in a BIPV system should he considered so the designed BIPVs perform in real-world applications as they were intended.

In addition, the circuit connection of the PV cells in panels that are currently been manufactured in the industry will not output the maximum power in the BIPV façade systems. Since other methods that have been used to prevent the power loss and current drop in the circuit are not applicable for the BIPV façade systems, the best approach is to reconfigure the circuit connections between PV cells and strings of PV cells in a PV panel based on an in-depth analysis of the shadow patterns on the PV surface. Since the PV panel with parallel-parallel circuit connection will output the voltage equal to the voltage of one single PV cell, this type of circuit connection is not applicable for BIPV façade systems. To increase the power output while balancing out the I and V optimum circuit connection reconfiguration will be series-parallel.

Results of the experimental tests shown that the series-parallel circuit connection increases the energy yields of the BIPV facades 71 times in real-world applications. Additionally, the Grasshopper analysis recipe determined for the circuit connection reconfiguration, will increase the BIPV facades energy yields by 10.6 times higher which will not only help architects and designers to better make decisions in the early stages of the design, but also prevent wasting resources to scaling up the PV system size to meet the building energy requirements.

Figure 47:
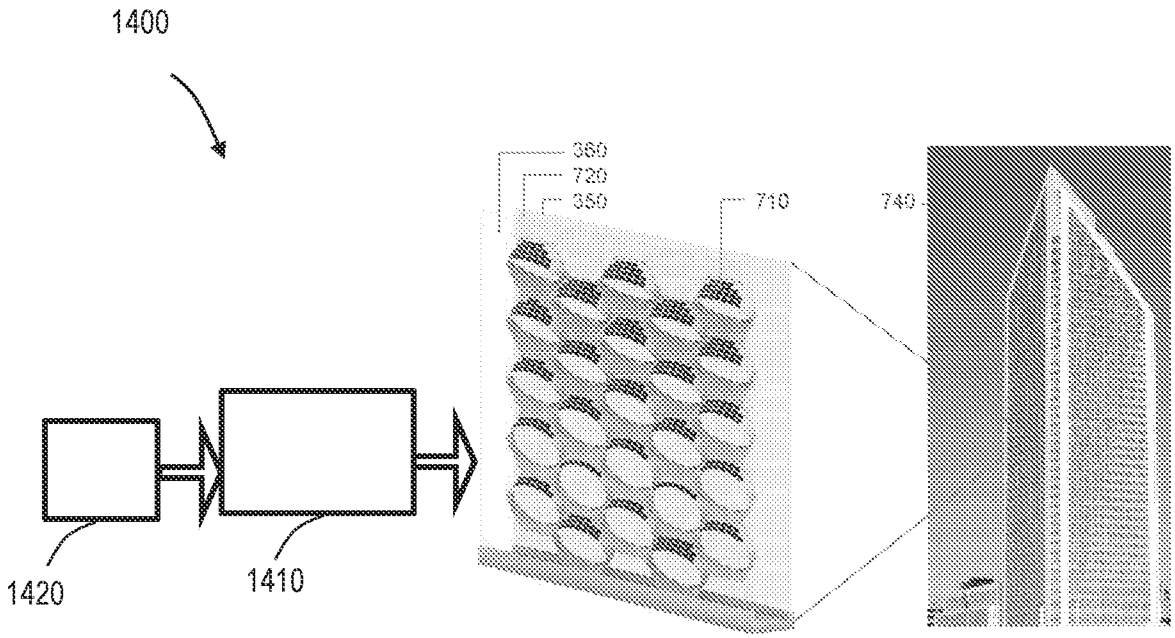
FIG. 47 is a schematic illustration of a standalone system incorporating a battery and computer, such as a laptop, for control.
Figure 48:
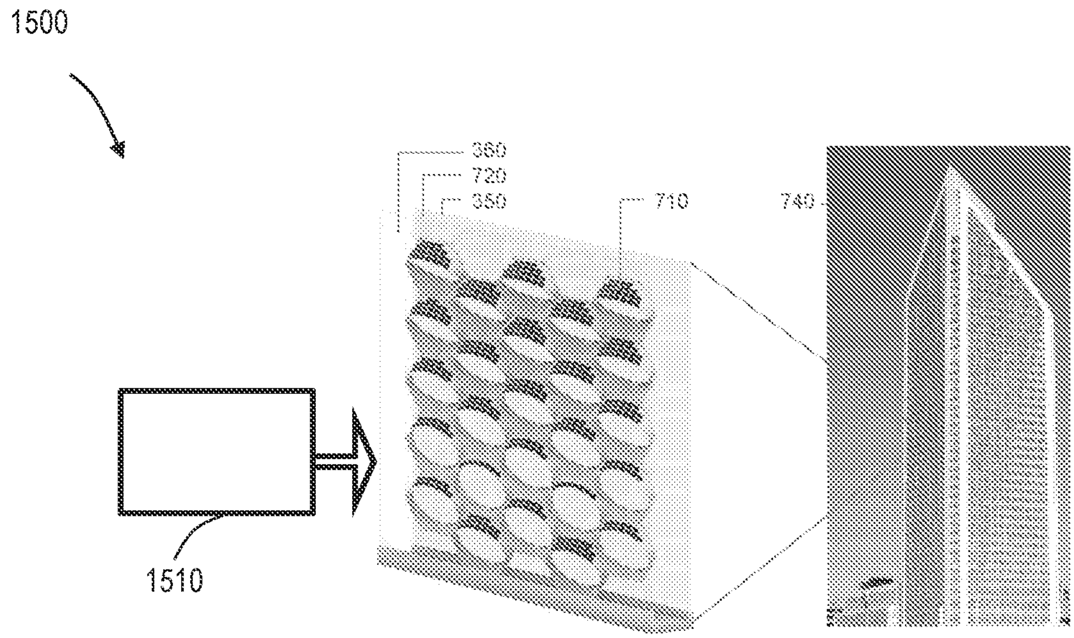
FIG. 48 is a schematic illustration of a complete system with control such as a central system.

With reference now to FIGS. 47 and 48, FIG. 47 is a schematic illustration of a standalone system 1400 incorporating battery 1410 and computer, such as laptop 1420. FIG. 48 is a schematic illustration of a complete system 1500 with control 1510 such as a central control system.

As shown in FIG. 47, incorporating the use of laptop 1420 and battery 1410 with the herein BIPV systems advantageously provides standalone controllable systems. In FIG. 48, the complete system 1500 includes control system 1510 such as a central control system.

Figure 49:
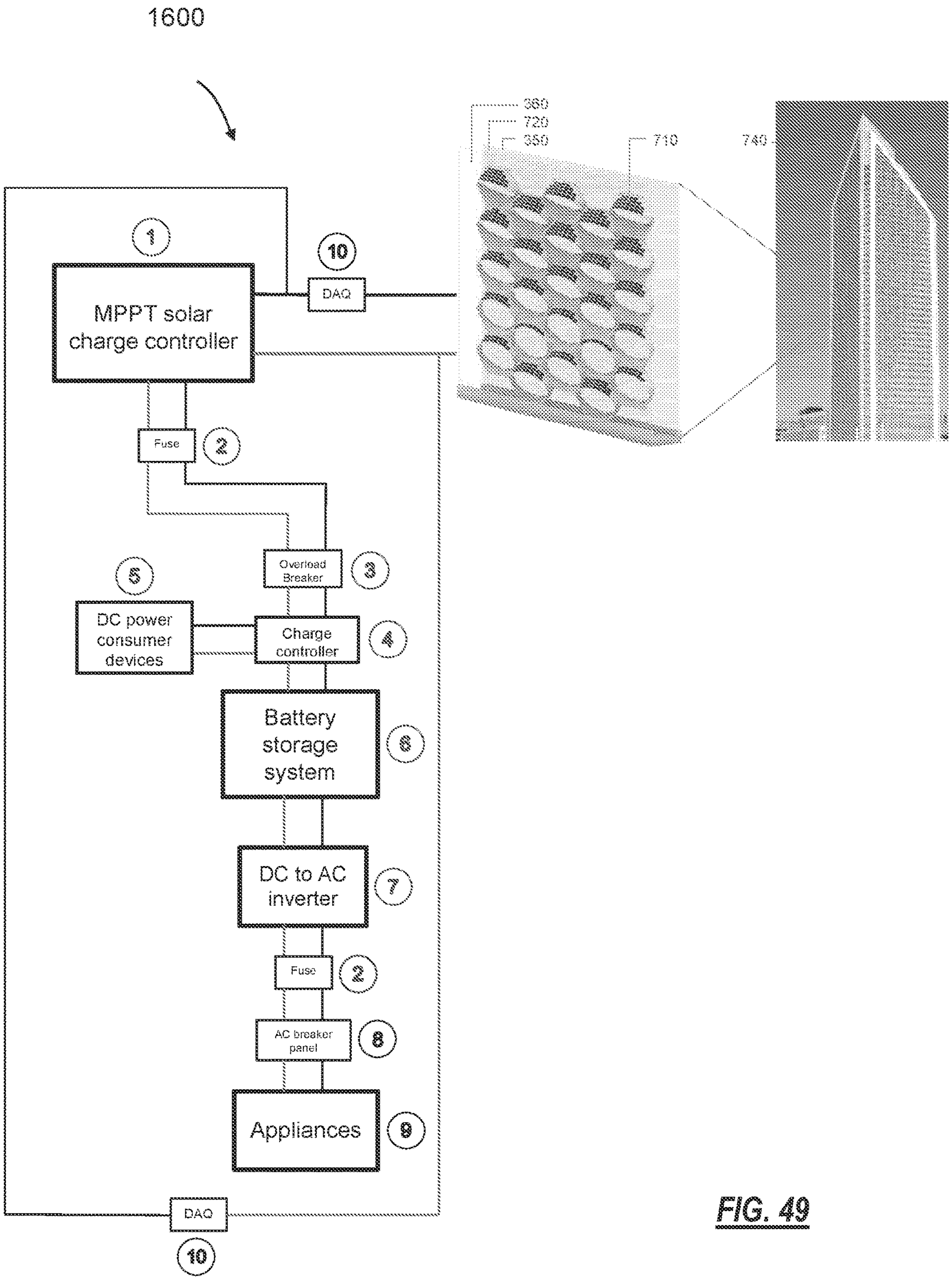
FIGS. 49, 50 and 51 are schematic illustrations of systems showing further details related to the standalone and complete systems of FIGS. 47 and 48.
Figure 50:
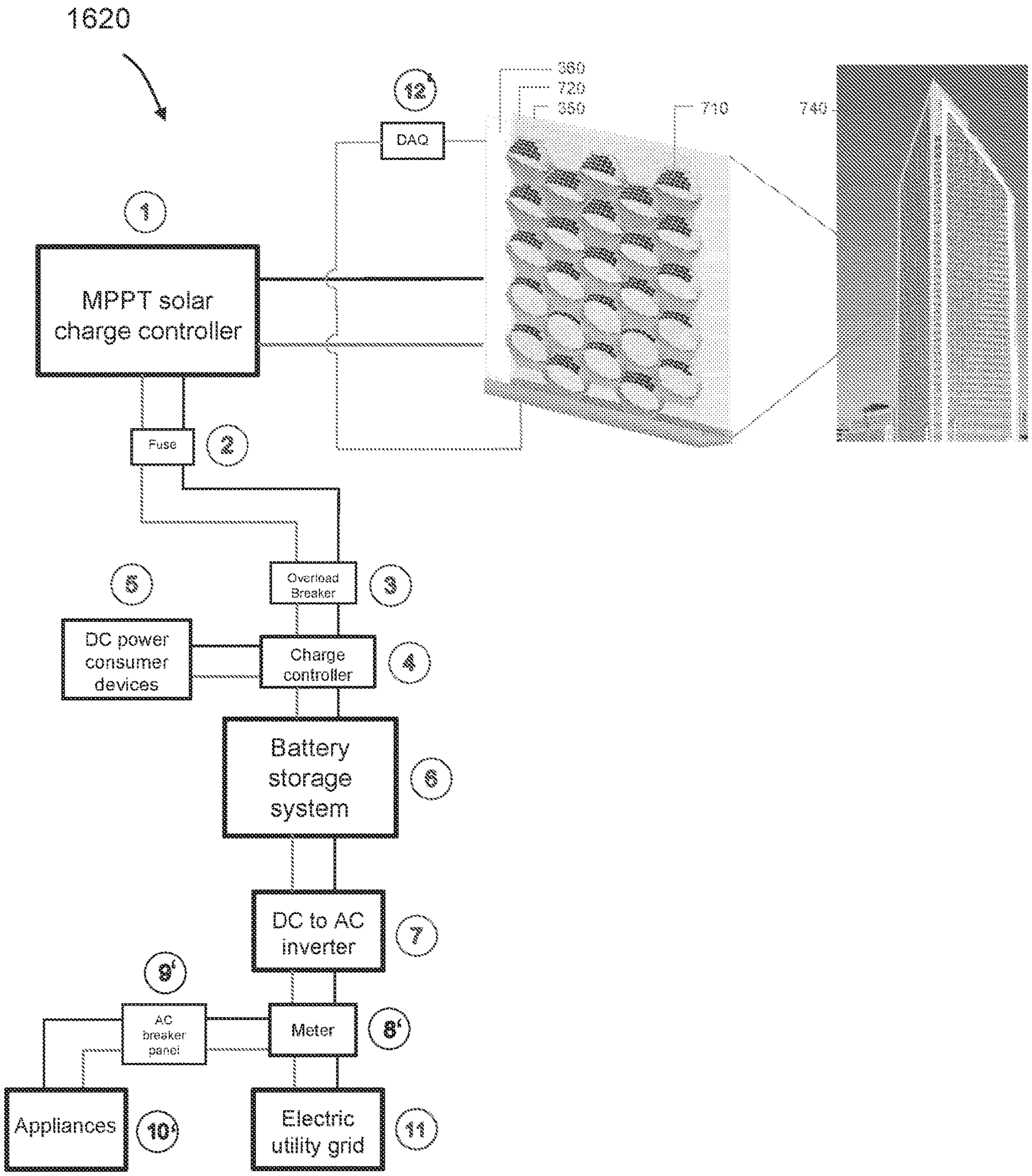
Figure 51:
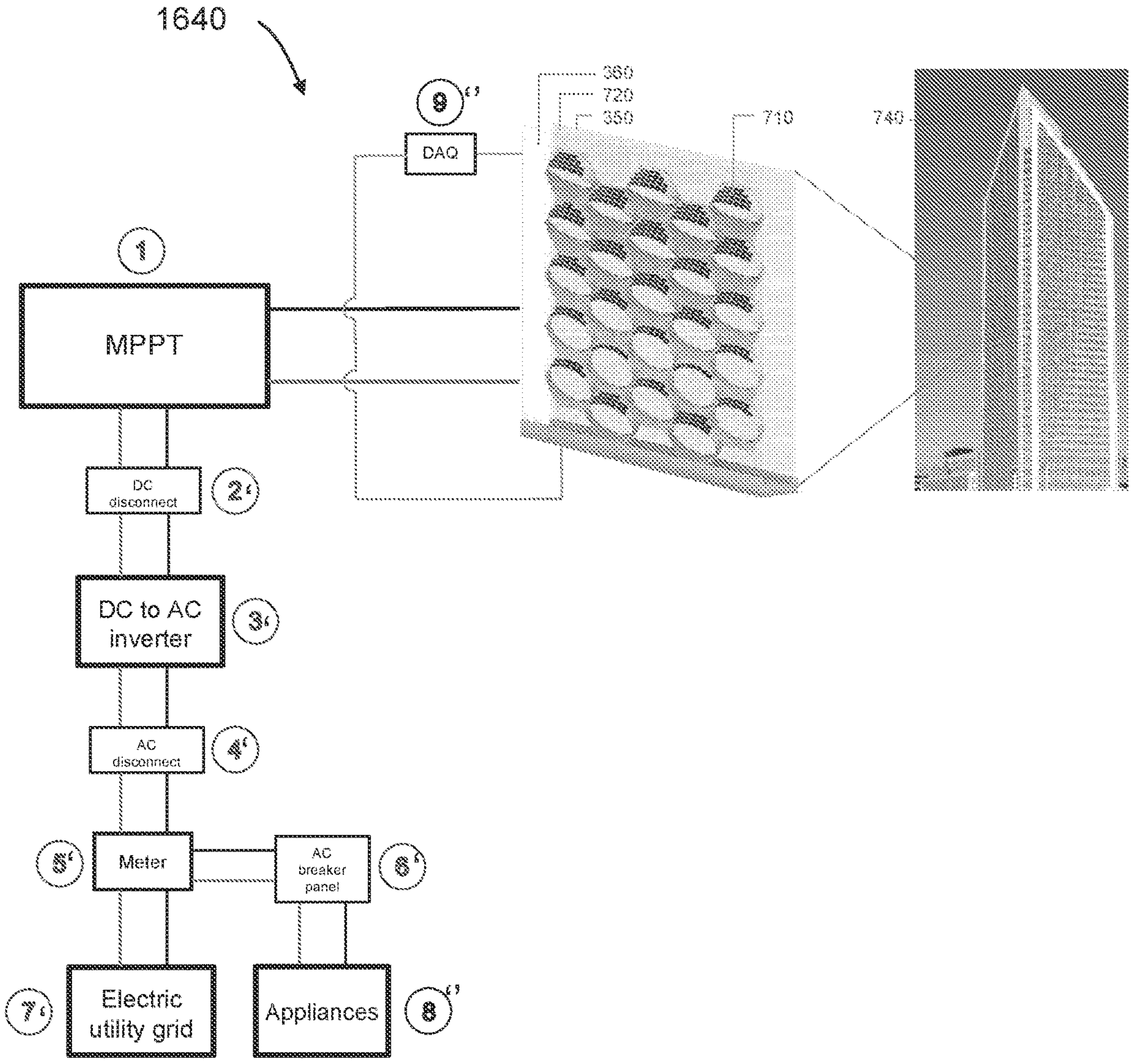

FIGS. 49, 50 and 51 schematically illustrate further details related to the systems of FIGS. 47 and 48 according to embodiments. In particular, FIG. 49 illustrates off-grid integration system 1600 and various components thereof including MPPT solar charge controller 1, fuse 2, overload breaker 3, charge controller 4, DC power consumer device(s) 5, battery storage system 6, DC to AC inverter 7, AC breaker panel 8, appliance(s) 9 and data acquisition system 10, as further described below. In embodiments, the MPPT solar charge controller 1 maximizes the conversion of solar energy into electricity. PV-CCF modules have an optimal operating point known as the Maximum Power Point (MPP). At this point, PV-CCF modules output the maximum amount of power given their environmental conditions. MPPT solar charge controllers track the current and voltage output of the PV-CCF modules and based on that, adjust the battery charging rate. This device not only maximizes solar energy harvesting, but also prevents battery overcharging, undercharging, and related damage to the storage system. Connected thereto is fuse 2 which prevents excessive current from flowing into the electric circuit as overcurrent can lead to overheating and possible fire ignition. Overload breaker 3 is a safety device preventing overcurrent flow in the circuit and also protects the system 1600 from damage. Charge controller 4 regulates the battery charging rate, prevents overcharging and undercharging, and monitors ambient temperature to optimize battery charging. Further connected thereto are DC power consumer device(s) 5 which are any suitable devices that can operate with direct current (DC) power such as LED lights, laptops, cellphone charging stations and so forth. DC to AC inverter 7 also shown in FIG. 49 converts DC power to alternating current (AC) and outputs about 120 volts AC at a 60 Hz frequency. It can also provide monitoring and control features for, e.g., users and building owners through a cell phone app or computer interface. Battery storage system 6 located between charge controller 4 and DC to AC inverter 7, advantageously stores electricity generated by PV-CCF and provides grid independence. AC breaker panel 8 connected to fuse 2 and appliance(s) 9 as shown in FIG. 49 is typically a board that can safely distribute and control the flow of electricity in the building's electric circuit thereby preventing overload and faults. Appliance(s) can be any suitable appliance and are typically electric consumer devices in an office building including office appliances (e.g., computers, printers, fax machines), cleaning appliances (e.g., vacuum cleaners), comfort appliances (e.g., air condition units, ceiling fans), and kitchen appliances (e.g., refrigerators, microwaves, coffee makers, dishwashers), etc. Lastly, data acquisition system 10 shown in FIG. 49 can include a microcontroller system designed to record and monitor system performance, including current and voltage output, PV cell back temperature and environmental variables such as cavity temperature, air flow rate, and electricity consumed for cavity conditioning.

Referring now to FIG. 50, FIG. 50 shows system 1620 and illustrates tied to grid system integration with battery storage system 6 and various other components including MPPT solar charge controller 1, fuse 2, overload breaker 3, charge controller 4, DC power consumer device(s) 5, battery storage system 6, DC to AC inverter 7, meter 8', AC breaker panel 9', appliance(s) 10', electric utility grid 11 and data acquisition system 12', as further described below. The MPPT solar charge controller 1 in this embodiment also maximizes the conversion of solar energy into electricity. PV-CCF modules have an optimal operating point known as the Maximum Power Point (MPP). At this point, PV-CCF modules output the maximum amount of power given their environmental conditions. MPPT solar charge controllers track the current and voltage output of the PV-CCF modules and based on that, adjust the battery charging rate. This device not only maximizes solar energy harvesting, but also prevents battery overcharging, undercharging, and related damage to the storage system. Also, similar to that of FIG. 49, connected thereto is fuse 2 which prevents excessive current from flowing into the electric circuit, as overcurrent can lead to overheating and possible fire ignition, and overload breaker 3 which is a safety device preventing overcurrent flow in the circuit and also protects the system 1620 from damage. Charge controller 4 regulates the battery charging rate, prevents overcharging and undercharging, and monitors ambient temperature to optimize battery charging. Further connected thereto are DC power consumer device(s) which are any suitable devices that can operate with direct current (DC) power such as LED lights, laptops, cellphone charging stations and so forth. Battery storage system 6 located between charge controller 4 and DC to AC inverter 7 advantageously stores electricity generated by PV-CCF and can provide grid independence. DC to AC inverter 7 converts DC power to alternating current (AC) and outputs about 120 volts AC at a 60 Hz frequency. It can also provide monitoring and control features for, e.g., users and building owners through a cell phone app or computer interface. AC breaker panel 9' connected to meter 8' and appliance(s) 10' as shown in FIG. 50 is typically a board that can safely distribute and control the flow of electricity in the building's electric circuit thereby preventing overload and faults. Appliance(s) can be any suitable appliance and are typically electric consumer devices in an office building including office appliances (e.g., computers, printers, fax machines), cleaning appliances (e.g., vacuum cleaners), comfort appliances (e.g., air condition units, ceiling fans), and kitchen appliances (e.g., refrigerators, microwaves, coffee makers, dishwashers), etc. Meter 8' monitors surplus PV-CCF electricity that is transmitted to the utility grid. Utilities can compensate a building owner based on the amount of kWh added to the grid. Electric utility grid 11 can take care of the electricity supply and demand. Lastly, data acquisition system 12' shown in FIG. 50 can include a microcontroller system designed to record and monitor system performance, including current and voltage output, PV cell back temperature and environmental variables such as cavity temperature, air flow rate, and electricity consumed for cavity conditioning.

FIG. 51 shows system 1640 and illustrates tied to grid system integration without battery storage system and various other components including MPPT solar charge controller 1', DC disconnect 2', DC to AC inverter 3', AC disconnect 4', meter 5', AC breaker panel 6', electric utility grid 7', appliance(s) 8" and data acquisition system 9", as further described below. In embodiments, the MPPT solar charge controller 1 maximizes the conversion of solar energy into electricity. PV-CCF modules have an optimal operating point known as the Maximum Power Point (MPP). At this point, PV-CCF modules output the maximum amount of power given their environmental conditions. MPPT solar charge controllers track the current and voltage output of the PV-CCF modules so that the system will generate maximum electricity in cloudy days. The DC disconnect 2' connected thereto interrupts DC electricity flow in case the electricity from the PV-CCF needs to shut off. The DC to AC inverter 3' also shown in FIG. 51 converts DC power to alternating current (AC) and outputs about 120 volts AC at a 60 Hz frequency. It can also provide monitoring and control features for, e.g., users and building owners through a cell phone app or computer interface. AC disconnect 4' located between the DC to AC inverter 3' and meter 5' can interrupt AC electricity flow to disconnect the meter 5' from the utility grid 7'. Meter 5' monitors surplus PV-CCF electricity that is transmitted to the utility grid. Utilities can compensate a building owner based on the amount of kWh added to the grid 7'. AC breaker panel 6' connected to meter 5' and appliance(s) 8" as shown in FIG. 51 is typically a board that can safely distribute and control the flow of electricity in the building's electric circuit thereby preventing overload and faults. Appliance(s) 8" can be any suitable appliance and are typically electric consumer devices in an office building including office appliances (e.g., computers, printers, fax machines), cleaning appliances (e.g., vacuum cleaners), comfort appliances (e.g., air condition units, ceiling fans), and kitchen appliances (e.g., refrigerators, microwaves, coffee makers, dishwashers), etc. Lastly, data acquisition system 9" shown in FIG. 51 can also include a microcontroller system designed to record and monitor system performance, including current and voltage output, PV cell back temperature and environmental variables such as cavity temperature, air flow rate, and electricity consumed for cavity conditioning.

In embodiments, the features of controller 200 described above with respect to FIG. 25 may be employed in operation of system 1400 and system 1500 of FIGS. 47 and 48, respectively, as well as the systems 1600, 1620 and 1640 described above with respect to FIGS. 49, 50 and 51.

Figure 52:
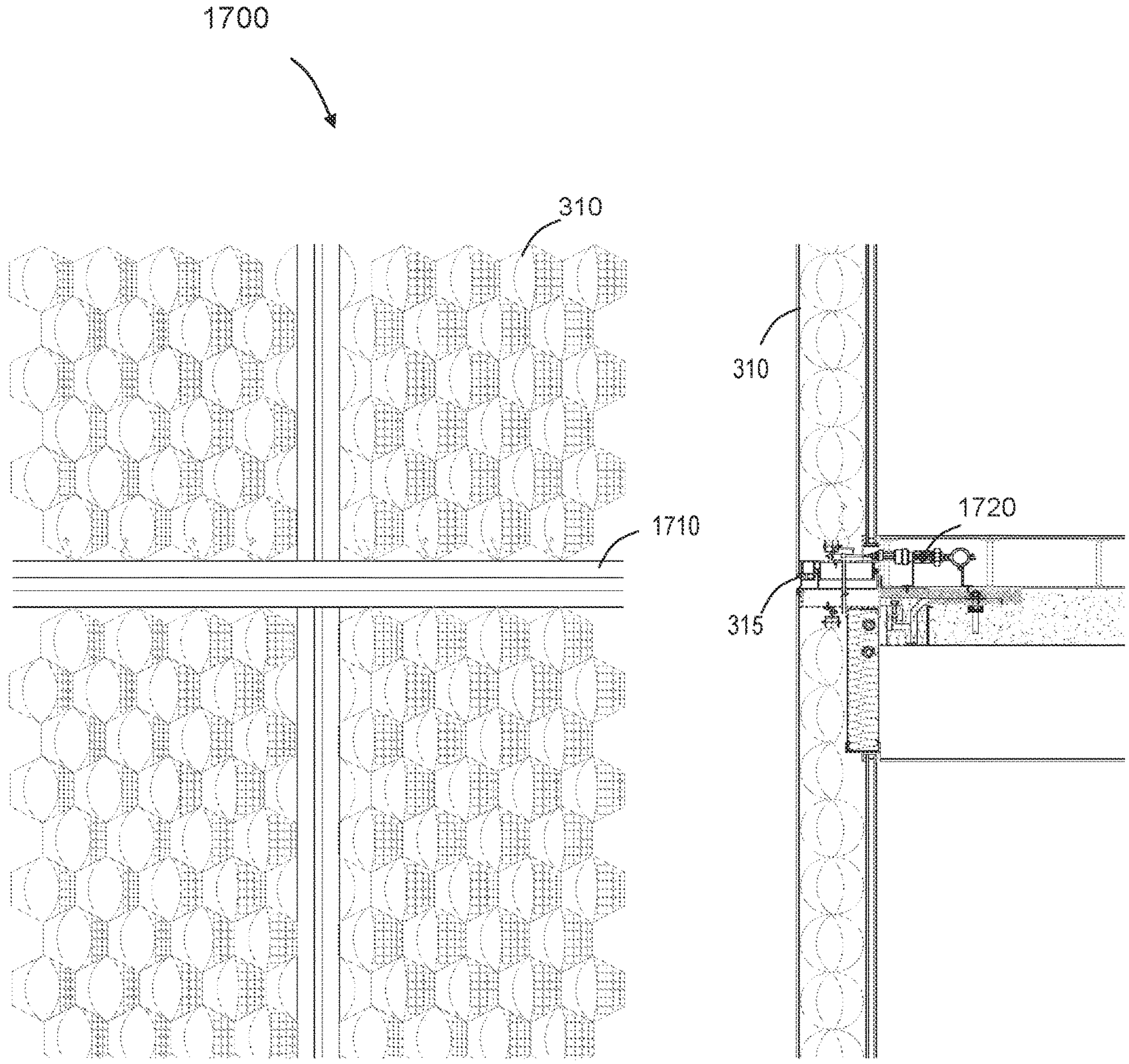
FIGS. 52, 53 and 54 are each a partial cross-section of a portion of a photovoltaic curtain wall as in FIG. 38 depicting micro-oculus shaders in various orientations and with an air circulation device.
Figure 53:
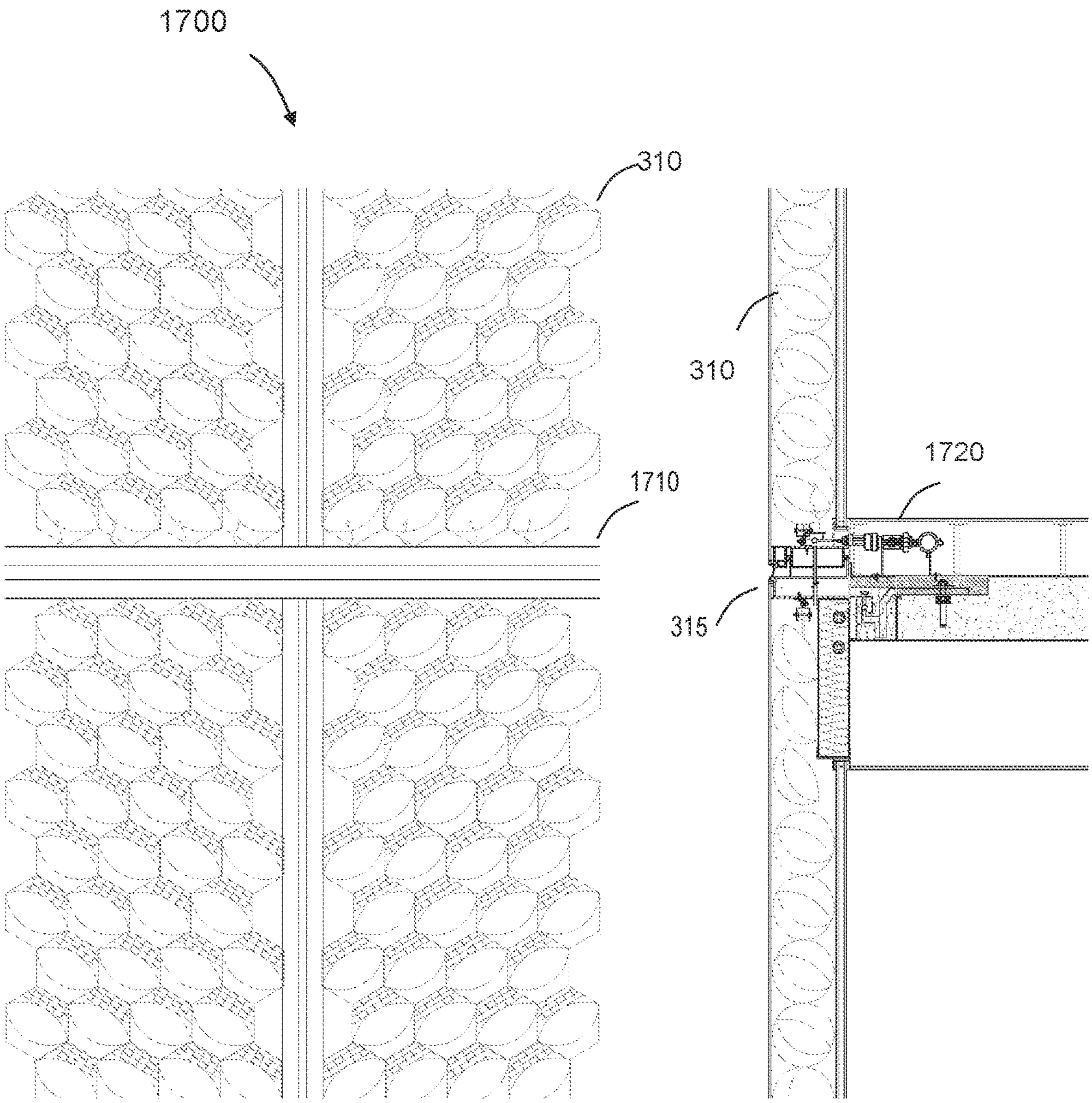
Figure 54:
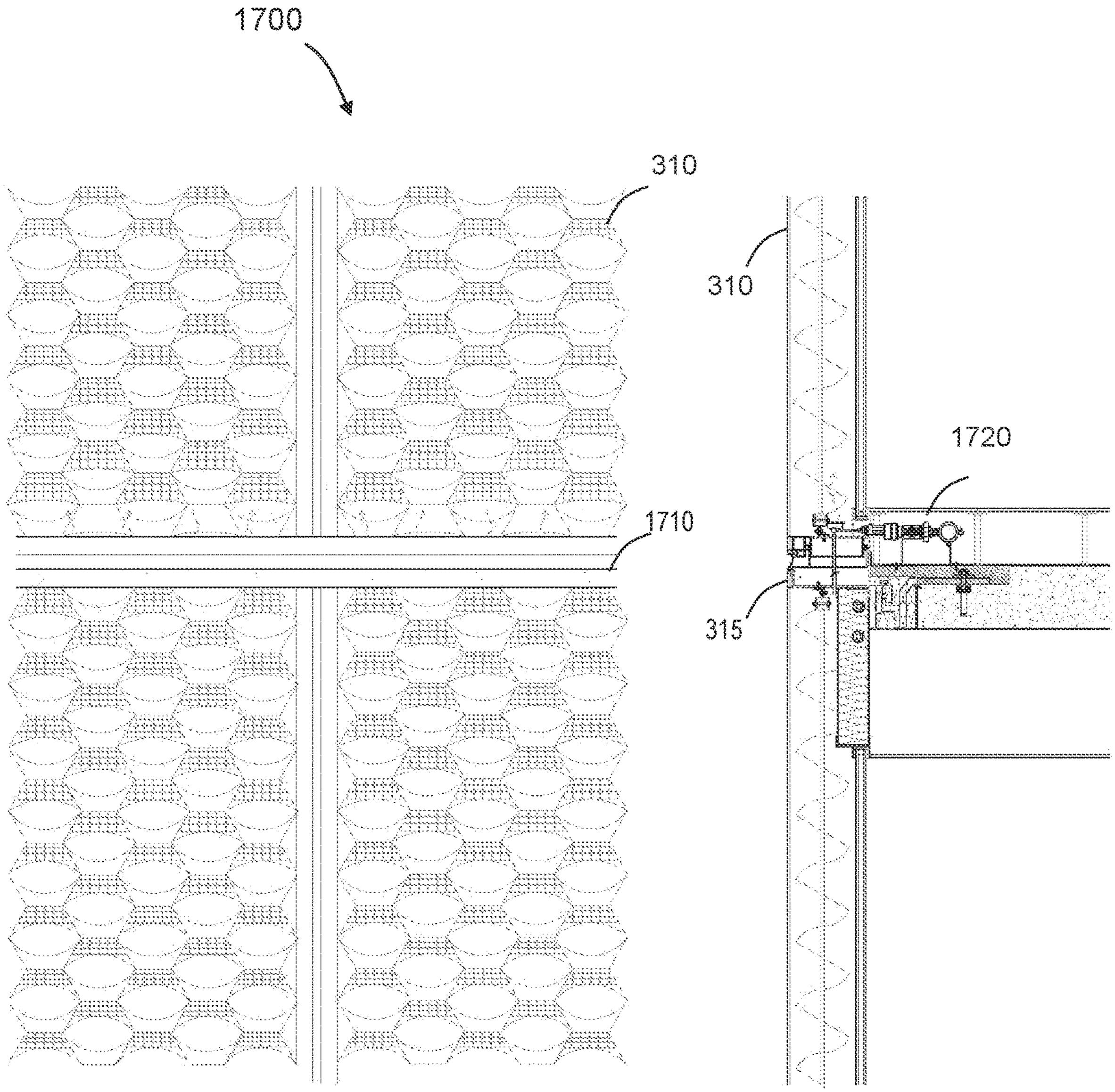

FIGS. 52, 53 and 54 are each a schematic illustration of a portion of a partial cross-section of the photovoltaic curtain wall of FIG. 38 depicting micro-oculus shaders 310 at various orientations and details of bracketing system 315 and air circulation device 1720. It is noted that the afore-described connection details and aspects thereof regarding use of bracketing, transoms, mullions and so forth with respect to the microalgae system and microalgae curtain wall may similarly be employed in all of the embodiments of the photovoltaic curtail wall and systems also disclosed herein. The micro-oculus (solar cell integrated oculus) shaders 310 advantageously can provide daylighting penetration, view-out, shading efficacy, and solar power production. The orientation of the oculus can vary depending on building location and facade orientation. Localized air nozzles 1710 can be employed to control the solar cell temperatures as desired. Further shown in FIGS. 52, 53 and 54 is air circulation device 1720. Air circulation device 1720 can be any suitable device or system to regulate cell temperature and cavity condensation and is particularly suited for closed cavity operation. Air circulation device 1720 is also similar to the air flow system described below regarding FIG. 62. Advantageously, the herein systems may be factory-assembled unitized BIPV-CCF systems generating solar energy to power building operation and also help in reducing heating, cooling, and artificial lighting demands, resulting in energy savings. Additionally, the systems allow for view-out and daylighting, enhancing the user experience and promoting health and well-being.

Figure 55:
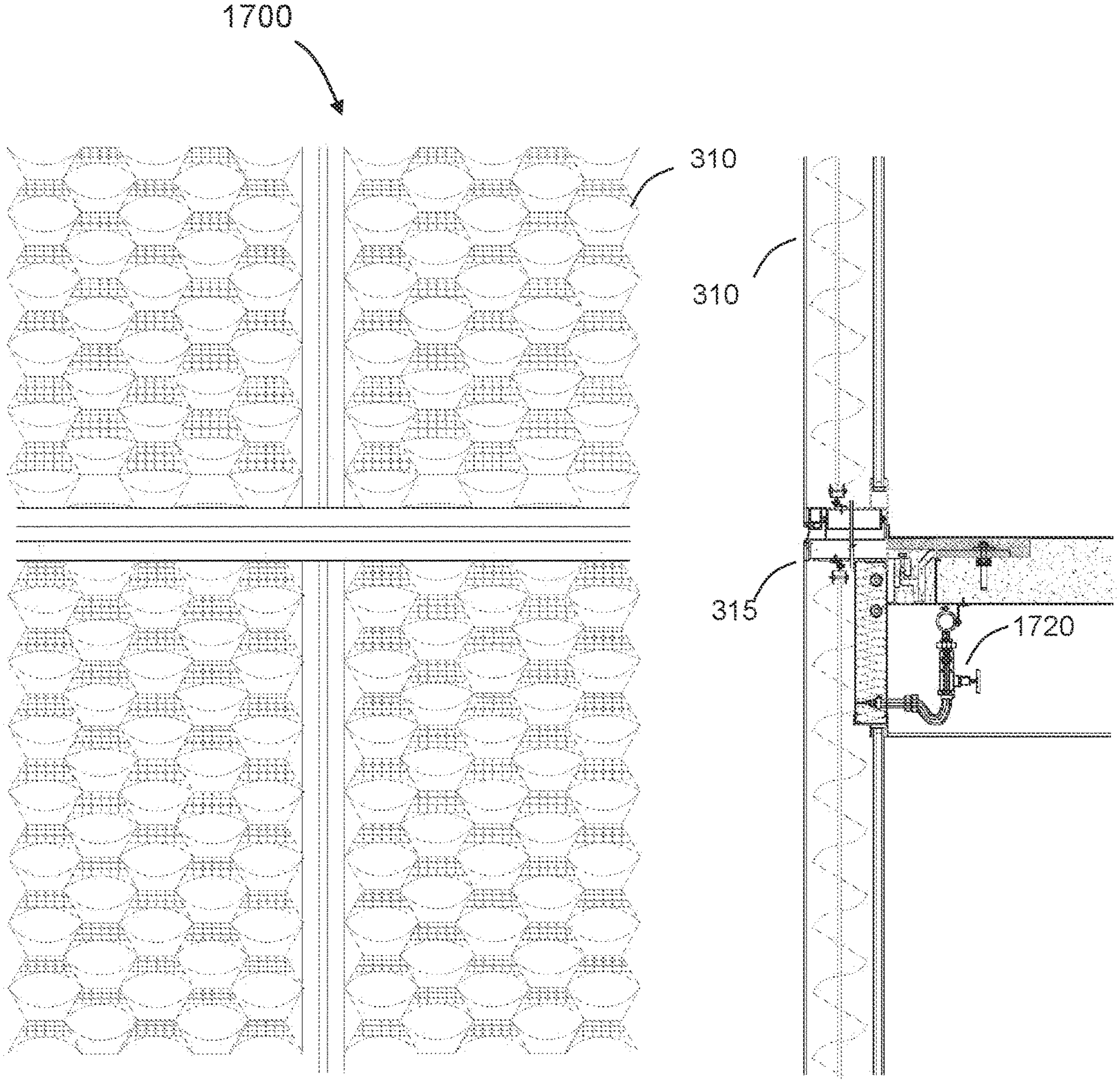
FIGS. 55, 56, and 57 are each a partial cross-section of a portion of a photovoltaic curtain wall as in FIG. 38 depicting micro-oculus shaders in various orientations and with another air circulation device.
Figure 56:
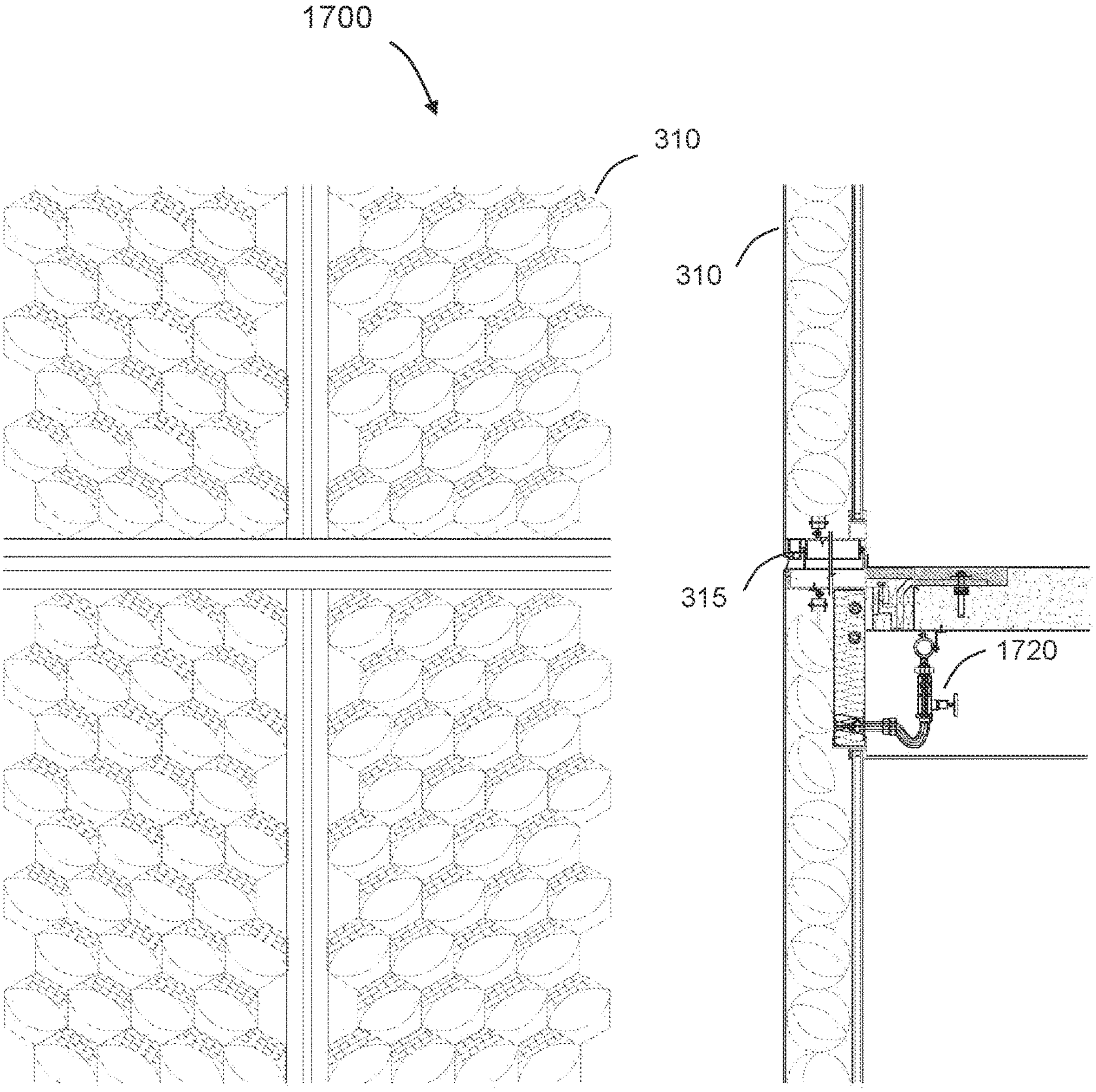
Figure 57:
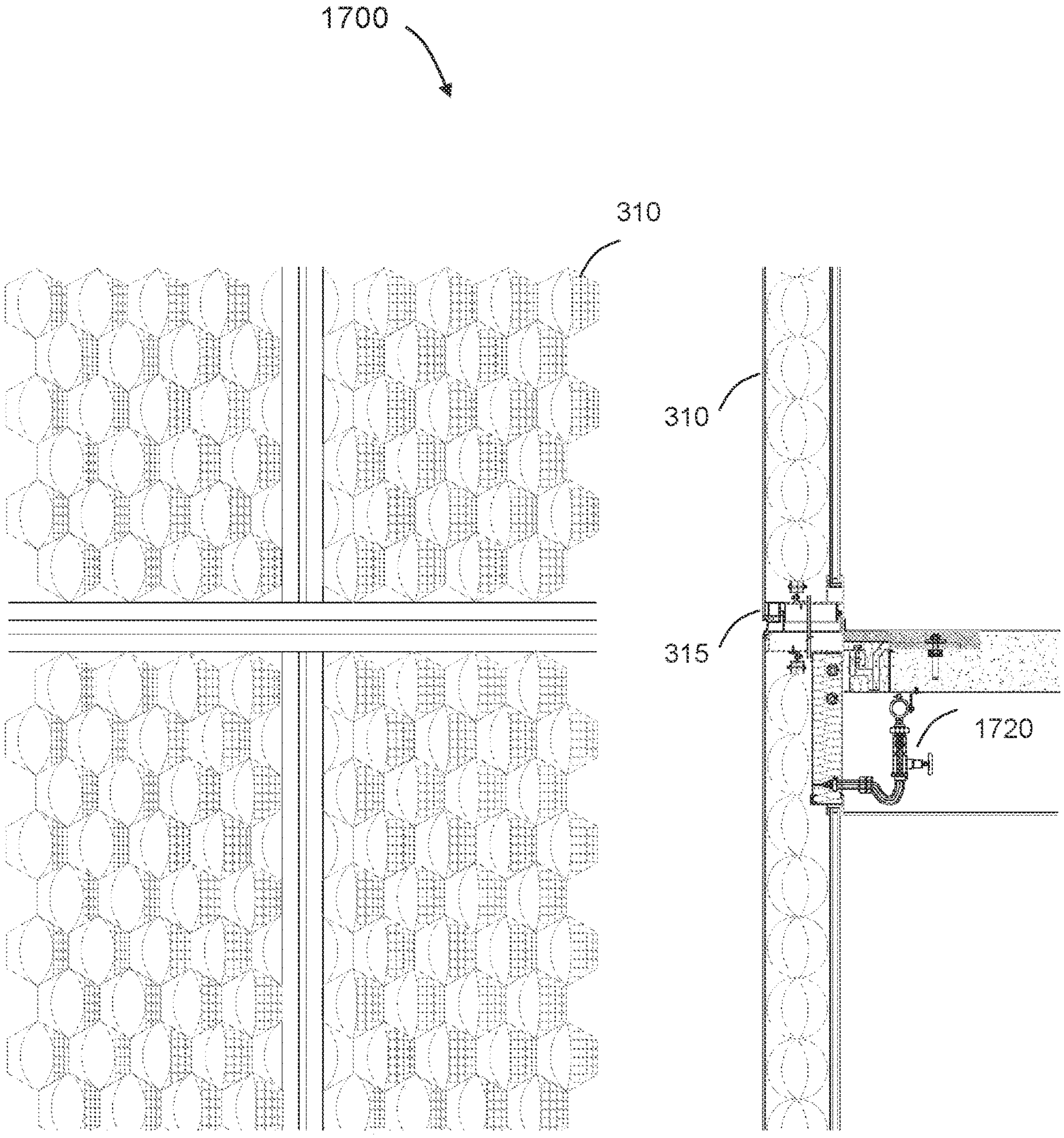

FIGS. 55, 56 and 57 are each a schematic illustration of a portion of a partial cross-section of the photovoltaic curtain wall of FIG. 38 depicting micro-oculus shaders 310 at various orientations and details of bracketing system 315 and another air circulation device 1720. Accordingly, the descriptions above with respect to FIGS. 52, 53 and 54 also apply here. The air circulation device 1720 depicted in FIGS. 55, 56 and 57 is particularly similar to the air flow system described below regarding FIG. 62 and thus those descriptions similarly apply to these embodiments. Again, advantageously, the herein systems may be factory-assembled unitized BIPV-CCF systems generating solar energy to power building operation and also help in reducing heating, cooling, and artificial lighting demands, resulting in energy savings. The systems further advantageously allow for view-out and daylighting, enhancing the user experience and promoting health and well-being.

Figure 58:
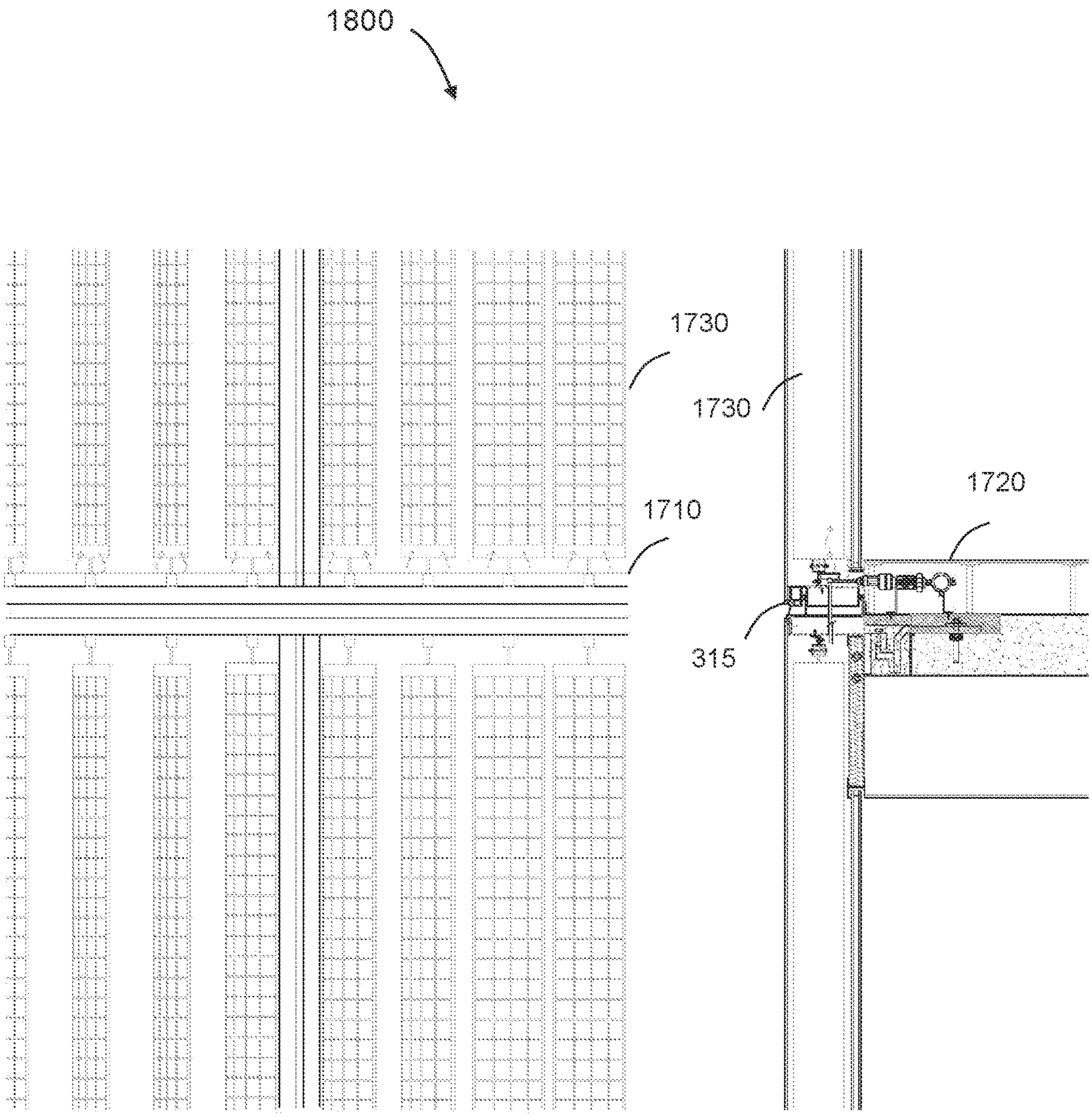
FIG. 58 is a partial cross-section of a portion of a photovoltaic curtain wall system depicting solar fin shaders, in a vertical alignment, with an air circulation device.
Figure 60:
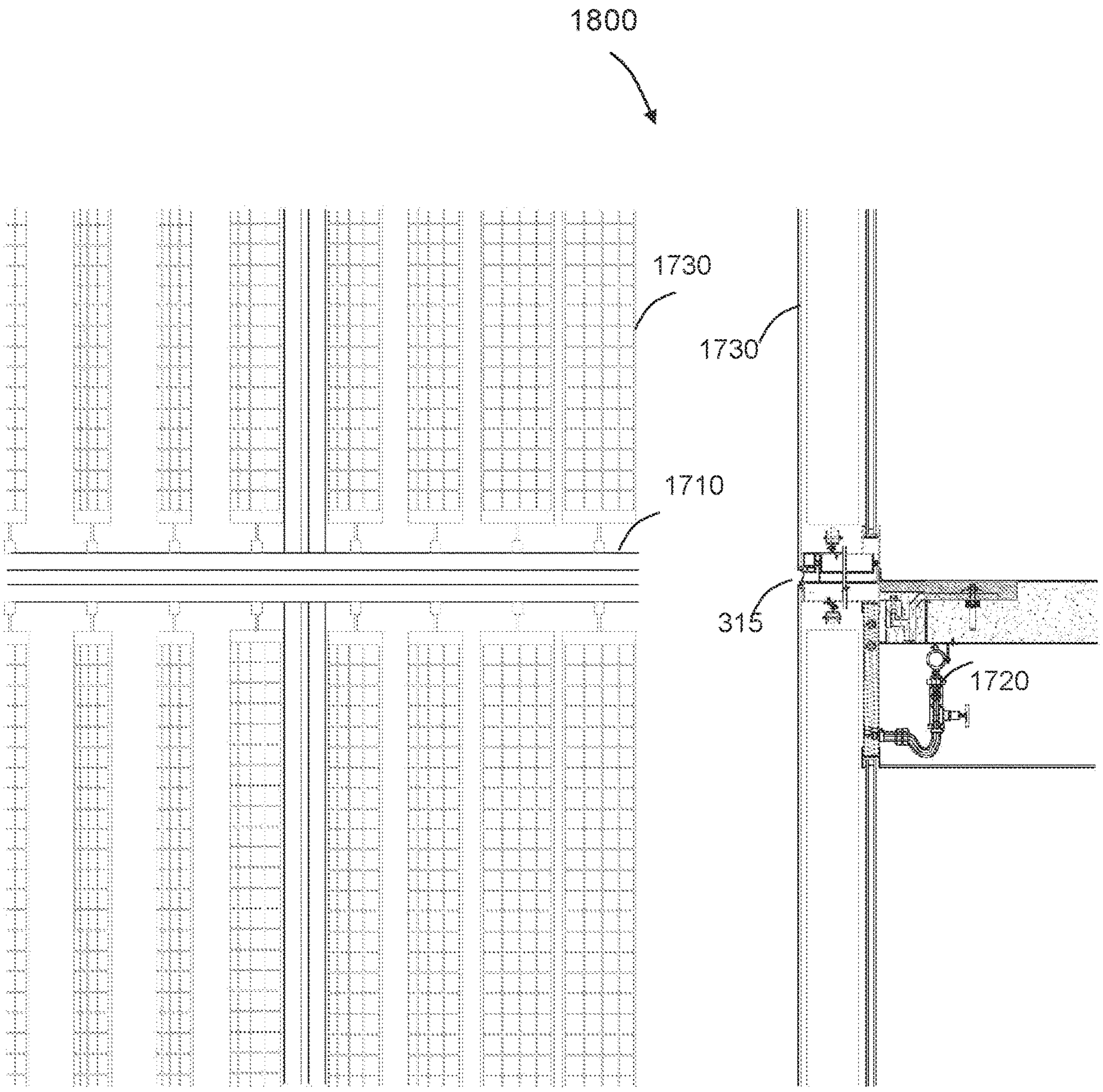
FIG. 60 is a partial cross-section of a portion of a photovoltaic curtain wall system depicting solar fin shaders, in a vertical alignment, with another air circulation device.

FIG. 58 is a partial cross-section of a portion of a photovoltaic curtain wall system 1800 depicting solar cell fin shaders 1730, in a vertical alignment, with an air circulation device 1720. Similarly, FIG. 60 is a partial cross-section of a portion of a photovoltaic curtain wall system 1800 depicting solar cell fin shaders 1730, in vertical alignment, with another air circulation device 1720. As described above, air circulation device 1720 can be any suitable device or system to regulate cell temperature and cavity condensation and is particularly suited for closed cavity operation. Air circulation device 1720 is also similar to the air flow system described below regarding FIG. 62. The air circulation device 1720 depicted in FIG. 60 is particularly similar to the air flow system described below regarding FIG. 62 and thus those descriptions similarly apply here.

Localized air nozzles 1710 also described above can be employed to control the fin solar cell temperatures as desired. Advantageously, solar cell integrated fin shaders 1730 provide daylighting penetration, view-out shading efficacy, and solar power production. The tilted angle and spacing of the solar fins can vary depending on building location and façade orientation. Solar fin shaders 1730 are herein depicted in an elongated rectangular shaped, spaced-apart slat fashion, individually fastened using any suitable attaching mechanism as shown in FIGS. 58 and 60. The solar fin shaders 1730 can include photovoltaic cells thereon in a square-like or other fashion.

System 1800 of FIGS. 58 and 60 including solar fin shaders 1730 also advantageously may be factory-assembled unitized BIPV-CCF systems generating solar energy to power building operation and also help in reducing heating, cooling, and artificial lighting demands, resulting in energy savings. The systems further advantageously allow for view-out and daylighting, enhancing the user experience and promoting health and well-being.

Figure 59:
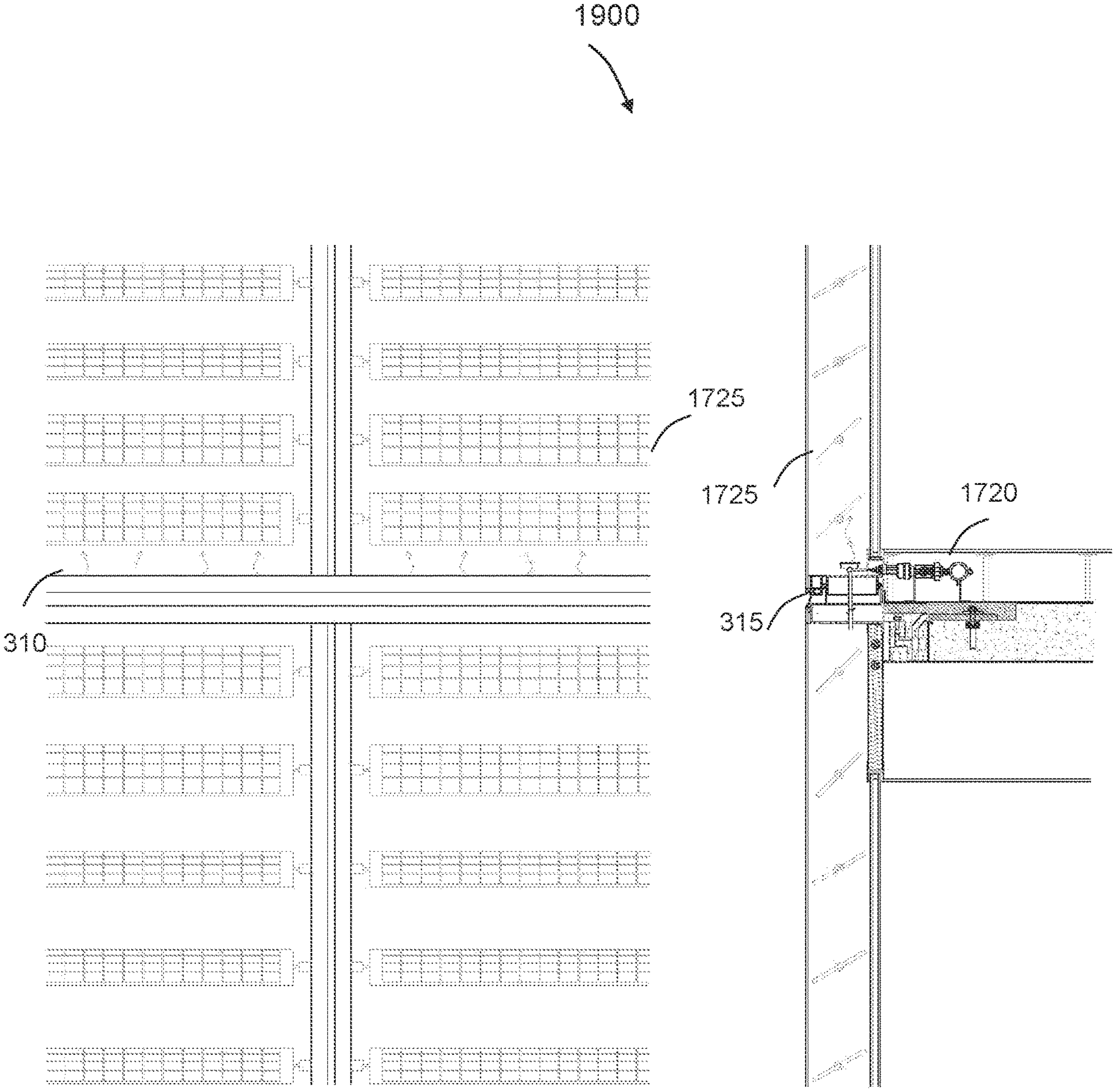
FIG. 59 is a partial cross-section of a portion of a photovoltaic curtain wall system depicting solar louver shaders, in a horizontal alignment, with an air circulation device.
Figure 61:
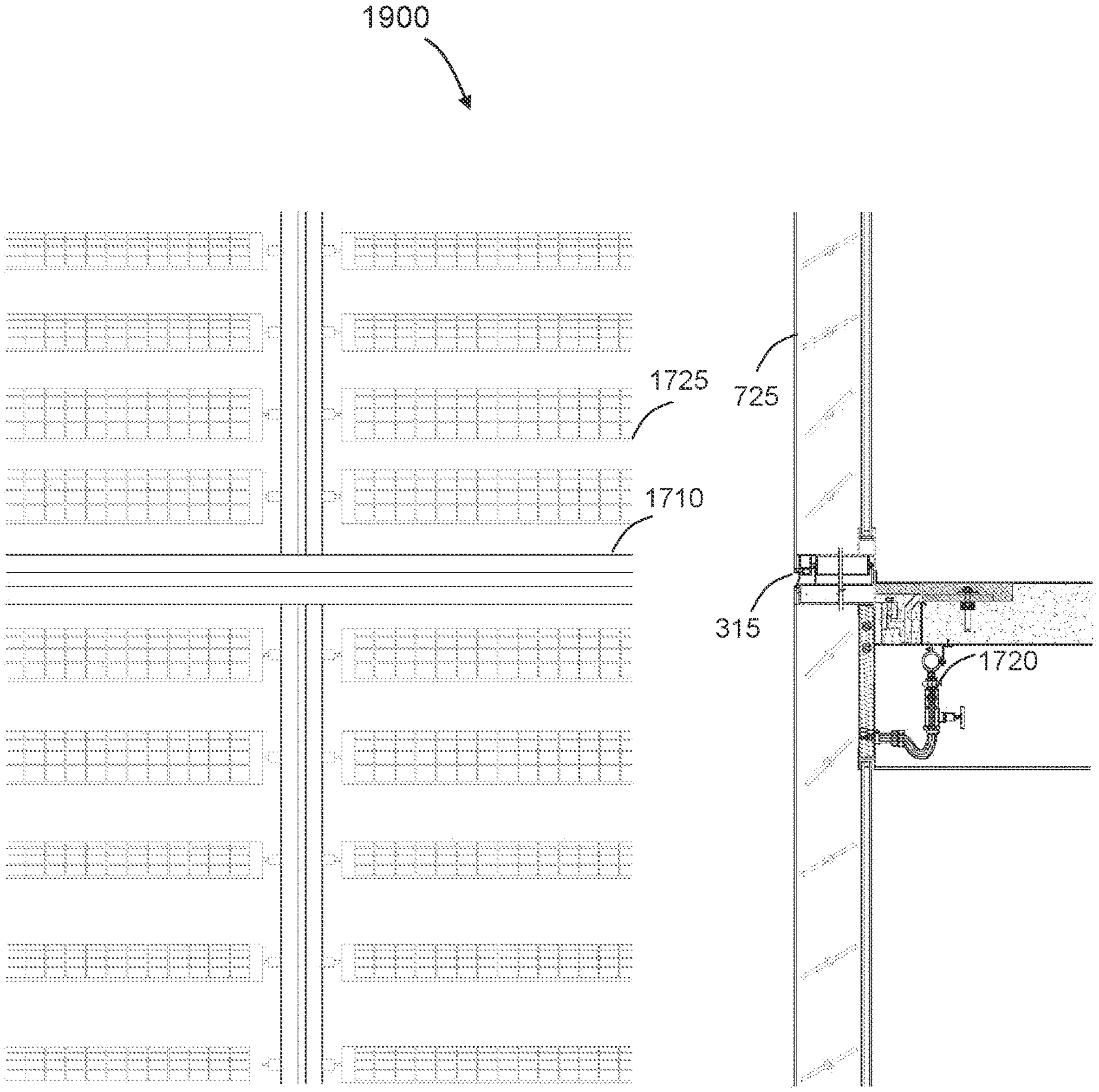
FIG. 61 is a partial cross-section of a portion of a photovoltaic curtain wall system depicting solar louver shaders, in a horizontal alignment, with another air circulation device.

FIG. 59 is a partial cross-section of a portion of a photovoltaic curtain wall system 1900 depicting solar louver shaders 1735, in a horizontal alignment, with an air circulation device 1720; and FIG. 61 is a partial cross-section of a portion of a photovoltaic curtain wall system 1900 depicting solar louver shaders 1735, in a horizontal alignment, with another air circulation device 1720. As described above, air circulation device 1720 can be any suitable device or system to regulate cell temperature and cavity condensation and is particularly suited for closed cavity operation. Air circulation device 1720 is also similar to the air flow system described below regarding FIG. 62. The air circulation device 1720 depicted in FIG. 61 is particularly similar to the air flow system described below regarding FIG. 62 and thus those descriptions similarly apply here.

Localized air nozzles 1710 also described above can be employed to control the louver solar cell temperatures as desired. Advantageously, solar cell integrated louver shaders 1725 provide daylighting penetration, view-out shading efficacy, and solar power production. The tilted angle and spacing of the solar fins can vary depending on building location and façade orientation. The solar cell integrated louver shaders 1725 are herein depicted in an elongated rectangular shaped, spaced-apart slat fashion, individually fastened using any suitable attaching mechanism as shown in FIGS. 59 and 61. Thus, embodiments can include a construction including an arrangement of parallel, horizontal, slats and the shaders 1725 can include photovoltaic cells thereon in a square-like or other fashion.

System 1900 of FIGS. 59 and 61 including shaders 1725 also advantageously may be factory-assembled unitized BIPV-CCF systems generating solar energy to power building operation and also help in reducing heating, cooling, and artificial lighting demands, resulting in energy savings. The systems further advantageously allow for view-out and daylighting, enhancing the user experience and promoting health and well-being.

Figure 62:
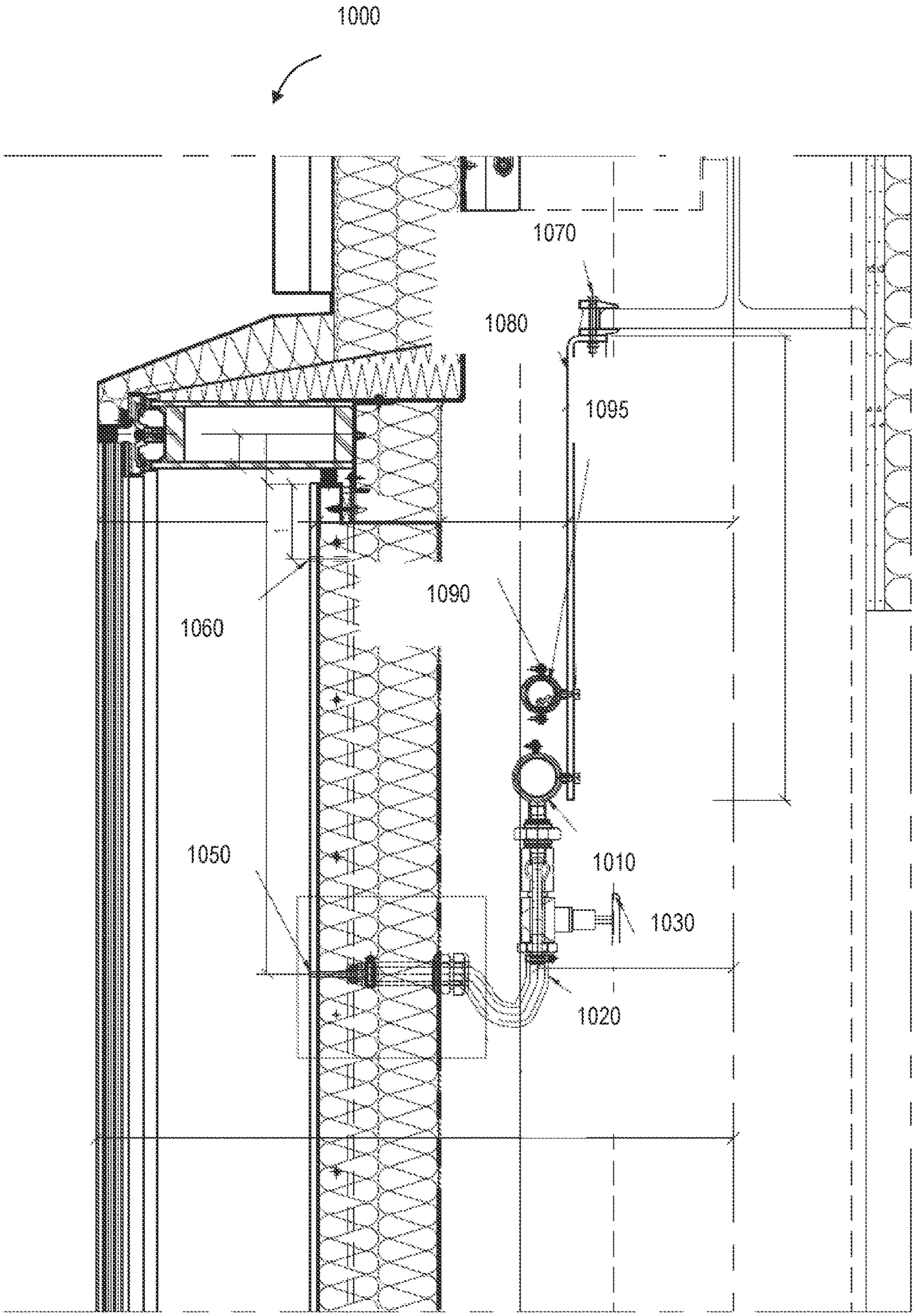
FIG. 62 is a schematic illustration a partial cross-section of system 1000 depicting an air flow system similar to the building integrated photovoltaic system (BIPV) depicted in FIG. 40.

Referring now to FIG. 62 referenced above, FIG. 62 is a schematic illustration of a partial cross-section of system 1000 depicting an air flow system similar to the building integrated photovoltaic system (BIPV) 900 depicted in FIG. 40. As shown therein, pneumatic pipe 1010 is connected to air tube 1020 via panel valve 1030. Supplied dry air 1040 then exits at outlet 1050 of the air tube 1020 with panel ventilation depicted at 1060. Also depicted in system 1000 is bracketing and clamping system including clamp 1070, steel bracket 1080, pipe clamp 1090, as well as electrical conduit 1095.

Figure 30:
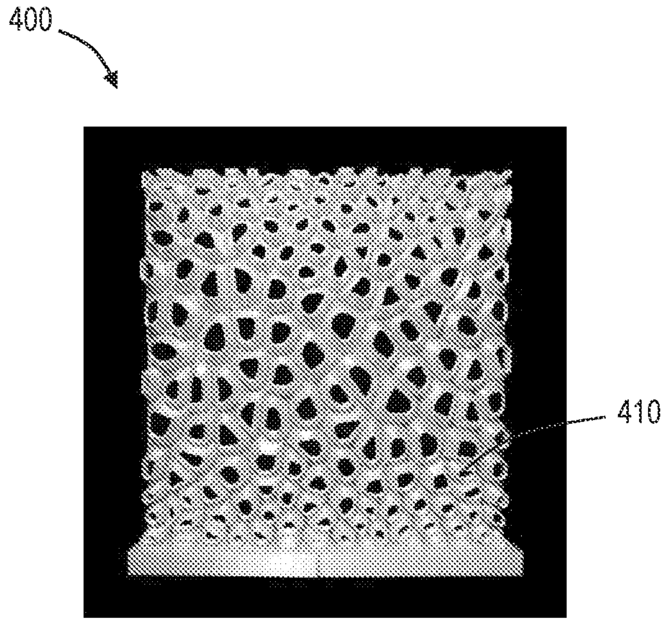
FIG. 30 is a schematic illustration of a photocatalytic enclosure system.
Figure 31:
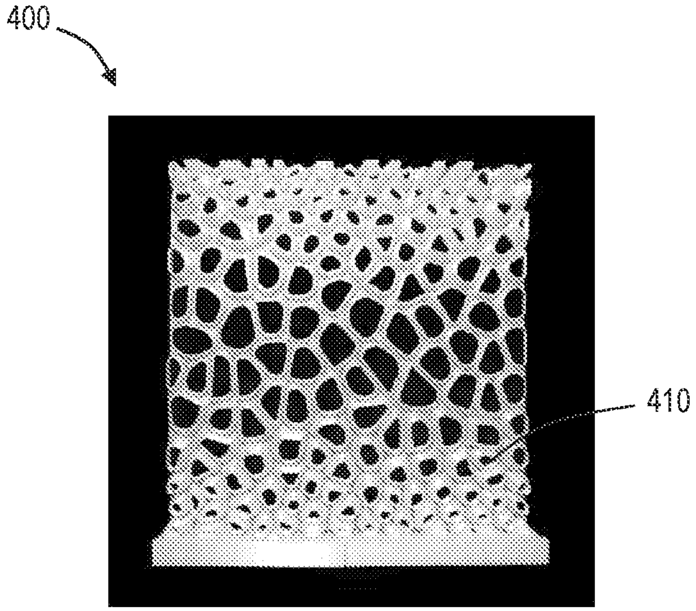
FIG. 31 is a schematic illustration of an alternate layout of the photocatalytic enclosure system of FIG. 30.
Figure 32:
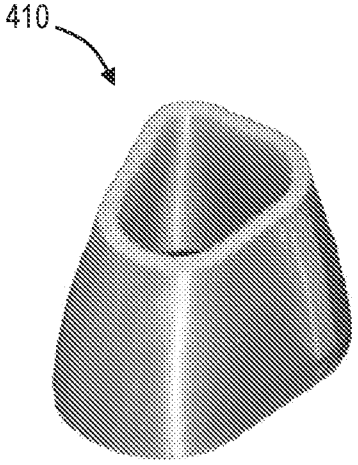
FIG. 32 is schematic illustration of an open cell of the photocatalytic enclosure system of FIG. 30.
Figure 33:
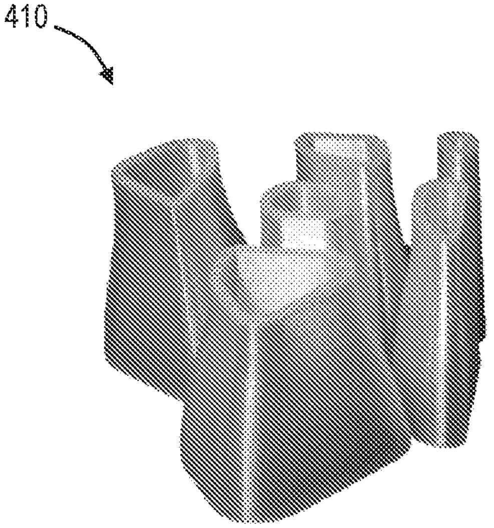
FIG. 33 is a schematic illustration of alternate shapes for the open cell of FIG. 32.

Referring now back to FIG. 30, FIG. 30 is a schematic illustration of a photocatalytic enclosure system 400. FIG. 31 is a schematic illustration of an alternate layout of the photocatalytic enclosure system 400 of FIG. 30. FIG. 32 is schematic illustration of an open cell 410 of the photocatalytic enclosure system 400 of FIG. 30. FIG. 33 is a schematic illustration of alternate shapes for the open cell 410 of FIG. 32.

Referring to FIGS. 30-33, the photocatalytic enclosure system 400 includes an array of open cells 410. In embodiments, the array of open cells is 410 formed as a unitary structure that is a single structurally formed entity. In embodiments, the photocatalytic enclosure system 400 is a prefabricated unit with cost-effective constructability and long-term durability.

In embodiments, the open cells 410 are coated with Titanium Dioxide ($TiO_2$). Due to the $TiO_2$, the photocatalytic enclosure system 400 operates as a smog eating façade, as the $TiO_2$ acts as a catalyst activated by solar UV to remove common urban smog such as NO, $NO_2$, SO, and VOCs.

The open cells 410 are 3D open cells that are optimized to balance daylighting, solar radiation, and air purification. This acts as a daylight reflection and/or shading device. In embodiments, the photocatalytic enclosure system 400 is installed at one of outside of a window and inside of a window. In embodiments, the photocatalytic enclosure system 400 is encapsulated between a double skin facade where external air flows through and is purified. The geometry and scale of the photocatalytic 3D cells are optimized based on façade orientations, site locations, and wind (air flow) characteristics. In embodiments, the material of the open cells 410 is one of be opaque, translucent, and transparent depending on the priority of performance requirements (e.g. air purification, daylighting penetration, solar shading, and view-out). Materials range from lightweight fiber concrete, fiber plastics, clear polymers, ceramics, terracotta, and metal.

The photocatalytic enclosure system 400 also serves as a light reflection and shading device that can maximize daylighting while minimizing energy consumption from heating, cooling, and artificial light loads. This energy efficiency will offset $CO_2$ emission by burning fossil fuels.

Figure 34:
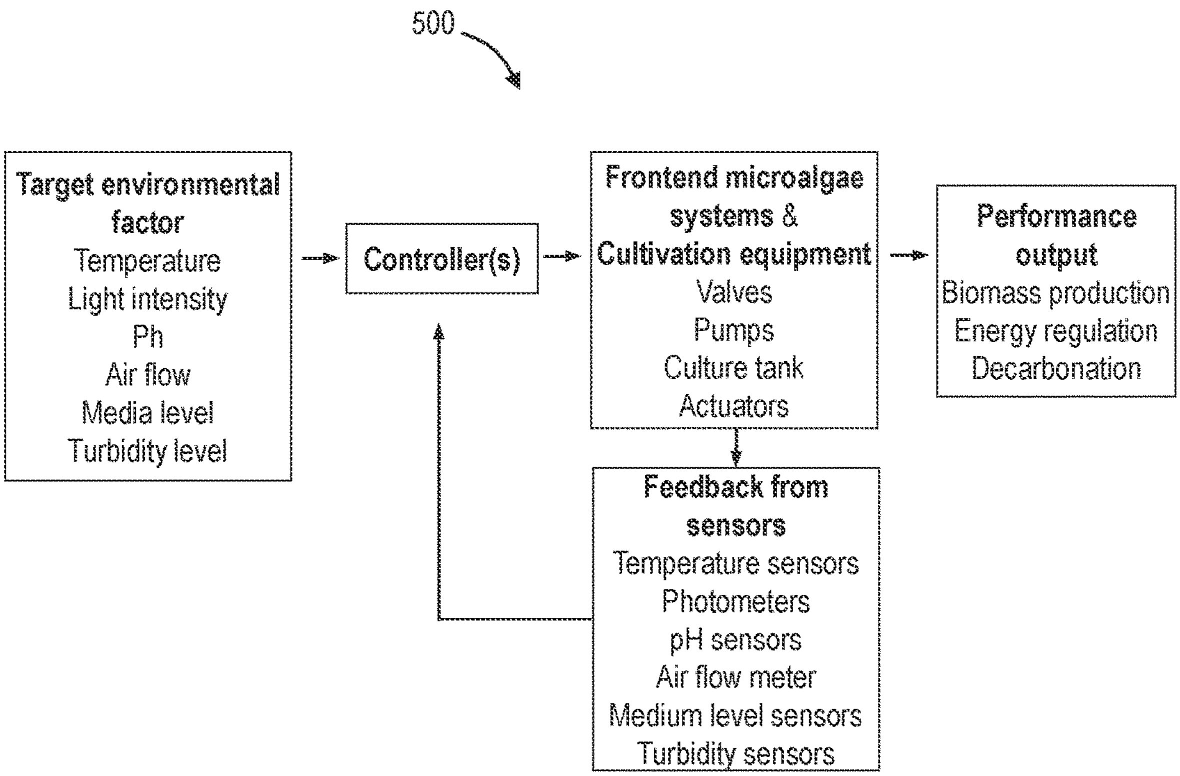
FIG. 34 is a schematic illustration of programmable logic for controlling a microalgae system.

FIG. 34 is a schematic illustration of programmable logic 500 for controlling a microalgae system. In some embodiments, the system is the microalgae system 100 illustrated in FIG. 1. Microalgae cultivation requires close monitoring and control of environmental factors to ensure the efficient operation of the system as concerns culturing, enrichment, microalgae collection, harvesting, and bio-product processing. In various embodiments, the target environmental conditions are monitored and controlled by measuring data using various sensors, such as sensors 204 of FIG. 1. In various embodiments, these sensors include temperature sensors, photometers, pH sensors, oxygen sensors, turbidity sensors, flow meters, and the like. The sensors are utilized to detect system changes in culture temperature, light intensity, pH of the medium, nutrients, salinity, and the like. In response to environmental conditions being out of predetermined ranges, inflow and outflow of media, energy, gas, other materials, and the like are adjusted by the controller(s), such as controller 200. The control, such as the programmable logic control outlined in FIG. 34 can be optimized for maximum culture productivity.

Figure 35:
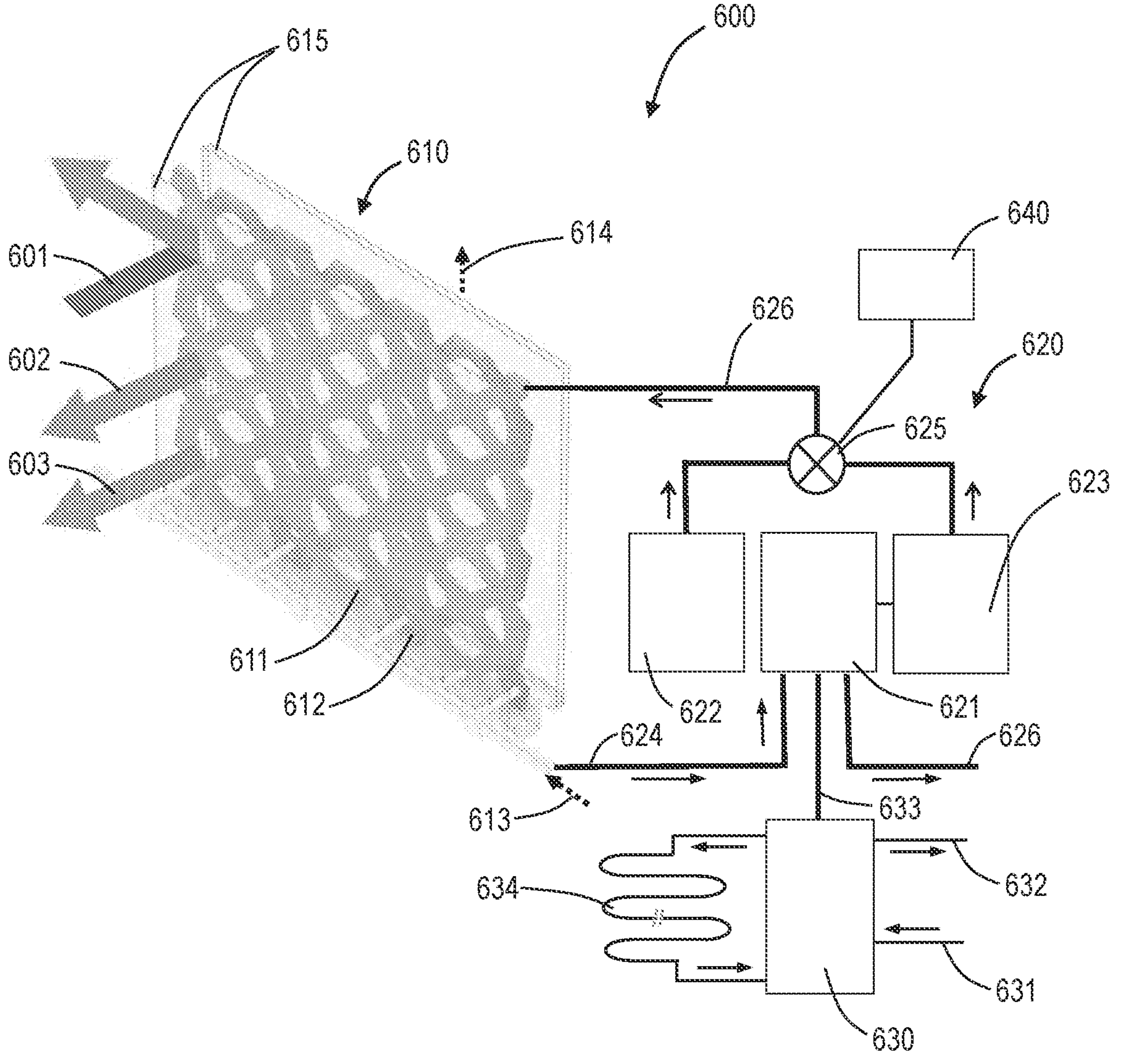
FIG. 35 is a schematic illustration of operation of a microalgae system.

FIG. 35 is a schematic illustration of operation of a microalgae system 600. Referring to FIG. 35, in various embodiments, the microalgae system 600 is integrated into the system 100 of FIG. 1. The microalgae system 600 includes a microalgae curtain wall, such as any of the microalgae curtain walls disclosed herein. In the embodiment illustrated, the microalgae curtain wall includes biochromic window 610. In various embodiments, the biochromic window 610 includes one or more circuits of bioreactors (such as photobioreactors 121 disclosed above) with transparent or semi-transparent walls/windows 615 on each side of the bioreactors. In the embodiment illustrated in FIG. 35, the biochromic window 610 includes interlocking bioreactors 611, 612.

In embodiments, the microalgae system 600 includes a microalgae circuit 620. The microalgae circuit 620 includes storage 621, 622, 623, such as tanks. In some embodiments, the storage 621, 622, 623 includes a returned microalgae storage 621, a microalgae culture storage 622, and a non-microalgae storage 623. In some of these embodiments, the microalgae culture storage 622 is configured to receive microalgae cultures from the returned microalgae storage 621, and includes 100% microalgae contained therein, while the non-microalgae storage 623 includes 0% microalgae.

In embodiments, microalgae circuit 620 includes an actuator 625 that is configured to control an amount of microalgae being extracted from the microalgae culture storage 622 and fed to one or more bioreactors via an algae intake line 626. In particular, each of the microalgae culture storage 622 and the non-microalgae storage 623 are connected to the actuator 625, such that how much material fed from each is controlled thereby. While a single actuator 625 is shown in the embodiment illustrated, multiple separate actuators can also be used. A controller 640 is configured to control the actuator 625. In various embodiments, the controller 640 is the controller 200.

The bioreactors 611, 612 receive the algae from the algae intake line 626 and carbon dioxide from a carbon dioxide intake line 613 to grow algae therein and which is extracted via a grown algae outtake line 624. The grown algae is fed to the returned microalgae storage 621. The returned microalgae storage 621 is connected to the microalgae culture storage 623 to provide the microalgae cultures thereto. The returned microalgae storage 621 is also connected to an algae extraction line 626 for extracting grown microalgae from the system for use thereof.

In some embodiments, the microalgae system 600 also includes a heat exchanger 630. In the embodiment illustrated, the heat exchanger 630 is connected to the returned microalgae storage via a heat exchanger line 633. In other embodiments, the grown algae outtake line 624 feeds through the heat exchanger 630 before returning the microalgae to the returned microalgae storage 621. In embodiments, the heat exchanger 630 is configured to receive main water from a water inlet 631 to heat water for domestic use which is supplied via a water outlet 632. In some embodiments, the heat exchanger 630 is also configured to supply heat for hydronic heating via a hydronic heating line 634. In embodiments, solar energy is stored in the biochromic window during the daytime and serves as thermal storage. The stored heat energy after photosynthesis can then be used for the hydronic heating, domestic hot water heating, and the like.

In various embodiments, the microalgae system 600 is configured to regulate heat transmission 601 (dynamic insulation), solar gain 602 (shading efficiency), daylight 603 (daylighting and view-out), and carbon dioxide levels. This is accomplished by controlling a concentration, color, and tint of the microalgae being grown in the bioreactors 611, 612, such as via controller 640 and the actuator(s) 625 In various embodiments, the control is based on desired heat transmission 601, solar gain 602, daylight levels that are either predetermined or determined based on other environmental factors. In various embodiments, the control is also based on solar intensity and carbon dioxide levels. In embodiments, the microalgae system 600 is configured for a semi continuous production mode of the microalgae, which allows for control of a density of the microalgae.

In various embodiments, each bioreactor 611, 612 includes a separate microalgae circuit 620. In these embodiments, heat transmission 601, solar gain 602, and daylight 603 regulation can be managed by each bioreactor 611, 612 independently, which allows for increased dynamic control and allows for viewing windows to be temporarily provided by reducing a turbidity level of the microalgae in one or more of the bioreactors 611, 612.

In various embodiments, when increased insulation is desirable, the microalgae system 600 is configured to supply room air into the microalgae curtain wall/biochromic window 610, which reduces temperature-based heat transfer between the inside and outside. Utilizing this dynamic insulation with dynamic insulation provided by increasing the algae in the bioreactors along with the heat supplied by the algae for both hydronic heating and domestic water, heating results in energy savings and better thermal comfort of occupants. In embodiments, the dynamic insulation control can be based on the desirability to retain heat within a room, expel heat from the room, or block heat from entering the room.

Figure 36:
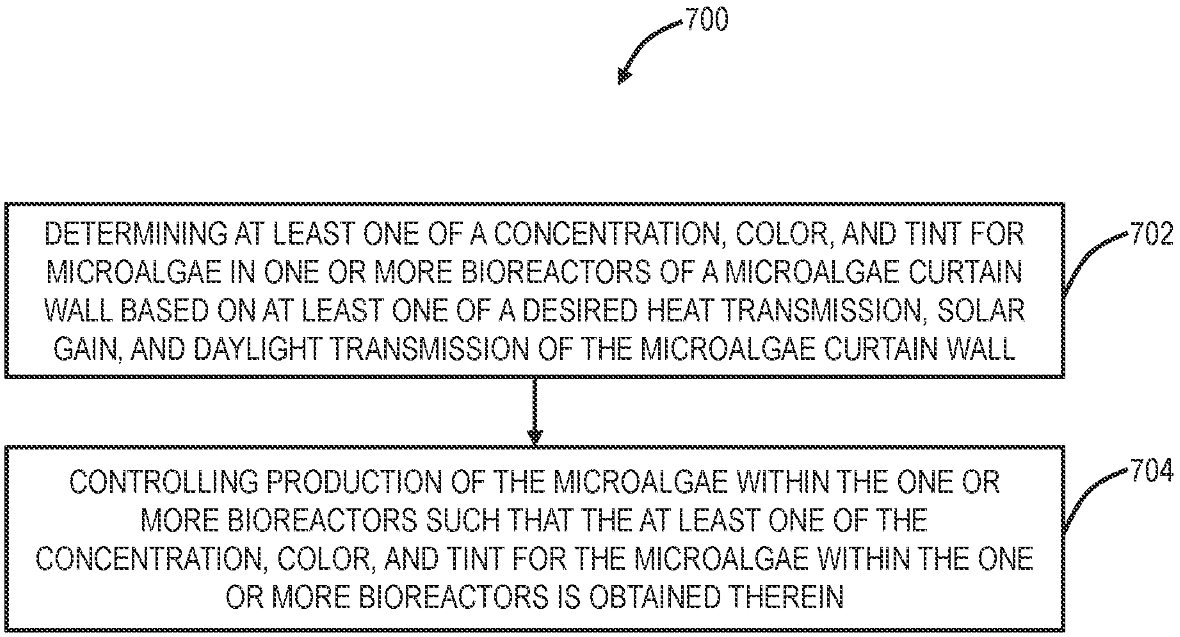
FIG. 36 is a method for controlling a microalgae system.

FIG. 36 is a method 700 for controlling a microalgae system. The method includes determining at least one of a concentration, color, and tint for microalgae in one or more bioreactors of a microalgae curtain wall based on at least one of a desired heat transmission, solar gain, and daylight transmission of the microalgae curtain wall at step 702. In various embodiments, the desired heat transmission is based on internal temperatures of a room adjoining the microalgae curtain wall and exterior temperatures and whether, based on temperature control settings for the room, heat should be retained within the room, heat should be expelled from the room, or heat should be blocked from entering the room. In various embodiments, the microalgae curtain wall is a biochromic window, and the desired solar gain and daylight transmission of the microalgae is based on settings provided by an occupant in the room.

The method also includes controlling production of the microalgae within the one or more bioreactors such that the at least one of the concentration, color, and tint for the microalgae within the one or more bioreactors is obtained therein at step 704. In various embodiments, step 704 includes controlling how much and how often microalgae cultures are provided to the one or more bioreactors. In some of these embodiments, step 704 also includes controlling an amount of carbon dioxide provided to the one or more bioreactors.

In some embodiments, the bioreactor system includes multiple bioreactor circuits, and the controller is configured to individually control the at least one of the concentration, color, and tint of the microalgae contained within each of the multiple photobioreactor circuits. In some of these embodiments, based on a user controlled selection, reducing a turbidity level of at least one photobioreactor circuit to provide one or more viewing windows for an occupant.

In some embodiments, the method further includes supplying air from the adjoining room into a space of the microalgae curtain wall surrounding the one or more bioreactors to increase insulation of the microalgae curtain wall.

In some embodiments, the method further includes diverting returned microalgae to a heat exchanger and extracting heat from the microalgae for at least one of hydronic heating and domestic water heating.

Figure 37:
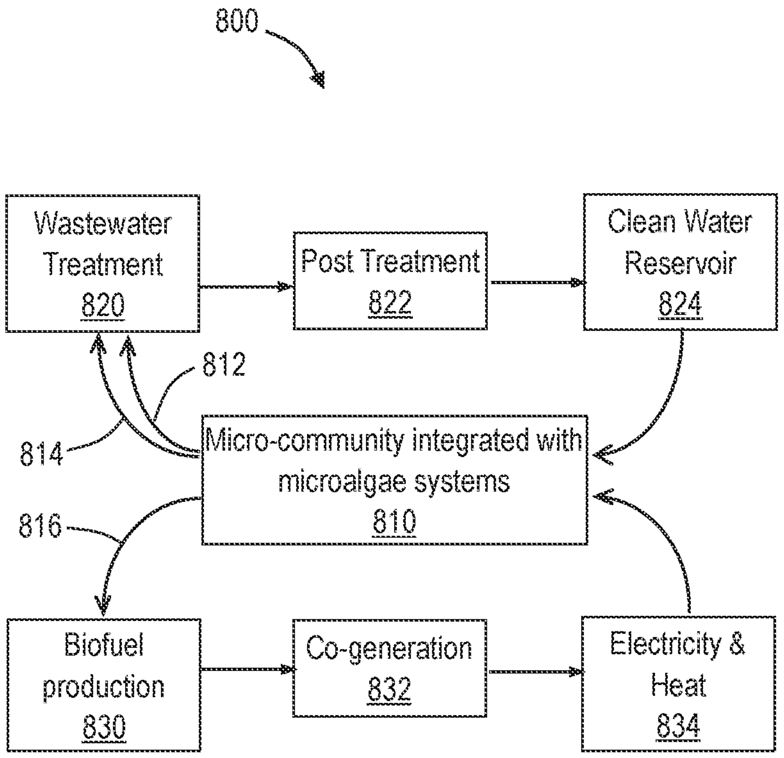
FIG. 37 is a schematic illustration of a closed-loop microalgae system.

FIG. 37 is a schematic illustration of a closed-loop microalgae system 800. In various embodiments, the closed-loop microalgae system 800 is implemented for an off grid residential community that is able to process wastewater treatment and clean energy production on-site without relying on city grids. As can be seen in FIG. 37, the closed-loop microalgae system 800 allows for a closed-loop, holistic food-water-energy feedback production. Waste, such as wastewater and flue gas, generated by the micro-community 810 supplies nutrients for microalgae growth to the microalgae system of the micro-community 810 The biomass produced provides is provided for biofuel production 830, which is used to produce biofuel energy, such as via co-generation 832. The biofuel energy is then provided for community use, such as for electricity and heat 834. Recovered wastewater 812 after use as part of the microalgae growth, along with concentrated microalgae 814 is provided to wastewater treatment that utilizes the concentrated microalgae for treatment of the recovered wastewater 812. In embodiments, a post treatment 822 is performed on the water to ensure usability thereof and it is stored in a clean water reservoir 824 that is supplied back to the micro-community 810 for use thereof, such as for domestic water usage and landscape irrigation.

In embodiments, microalgae enclosures in the micro-community serve as an alternative building system to provide operational cost savings and occupant health and well-being. They offer good summer shading efficacy by increasing density and color responding to solar intensity, thus reducing cooling load. They offer maximum winter solar gain because their growth rate in winter would be slower and less dense, thus reducing heating demand. Microalgae enclosures can achieve daily, seasonal density targets by withdrawing grown microalgae and filling in new media or vice versa. They can also contribute to $CO_2$ capture and increase their biomass for potential economic return.

In various embodiments, the microalgae biomass harvested from the microalgae system is used in any of a number of ways including for direct use, for bio active compounds, for biofuel, and for bioelectricity. Direct use can include human food, animal food, food supplements, and the like. Bio active compounds can include poly unsaturated fatty acid, proteins, antioxidants, astaxanthin, beta carotene, vitamins, and the like. Biofuel can include solid biofuel (e.g., bio-char), liquid biofuel (e.g. bioetanol, biodiesel, vegetable oil), a gaseous biofuel (e.g. biohydrogen, biosyngas). Bioelectricity can include Microalgae-based microbial fuel cells (mMFC).

Thus, in an exemplary embodiment, the present disclosure provides a microalgae system including a microalgae curtainwall for a building that serves as a building enclosure that provides solar heat control, daylight transmission, thermal insulation, and structural integrity to the building, replacing building enclosures, such as low energy efficient windows.

In one exemplary embodiment, the present disclosure provides a microalgae curtain wall. The microalgae curtain wall includes photobioreactors, an interior glass panel, an exterior glass panel, transoms, and mullions. The photobioreactors are adapted to receive sunlight and carbon dioxide to grow microalgae received therein. The exterior glass panel is offset from the interior glass panel forming a gap therebetween. The transoms hold the interior glass panel and the exterior glass panel therebetween. The transoms suspend the photobioreactors in the gap and between the interior glass panel and the exterior glass panel.

In one embodiment of the microalgae curtain wall, the photobioreactors are arranged in an array forming open areas therebetween that are adapted to allow a view therethrough.

In another embodiment of the microalgae curtain wall, the transoms include at least one upper photobioreactor support bracket and at least one lower photobioreactor support bracket with vertically slotted holes that hold and suspend the photobioreactors therebetween.

In a further embodiment of the microalgae curtain wall, the microalgae curtain wall further includes mullions holding the interior glass panel and the exterior glass panel therebetween and positioned at sides of the photobioreactors. Optionally, the mullions are offset from the sides of the photobioreactors with a localized bracket. Optionally, each of the transoms and the mullions include glass support brackets for the interior glass panel and the exterior glass panel, forming a seal therewith, and wherein the transoms, the mullions, the interior glass panel, and the exterior glass panel form an insulated glass structure. And optionally, the microalgae curtain wall, including the transoms, the mullions, the interior glass panel, the exterior glass panel, and the photobioreactors, forms a modular, prefabricated component.

In yet another embodiment of the microalgae curtain wall, the photobioreactors include multiple photobioreactor components joined together by one or more brackets with a gasket therebetween. Optionally, each of the photobioreactor components includes a key on opposing sides with the one or more brackets received therein.

In yet a further embodiment of the microalgae curtain wall, the photobioreactors are arranged in an array with at least one of a partially overlapping and interlocking pattern.

In another exemplary embodiment, the present disclosure provides a microalgae system. The microalgae system includes a microalgae storage tank and a microalgae curtain wall. The microalgae storage tank adapted to store microalgae cultures. The microalgae curtain wall includes photobioreactors, an interior glass panel, an exterior glass panel, and transoms. The photobioreactors are adapted to receive the microalgae cultures from the microalgae storage tank and to grow microalgae. The exterior glass panel is offset from the interior glass panel forming a gap therebetween. The transoms hold the interior glass panel and the exterior glass panel therebetween and suspend the photobioreactors in the gap and between the interior glass panel and the exterior glass panel.

In one embodiment of the microalgae system, the photobioreactors are arranged in an array forming open areas therebetween that are adapted to allow a view therethrough.

In another embodiment of the microalgae system, the transoms include at least one upper photobioreactor support bracket and at least one lower photobioreactor support bracket with vertically slotted holes that hold and suspend the photobioreactors therebetween.

In a further embodiment of the microalgae system, the photobioreactors include multiple photobioreactor components joined together by one or more brackets with a gasket therebetween.

In yet another embodiment of the microalgae system, the microalgae system further includes an oxygen outlet line adapted to supply oxygen produced by the microalgae to a heating, ventilation, and air conditioning system of the building.

In yet a further embodiment of the microalgae system, the microalgae system further includes onsite energy production adapted to receive the microalgae from the microalgae curtain wall and convert the microalgae into energy.

In still another embodiment of the microalgae system, the microalgae system further includes a dewatering plant adapted to separate the microalgae from the microalgae curtain wall from water therein.

In another embodiment of the microalgae system, the curtain wall further includes mullions holding the interior glass panel and the exterior glass panel therebetween and positioned at sides of the photobioreactors. At least one of the mullions and the transoms are anchored to a building structure. Optionally, the microalgae curtain wall, including the transoms, the mullions, the interior glass panel, the exterior glass panel, and the photobioreactors, forms a modular component, and wherein the microalgae system includes a plurality of the modular component. And optionally, each of the transoms and the mullions include glass support brackets for the interior glass panel and the exterior glass panel, forming a seal therewith, and wherein the transoms, the mullions, the interior glass panel, and the exterior glass panel form an insulated glass structure.

In a further exemplary embodiment, the present disclosure provides a microalgae system. The microalgae system includes a microalgae storage tank, a microalgae curtain wall and a controller. The microalgae storage tank is adapted to store microalgae cultures. The microalgae curtain wall includes one or more photobioreactors adapted to receive the microalgae cultures from the microalgae storage tank and to grow microalgae. The controller is configured to determine at least one of a concentration, color, and tint for microalgae in one or more bioreactors of a microalgae curtain wall based on at least one of a desired heat transmission, solar gain, and daylight transmission of the microalgae curtain wall and control production of the microalgae within the one or more bioreactors such that the at least one of the concentration, color, and tint for the microalgae within the one or more bioreactors is obtained therein.

In one embodiment of the microalgae system, the one or more photobioreactors are arranged in an array including multiple photobioreactor circuits, and wherein the controller is configured to individually control the at least one of the concentration, color, and tint of the microalgae contained within each of the multiple photobioreactor circuits.

In another embodiment of the microalgae system, the controller is configured to, based on a user controlled selection, reducing a turbidity level of at least one photobioreactor circuit to provide one or more viewing windows for an occupant.

In a further embodiment of the microalgae system, the desired heat transmission is based on internal temperatures of a room adjoining the microalgae curtain wall and exterior temperatures and whether, based on temperature control settings for the room, heat should be retained within the room, heat should be expelled from the room, or heat should be blocked from entering the room.

In yet another embodiment of the microalgae system, the microalgae curtain wall is a biochromic window, and the desired solar gain and daylight transmission of the microalgae is based on settings provided by an occupant in the room.

In yet a further embodiment of the microalgae system, controlling production of the microalgae includes controlling how much and how often microalgae cultures are provided to the one or more photobioreactors. Optionally, controlling the production of the microalgae also includes controlling an amount of carbon dioxide provided to the one or more photobioreactors.

In still another embodiment of the microalgae system, the controller is also configured to divert returned microalgae to a heat exchanger and extract heat from the microalgae for at least one of hydronic heating and domestic water heating.

In still a further embodiment of the microalgae system, the microalgae curtain wall further includes an interior glass panel, an exterior glass panel, and transoms. The exterior glass panel offset from the interior glass panel forming a gap therebetween. The transoms hold the interior glass panel and the exterior glass panel therebetween and suspend the photobioreactors in the gap and between the interior glass panel and the exterior glass panel. Optionally, the curtain wall further includes mullions holding the interior glass panel and the exterior glass panel therebetween. The mullions are positioned at sides of the photobioreactors. At least one of the mullions and the transoms are anchored to a building structure. Each of the transoms and the mullions include glass support brackets for the interior glass panel and the exterior glass panel, forming a seal therewith. The transoms, the mullions, the interior glass panel, and the exterior glass panel form an insulated glass structure. The controller is also configured to supply air from the adjoining room into a space within the insulated glass structure surrounding the one or more photobioreactors to increase insulation of the microalgae curtain wall.

In yet another exemplary embodiment, the present disclosure provides a method for controlling a microalgae system. The method includes determining at least one of a concentration, color, and tint for microalgae in one or more bioreactors of a microalgae curtain wall based on at least one of a desired heat transmission, solar gain, and daylight transmission of the microalgae curtain wall. The microalgae curtain wall includes one or more photobioreactors adapted to receive microalgae cultures from a microalgae storage tank and to grow microalgae. The method also includes controlling production of the microalgae within the one or more bioreactors such that the at least one of the concentration, color, and tint for the microalgae within the one or more bioreactors is obtained therein.

In one embodiment of the method, the one or more photobioreactors are arranged in an array including multiple photobioreactor circuits, and the method includes individually controlling the at least one of the concentration, color, and tint of the microalgae contained within each of the multiple photobioreactor circuits.

In another embodiment of the method, the method further includes, based on a user controlled selection, reducing a turbidity level of at least one photobioreactor circuit to provide one or more viewing windows for an occupant.

In a further embodiment of the method, the desired heat transmission is based on internal temperatures of a room adjoining the microalgae curtain wall and exterior temperatures and whether, based on temperature control settings for the room, heat should be retained within the room, heat should be expelled from the room, or heat should be blocked from entering the room.

In yet another embodiment of the method, the microalgae curtain wall is a biochromic window, and the desired solar gain and daylight transmission of the microalgae is based on settings provided by an occupant in the room.

In yet a further embodiment of the method, controlling production of the microalgae includes controlling how much and how often microalgae cultures are provided to the one or more photobioreactors. Optionally, controlling the production of the microalgae also includes controlling an amount of carbon dioxide provided to the one or more photobioreactors.

In still another embodiment of the method, the method further includes diverting returned microalgae to a heat exchanger and extracting heat from the microalgae for at least one of hydronic heating and domestic water heating.

In still a further embodiment of the method, the microalgae curtain wall further includes an interior glass panel, an exterior glass panel, and transoms. The exterior glass panel offset from the interior glass panel forming a gap therebetween. The transoms hold the interior glass panel and the exterior glass panel therebetween and suspend the photobioreactors in the gap and between the interior glass panel and the exterior glass panel. Optionally, the curtain wall further includes mullions holding the interior glass panel and the exterior glass panel therebetween. The mullions are positioned at sides of the photobioreactors. At least one of the mullions and the transoms are anchored to a building structure. Each of the transoms and the mullions include glass support brackets for the interior glass panel and the exterior glass panel, forming a seal therewith. The transoms, the mullions, the interior glass panel, and the exterior glass panel form an insulated glass structure. The method further includes supplying air from the adjoining room into a space within the insulated glass structure surrounding the one or more photobioreactors to increase insulation of the microalgae curtain wall.

Thus, in various embodiments, the present disclosure relates to systems and methods for a microalgae system. In particular, the microalgae system includes a microalgae curtain wall that serves as a primary building enclosure, such as a traditional window, that provides holistic utilitarian functions of adequate thermal and structural performance, good daylight transmission, shading efficacy as well as air tightness and water tightness in accordance with industry standards.

The microalgae curtain wall, through microalgae growth therein, improves indoor and outdoor air quality through $O_2$ production and $CO_2$ bio fixation as a result of photosynthesis by the microalgae. As another benefit, the microalgae harvested from the microalgae curtain wall can be extracted and converted into renewable fuel stocks, such as biomass or biofuel. The renewable fuel converted from the microalgae can offset building energy consumption from the built environment and can be integrated into the green fuel industry. For example, the microalgae curtain wall can produce the heat as a byproduct to supply the heat demands of the building, such as for space heating and for domestic hot water. Furthermore, the microalgae curtain wall can serve as a cost-effective and sustainable infrastructure for domestic wastewater treatment due to the ability of microalgae to provide oxygenation by photosynthesis and water sanitation.

In some embodiments, the microalgae curtain wall is prefabricated, which can further contribute to lower development and construction costs, resulting in a cost effective and durable curtain wall that can be retrofitted to existing buildings and incorporated into new construction.

In various embodiments, the present disclosure further relates to systems and methods for a photocatalytic enclosure system. The photocatalytic enclosure system includes an array of open cells that are coated with Titanium Dioxide that acts as a catalyst for removing air pollution. In embodiments, the photocatalytic enclosure system encapsulates the array of open cells between a double skin facade that is adapted to purify air flowing therethrough.

In various embodiments, the present disclosure further relates to systems and methods for controlling a microalgae system. In particular, the concentration, color, and tint of the microalgae within the system is controlled to regulate heat transmission, solar gain, and daylighting transmission and to respond to solar intensity and $CO_2$ levels. Energy stored in the microalgae system is reclaimed and transferred, such as via a heat exchanger, to other building service systems such as for space and domestic hot water heating.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

Additionally, all of the herein described elements, features, disclosures and so forth may be used in any and all combinations in embodiments of the invention.

What is claimed is:

1. A photovoltaic curtain wall system comprising:

a three-dimensional (3D) solar module configured to receive sunlight and reflect sun path geometry;

an interior glass unit comprising a single or a double glass panel;

an exterior glass panel offset from the interior glass unit forming a gap therebetween, wherein the gap is a conditioned, closed air cavity receiving the solar module;

wherein the solar module comprises: rotatable or fixed micro-oculus shaders of varying angles or curvatures, each micro-oculus shader including an ocular shape with an upper shading portion and a lower shading portion, the upper shading portion protruding outward from a circular base of the micro-oculus shader in the axial direction relative to the base and at least partially toward the axis of the base and the upper shading portion includes photovoltaic elements on a top portion of the upper shading portion; and the lower shading portion protruding outward from the circular base of the micro-oculus shade in the axial direction relative to the axis of the base and at least partially away from the axis of the base;

the rotatable or fixed micro-oculus shaders being arranged in an array forming open areas therein that are configured to allow a view therethrough;

a transom holding the interior glass unit and the exterior glass panel therebetween;

wherein the photovoltaic curtain wall system is a prefabricated curtain wall system configured to be integrated with a building.

2. The photovoltaic curtain wall system of claim 1, wherein the rotatable or fixed micro-oculus shaders are arranged in a hexagonal array forming open areas therein that are configured to allow the view therethrough.

3. The photovoltaic curtain wall system of claim 1, wherein the upper shading portion of each micro-oculus shader is configured to generate electricity with the photovoltaic elements and the lower shading portion is configured to reflect light passing adjacent to the micro-oculus shader.

4. The photovoltaic curtain wall system of claim 3, wherein curvature of the upper shading portion is configured to be changed depending upon solar positions.

5. The photovoltaic curtain wall system of claim 1, wherein the three-dimensional (3D) solar module is configured to receive the sunlight normal to the upper shading portion to reduce cosine effect.

6. The photovoltaic curtain wall system of claim 1, further comprising a dynamic system including gears configured to rotate the micro-oculus shaders.

7. The photovoltaic curtain wall system of claim 1, wherein the photovoltaic elements on each micro-oculus shader are configured to be positioned on the micro-ocular shader with use of wiring, inset surfaces and grooves.

8. The photovoltaic curtain wall system of claim 1, further comprising a series-parallel circuit connection.

9. The photovoltaic curtain wall system of claim 1, wherein the rotatable micro-oculus shaders are linked in series or in parallel, and the photovoltaic curtain wall system further comprises a control system.

10. The photovoltaic curtain wall system of claim 9, wherein the control system is linked to a central system or a standalone system comprising a battery.

11. The photovoltaic curtain wall system of claim 1, wherein the three-dimensional (3D) solar modular is configured to be installed in the building, the building having a ceiling and floor, and the open areas of the solar modular at eye level are configured to be larger and gradually reduced when moving up to the ceiling and down to the floor.

12. A photovoltaic curtain wall system comprising:

a three-dimensional (3D) solar module configured to receive sunlight and reflect sun path geometry;

an interior, insulated glass unit comprising a double glass panel;

an exterior glass panel offset from the interior, insulated glass unit forming a gap therebetween, wherein the gap is a conditioned, closed air cavity receiving the solar module and the solar modular is suspended in the closed air cavity or attached to the interior, insulated glass unit;

wherein the solar module comprises: rotatable or fixed micro-oculus shaders of varying angles or curvatures, each micro-oculus shader including an ocular shape with an upper shading portion and a lower shading portion, the upper shading portion protruding outward from a circular base of the micro-oculus shader in the axial direction relative to the base and at least partially toward the axis of the base and the upper shading portion includes photovoltaic elements on a top portion of the upper shading portion; and the lower shading portion protruding outward from the circular base of the micro-oculus shade in the axial direction relative to the axis of the base and at least partially away from the axis of the base;

the rotatable or fixed micro-oculus shaders being arranged in an array forming open areas therein that are configured to allow a view therethrough;

a transom holding the interior, insulated glass unit and the exterior glass panel therebetween;

wherein the photovoltaic curtain wall system is a prefabricated curtain wall system configured to be integrated with a building, the building having a ceiling and floor, and the open areas of the solar modular at eye level are configured to be larger and gradually reduced when moving up to the ceiling and down to the floor.

13. The photovoltaic curtain wall system of claim 12, wherein the rotatable or fixed micro-oculus shaders are arranged in a hexagonal array forming open areas therein that are adapted to allow the view therethrough.

14. The photovoltaic curtain wall system of claim 12, wherein the upper shading portion of each micro-oculus shader is configured to generate electricity with the photovoltaic elements and the lower shading portion is configured to reflect light passing adjacent to the micro-oculus shader.

15. The photovoltaic curtain wall system of claim 14, wherein curvature of the upper shading portion is configured to be changed depending upon solar positions.

16. The photovoltaic curtain wall system of claim 12, wherein the three-dimensional (3D) solar module is configured to receive the sunlight normal to the upper shading portion to reduce cosine effect.

17. A method for integrating a photovoltaic curtain wall system in a building comprising, the method comprising:

providing a photovoltaic curtain wall system comprising:

a three-dimensional (3D) solar module configured to receive sunlight and reflect sun path geometry;

an interior glass unit comprising a single or a double glass panel;

an exterior glass panel offset from the interior glass unit forming a gap therebetween, wherein the gap is a conditioned, closed air cavity receiving the solar module;

wherein the solar module comprises: rotatable or fixed micro-oculus shaders with varying angles or curvatures, each micro-oculus shader including an ocular shape with an upper shading portion and a lower shading portion, the upper shading portion protruding outward from a circular base of the micro-oculus shader in the axial direction relative to the base and at least partially toward the axis of the base and the upper shading portion includes photovoltaic elements on a top portion of the upper shading portion; and the lower shading portion protruding outward from the circular base of the micro-oculus shade in the axial direction relative to the axis of the base and at least partially away from the axis of the base;

the rotatable or fixed micro-oculus shaders being arranged in an array forming open areas therein that are configured to allow a view therethrough;

a transom holding the interior glass unit and the exterior glass panel therebetween;

wherein the photovoltaic curtain wall system is a prefabricated curtain wall system; and integrating the prefabricated curtain wall system in the building, the building having a ceiling and floor, and the open areas of the solar modular at eye level are larger and gradually reduced when moving up to the ceiling and down to the floor.

18. The method of claim 17, wherein the rotatable or fixed micro-oculus shaders are arranged in a hexagonal array forming open areas therein that are adapted to allow the view therethrough.

19. The method of claim 17, wherein the upper shading portion of each micro-oculus shader generates electricity with the photovoltaic elements and the lower shading portion is reflected light passing adjacent to the micro-oculus shader.

20. The method of claim 19, wherein the three-dimensional (3D) solar module receives the sunlight normal to the upper shading portion to reduce cosine effect.

* * * * *